United States Patent
Schatz et al.

(10) Patent No.: US 8,242,634 B2
(45) Date of Patent: Aug. 14, 2012

(54) HIGH EFFICIENCY REMOTELY CONTROLLABLE SOLAR ENERGY SYSTEM

(75) Inventors: Douglas S. Schatz, Wilson, WY (US); Robert M. Porter, Wellington, CO (US); Anatoli Ledenev, Fort Collins, CO (US)

(73) Assignee: AMPT, LLC, Fort Collins, CO (US)

( * ) Notice: Subject to any disclaimer, the term of this patent is extended or adjusted under 35 U.S.C. 154(b) by 0 days.

(21) Appl. No.: 12/682,559

(22) PCT Filed: Jul. 18, 2008

(86) PCT No.: PCT/US2008/070506
§ 371 (c)(1),
(2), (4) Date: Apr. 9, 2010

(87) PCT Pub. No.: WO2009/051870
PCT Pub. Date: Apr. 23, 2009

(65) Prior Publication Data
US 2010/0308662 A1    Dec. 9, 2010

Related U.S. Application Data

(63) Continuation-in-part of application No. PCT/US2008/060345, filed on Apr. 15, 2008, and a continuation-in-part of application No. PCT/US2008/057105, filed on Mar. 14, 2008.

(60) Provisional application No. 60/980,157, filed on Oct. 15, 2007, provisional application No. 60/982,053, filed on Oct. 23, 2007, provisional application No. 60/986,979, filed on Nov. 9, 2007.

(51) Int. Cl.
*H02J 3/00* (2006.01)

(52) U.S. Cl. ........................................................ 307/82

(58) Field of Classification Search .................... 307/80, 307/82
See application file for complete search history.

(56) References Cited

U.S. PATENT DOCUMENTS 3,900,943 A    8/1975   Sirtl et al.
(Continued)

FOREIGN PATENT DOCUMENTS

EP              0677749 A3    1/1996
(Continued)

OTHER PUBLICATIONS http://www.solarsentry.com; Protecting Your Solar Investment, 2005, Solar Sentry Corp.

(Continued)

*Primary Examiner* — Michael Rutland Wallis
(74) *Attorney, Agent, or Firm* — Santangelo Law Offices, P.C.

(57) ABSTRACT

A solar energy system (55) has aspects that can allow individualized control and analysis for overall field power control that can be used while harvesting maximum power from a solar energy source (1) and a string of solar panels (11) for a power grid (10). The invention provides control of power at high efficiency with aspects that can exist independently including: 1) power management with switch disconnect control (64), 2) sequenced start of a solar power system, 3) providing a safety output system that can be handled by installers and maintenance and advantageously controlled, 4) providing programmable power functionality controller (86) either on site or remotely from an administrative facility by radio transmission individual solar panel disconnect control (85), 5) a system with pattern analyzer (87) for operational, installation, and maintenance indications, and 6) systems with individual solar panel string power simulator (89) for disparate components.

20 Claims, 8 Drawing Sheets

U.S. PATENT DOCUMENTS

| | | | |
|---|---|---|---|
| 4,127,797 A | 11/1978 | Perper | |
| 4,168,124 A | 9/1979 | Pizzi | |
| 4,218,139 A | 8/1980 | Sheffield | |
| 4,222,665 A | 9/1980 | Tacjozawa et al. | |
| 4,249,958 A | 2/1981 | Baudin et al. | |
| 4,274,044 A | 6/1981 | Barre | |
| 4,341,607 A | 7/1982 | Tison | |
| 4,375,662 A | 3/1983 | Baker | |
| 4,390,940 A | 6/1983 | Corbefin et al. | |
| 4,395,675 A | 7/1983 | Toumani | |
| 4,404,472 A | 9/1983 | Steigerwald | |
| 4,409,537 A | 10/1983 | Harris | |
| 4,445,030 A | 4/1984 | Carlson | |
| 4,445,049 A | 4/1984 | Steigerwald | |
| 4,513,167 A | 4/1985 | Brandstetter | |
| 4,528,503 A | 7/1985 | Cole | |
| 4,580,090 A | 4/1986 | Bailey et al. | |
| 4,581,716 A | 4/1986 | Kamiya | |
| 4,619,863 A | 10/1986 | Taylor | |
| 4,626,983 A | 12/1986 | Harada et al. | |
| 4,649,334 A | 3/1987 | Nakajima | |
| 4,725,740 A | 2/1988 | Nakata | |
| 4,749,982 A | 6/1988 | Rikuna et al. | |
| 4,794,909 A | 1/1989 | Elden | |
| 4,873,480 A | 10/1989 | Lafferty | |
| 4,896,034 A | 1/1990 | Kiriseko | |
| 4,899,269 A | 2/1990 | Rouzies | |
| 4,922,396 A | 5/1990 | Niggemeyer | |
| 5,027,051 A | 6/1991 | Lafferty | |
| 5,028,861 A | 7/1991 | Pace et al. | |
| 5,179,508 A | 1/1993 | Lange et al. | |
| 5,270,636 A | 12/1993 | Lafferty | |
| 5,401,561 A | 3/1995 | Fisun et al. | |
| 5,402,060 A | 3/1995 | Erisman | |
| 5,493,155 A | 2/1996 | Okamoto et al. | |
| 5,493,204 A | 2/1996 | Caldwell | |
| 5,503,260 A | 4/1996 | Riley | |
| 5,646,502 A | 7/1997 | Johnson | |
| 5,648,731 A | 7/1997 | Decker et al. | |
| 5,659,465 A | 8/1997 | Flack et al. | |
| 5,669,987 A | 9/1997 | Takehara et al. | |
| 5,689,242 A | 11/1997 | Sims et al. | |
| 5,741,370 A | 4/1998 | Hanoka | |
| 5,747,967 A | 5/1998 | Muljadi et al. | |
| 5,782,994 A | 7/1998 | Mori et al. | |
| 5,801,519 A | 9/1998 | Midya et al. | |
| 5,896,281 A | 4/1999 | Bingley | |
| 5,898,585 A | 4/1999 | Sirichote et al. | |
| 5,923,100 A | 7/1999 | Lukens et al. | |
| 5,932,994 A | 8/1999 | Jo et al. | |
| 6,046,401 A | 4/2000 | McCabe | |
| 6,081,104 A | 6/2000 | Kern | |
| 6,124,769 A | 9/2000 | Igarashi et al. | |
| 6,162,986 A | 12/2000 | Shiotsuka | |
| 6,180,868 B1 | 1/2001 | Yoshino et al. | |
| 6,181,590 B1 | 1/2001 | Yamane et al. | |
| 6,191,501 B1 * | 2/2001 | Bos | 307/64 |
| 6,218,605 B1 | 4/2001 | Daily et al. | |
| 6,218,820 B1 | 4/2001 | D'Arrigo et al. | |
| 6,219,623 B1 | 4/2001 | Wills | |
| 6,262,558 B1 | 7/2001 | Weinberg | |
| 6,278,052 B1 | 8/2001 | Takehara et al. | |
| 6,281,485 B1 | 8/2001 | Siri | |
| 6,282,104 B1 | 8/2001 | Kern | |
| 6,314,007 B2 | 11/2001 | Johnson, Jr. et al. | |
| 6,331,670 B2 | 12/2001 | Takehara et al. | |
| 6,351,400 B1 | 2/2002 | Lumsden | |
| 6,369,462 B1 | 4/2002 | Siri | |
| 6,433,522 B1 | 8/2002 | Siri | |
| 6,433,992 B2 | 8/2002 | Nakagawa et al. | |
| 6,441,896 B1 | 8/2002 | Field | |
| 6,448,489 B2 | 9/2002 | Kimura et al. | |
| 6,493,246 B2 | 12/2002 | Suzui et al. | |
| 6,515,215 B1 | 2/2003 | Mimura | |
| 6,545,211 B1 | 4/2003 | Mimura | |
| 6,545,868 B1 | 4/2003 | Kledzik et al. | |
| 6,593,521 B2 | 7/2003 | Kobayashi | |
| 6,624,350 B2 | 9/2003 | Nixon et al. | |
| 6,670,721 B2 | 12/2003 | Lof et al. | |
| 6,686,533 B2 | 2/2004 | Raum et al. | |
| 6,686,727 B2 | 2/2004 | Ledenev et al. | |
| 6,750,391 B2 | 6/2004 | Bower et al. | |
| 6,791,024 B2 | 9/2004 | Toyomura | |
| 6,804,127 B2 | 10/2004 | Zhou | |
| 6,889,122 B2 | 5/2005 | Perez | |
| 6,914,418 B2 | 7/2005 | Sung | |
| 6,914,420 B2 | 7/2005 | Crocker | |
| 6,920,055 B1 | 7/2005 | Zeng et al. | |
| 6,952,355 B2 | 10/2005 | Rissio et al. | |
| 6,958,922 B2 | 10/2005 | Kazem | |
| 6,984,965 B2 | 1/2006 | Vinciarelli | |
| 6,984,970 B2 | 1/2006 | Capel | |
| 7,019,988 B2 | 3/2006 | Fung et al. | |
| 7,046,531 B2 | 5/2006 | Zocchi et al. | |
| 7,068,017 B2 | 6/2006 | Willner et al. | |
| 7,072,194 B2 | 7/2006 | Nayar et al. | |
| 7,091,707 B2 | 8/2006 | Cutler | |
| 7,092,265 B2 | 8/2006 | Kernahan | |
| 7,158,395 B2 | 1/2007 | Deng et al. | |
| 7,193,872 B2 | 3/2007 | Siri | |
| 7,227,278 B2 | 6/2007 | Realmuto et al. | |
| 7,248,946 B2 | 7/2007 | Bashaw et al. | |
| 7,274,975 B2 | 9/2007 | Miller | |
| 7,333,916 B2 | 2/2008 | Warfield et al. | |
| 7,365,661 B2 | 4/2008 | Thomas | |
| 7,471,073 B2 | 12/2008 | Rettenwort et al. | |
| 7,479,774 B2 | 1/2009 | Wai et al. | |
| 7,514,900 B2 | 4/2009 | Sander et al. | |
| 7,596,008 B2 | 9/2009 | Iwata et al. | |
| D602,432 S | 10/2009 | Moussa | |
| 7,605,498 B2 | 10/2009 | Ledenev et al. | |
| 7,619,323 B2 | 11/2009 | Tan et al. | |
| 7,663,342 B2 | 2/2010 | Kimball et al. | |
| 7,719,140 B2 | 5/2010 | Ledenev et al. | |
| 7,768,155 B2 | 8/2010 | Fornage | |
| 7,786,716 B2 * | 8/2010 | Simburger et al. | 323/290 |
| 7,807,919 B2 | 10/2010 | Powell | |
| 7,834,580 B2 | 11/2010 | Haines | |
| 7,843,085 B2 | 11/2010 | Ledenev | |
| 7,919,953 B2 | 4/2011 | Porter et al. | |
| 7,962,249 B1 | 6/2011 | Zhang et al. | |
| 8,004,116 B2 | 8/2011 | Ledenev et al. | |
| 8,093,756 B2 | 1/2012 | Porter et al. | |
| 8,106,765 B1 * | 1/2012 | Ackerson et al. | 340/538 |
| 2001/0007522 A1 | 7/2001 | Nakagawa et al. | |
| 2001/0032664 A1 | 10/2001 | Takehara et al. | |
| 2002/0195136 A1 | 12/2002 | Takabayashi et al. | |
| 2003/0062078 A1 | 4/2003 | Mimura | |
| 2003/0075211 A1 | 4/2003 | Makita et al. | |
| 2003/0117822 A1 | 6/2003 | Stamenic et al. | |
| 2004/0095020 A1 | 5/2004 | Kernahan et al. | |
| 2004/0100149 A1 | 5/2004 | Lai | |
| 2004/0135560 A1 | 7/2004 | Kernahan et al. | |
| 2004/0159102 A1 | 8/2004 | Toyomura et al. | |
| 2004/0164557 A1 | 8/2004 | West | |
| 2004/0207366 A1 | 10/2004 | Sung | |
| 2004/0211456 A1 | 10/2004 | Brown et al. | |
| 2005/0002214 A1 | 1/2005 | Deng et al. | |
| 2005/0068012 A1 | 3/2005 | Cutler | |
| 2005/0105224 A1 | 5/2005 | Nishi | |
| 2005/0109386 A1 | 5/2005 | Marshall | |
| 2005/0121067 A1 | 6/2005 | Toyomura | |
| 2005/0162018 A1 | 7/2005 | Realmuto et al. | |
| 2005/0169018 A1 | 8/2005 | Hatai et al. | |
| 2005/0254191 A1 | 11/2005 | Bashaw et al. | |
| 2006/0017327 A1 | 1/2006 | Siri et al. | |
| 2006/0103360 A9 | 5/2006 | Cutler | |
| 2006/0162772 A1 | 7/2006 | Preser et al. | |
| 2006/0171182 A1 | 8/2006 | Siri et al. | |
| 2006/0174939 A1 | 8/2006 | Matan | |
| 2007/0024257 A1 | 2/2007 | Boldo | |
| 2007/0035975 A1 | 2/2007 | Dickerson et al. | |
| 2007/0044837 A1 | 3/2007 | Simburger et al. | |
| 2007/0069520 A1 | 3/2007 | Schetters | |
| 2007/0111103 A1 | 5/2007 | Konishiike et al. | |
| 2007/0119718 A1 | 5/2007 | Gibson et al. | |
| 2007/0133241 A1 | 6/2007 | Mumtaz et al. | |

| Publication No. | Date | Name | | Patent No. | | Date |
|---|---|---|---|---|---|---|
| 2007/0159866 A1 | 7/2007 | Siri | EP | 0964457 A3 | | 12/1999 |
| 2007/0165347 A1 | 7/2007 | Wendt et al. | EP | 00978884 A3 | | 3/2000 |
| 2007/0171680 A1 | 7/2007 | Perreault et al. | EP | 0780750 B1 | | 3/2002 |
| 2007/0236187 A1 | 10/2007 | Wai et al. | EP | 1120895 A3 | | 5/2004 |
| 2008/0036440 A1 | 2/2008 | Garmer | FR | 612859 | | 5/1943 |
| 2008/0062724 A1 | 3/2008 | Feng et al. | FR | 612859 | | 11/1948 |
| 2008/0097655 A1 | 4/2008 | Hadar et al. | GB | 310362 | | 9/1929 |
| 2008/0101101 A1 | 5/2008 | Iwata et al. | GB | 612859 | | 11/1948 |
| 2008/0111517 A1 | 5/2008 | Pfeifer et al. | GB | 1231961 | | 9/1969 |
| 2008/0123375 A1 | 5/2008 | Beardsley | GB | 5050197 A | | 11/2005 |
| 2008/0136367 A1 | 6/2008 | Adest et al. | GB | 2415841 A | | 1/2006 |
| 2008/0143188 A1 | 6/2008 | Adest et al. | GB | 2415841 B | | 1/2006 |
| 2008/0144294 A1 | 6/2008 | Adest et al. | GB | 2419968 A | | 5/2006 |
| 2008/0147335 A1* | 6/2008 | Adest et al. ...... 702/64 | GB | 2421847 A | | 7/2006 |
| 2008/0150366 A1 | 6/2008 | Adest et al. | GB | 2434490 A | | 7/2007 |
| 2008/0164766 A1 | 7/2008 | Adest et al. | JP | 56042365 A2 | | 4/1981 |
| 2008/0186004 A1 | 8/2008 | Williams | JP | 60027964 A2 | | 2/1985 |
| 2008/0236648 A1 | 10/2008 | Klein et al. | JP | 60148172 A2 | | 8/1985 |
| 2008/0238195 A1* | 10/2008 | Shaver et al. ...... 307/18 | JP | 62154121 A2 | | 9/1987 |
| 2008/0247201 A1 | 10/2008 | Perol | JP | 05003678 A2 | | 1/1993 |
| 2008/0257397 A1 | 10/2008 | Glaser et al. | JP | 06035555 A2 | | 2/1994 |
| 2009/0039852 A1 | 2/2009 | Fishelov et al. | JP | 06141261 A2 | | 5/1994 |
| 2009/0078300 A1 | 3/2009 | Ang et al. | JP | 07026849 U2 | | 1/1995 |
| 2009/0114263 A1 | 5/2009 | Powell et al. | JP | 07222436 A2 | | 8/1995 |
| 2009/0120485 A1 | 5/2009 | Kikinis | JP | 08033347 A2 | | 2/1996 |
| 2009/0133736 A1 | 5/2009 | Powell et al. | JP | 8046231 | | 2/1996 |
| 2009/0140715 A1 | 6/2009 | Adest et al. | JP | 08066050 A2 | | 3/1996 |
| 2009/0141522 A1 | 6/2009 | Adest et al. | JP | 08181343 A2 | | 7/1996 |
| 2009/0145480 A1 | 6/2009 | Adest et al. | JP | 08204220 A2 | | 8/1996 |
| 2009/0146505 A1 | 6/2009 | Powell et al. | JP | 09097918 A2 | | 4/1997 |
| 2009/0146667 A1 | 6/2009 | Adest et al. | JP | 9148613 A2 | | 6/1997 |
| 2009/0146671 A1 | 6/2009 | Gazit | JP | 2000020150 A2 | | 1/2000 |
| 2009/0147554 A1 | 6/2009 | Adest et al. | JP | 20011086765 A | | 3/2001 |
| 2009/0150005 A1 | 6/2009 | Hadar et al. | JP | 2002231578 A | | 8/2002 |
| 2009/0160258 A1 | 6/2009 | Allen et al. | JP | 2002231578 A2 | | 8/2002 |
| 2009/0206666 A1 | 8/2009 | Sella et al. | JP | 2007104872 A | | 4/2007 |
| 2009/0218887 A1 | 9/2009 | Ledenev et al. | JP | 2007225625 A | | 6/2007 |
| 2009/0234692 A1 | 9/2009 | Powell et al. | JP | 27058845 A | | 8/2007 |
| 2009/0237042 A1 | 9/2009 | Glovinski | JP | 2007058843 A | | 8/2007 |
| 2009/0237043 A1 | 9/2009 | Glovinski | KR | 1020050071689 A | | 7/2005 |
| 2009/0273241 A1 | 11/2009 | Gazit et al. | KR | 1020060060825 A | | 7/2006 |
| 2009/0283128 A1 | 11/2009 | Zhang et al. | KR | 1020070036528 A | | 3/2007 |
| 2009/0283129 A1 | 11/2009 | Foss | KR | 1020080092747 A | | 10/2008 |
| 2009/0284078 A1 | 11/2009 | Zhang et al. | WO | 90/03680 | | 4/1990 |
| 2009/0284232 A1 | 11/2009 | Zhang et al. | WO | 9003680 A1 | | 4/1990 |
| 2009/0284240 A1 | 11/2009 | Zhang et al. | WO | 020073785 A1 | | 9/2002 |
| 2009/0284998 A1 | 11/2009 | Zhang et al. | WO | 2003036688 A2 | | 4/2003 |
| 2010/0001587 A1 | 1/2010 | Casey et al. | WO | 2004100344 A2 | | 11/2004 |
| 2010/0026097 A1 | 2/2010 | Avrutsky et al. | WO | 2004100348 A1 | | 11/2004 |
| 2010/0027297 A1 | 2/2010 | Avrutsky et al. | WO | 2004107543 A2 | | 12/2004 |
| 2010/0038968 A1 | 2/2010 | Ledenev et al. | WO | 2005027300 A1 | | 3/2005 |
| 2010/0117858 A1 | 5/2010 | Rozenboim | WO | 2005036725 A1 | | 4/2005 |
| 2010/0118985 A1 | 5/2010 | Rozenboim | WO | 2005076445 A1 | | 8/2005 |
| 2010/0127570 A1 | 5/2010 | Hadar et al. | WO | 2006005125 A1 | | 1/2006 |
| 2010/0127571 A1 | 5/2010 | Hadar et al. | WO | 2006013600 A2 | | 2/2006 |
| 2010/0132758 A1 | 6/2010 | Gilmore | WO | 2006013600 A3 | | 2/2006 |
| 2010/0139732 A1 | 6/2010 | Hadar et al. | WO | 2006048688 A1 | | 5/2006 |
| 2010/0139734 A1 | 6/2010 | Hadar et al. | WO | 2006048689 A2 | | 5/2006 |
| 2010/0139743 A1 | 6/2010 | Hadar et al. | WO | 2006048689 A3 | | 5/2006 |
| 2010/0195361 A1 | 8/2010 | Stem | WO | 2006071436 A2 | | 7/2006 |
| 2010/0229915 A1 | 9/2010 | Ledenev et al. | WO | 2006078685 A2 | | 7/2006 |
| 2010/0246230 A1 | 9/2010 | Porter et al. | WO | 2006090675 | | 8/2006 |
| 2010/0253150 A1 | 10/2010 | Ledenev et al. | WO | 2006117551 A2 | | 11/2006 |
| 2010/0308662 A1 | 12/2010 | Schatz et al. | WO | 2006137948 A2 | | 12/2006 |
| 2011/0067745 A1 | 3/2011 | Ledenev et al. | WO | 2007007360 A2 | | 1/2007 |
| 2011/0095613 A1 | 4/2011 | Huang et al. | WO | 2007008429 A2 | | 7/2007 |
| 2011/0115300 A1 | 5/2011 | Chiang et al. | WO | 2007008429 A3 | | 7/2007 |
| 2011/0127841 A1 | 6/2011 | Chiang et al. | WO | 2007142693 A3 | | 12/2007 |
| 2011/0160930 A1 | 6/2011 | Batten et al. | WO | 2008125915 A2 | | 10/2008 |
| 2011/0175454 A1 | 7/2011 | Williams et al. | WO | 2008125915 A3 | | 10/2008 |
| 2011/0181251 A1 | 7/2011 | Porter et al. | WO | 2008132551 A2 | | 11/2008 |
| 2011/0193515 A1 | 8/2011 | Wu et al. | WO | 2008132551 A3 | | 11/2008 |
| 2011/0316346 A1 | 12/2011 | Porter et al. | WO | 2008132553 A2 | | 11/2008 |
| | | | WO | 2008142480 A2 | | 11/2008 |
| FOREIGN PATENT DOCUMENTS | | | WO | 2008142480 A3 | | 11/2008 |
| EP | 0677749 A2 | 10/1996 | WO | 2008142480 A4 | | 11/2008 |
| EP | 0824273 A2 | 2/1998 | WO | 2008069926 A3 | | 12/2008 |
| EP | 0964415 A1 | 12/1999 | WO | 2009007782 A2 | | 1/2009 |
| EP | 0964457 A2 | 12/1999 | WO | 2009007782 A3 | | 1/2009 |

| | | |
|---|---|---|
| WO | 2009007782 A4 | 1/2009 |
| WO | 2009051853 A1 | 4/2009 |
| WO | 2009051854 A1 | 4/2009 |
| WO | 2009051870 A1 | 4/2009 |
| WO | 2009055474 A1 | 4/2009 |
| WO | 2009059028 A2 | 5/2009 |
| WO | 2009059028 A3 | 5/2009 |
| WO | 2009064683 A2 | 5/2009 |
| WO | 2009064683 A3 | 5/2009 |
| WO | 2009072075 A2 | 6/2009 |
| WO | 2009072075 A3 | 6/2009 |
| WO | 2009072075 A9 | 6/2009 |
| WO | 2009072076 A2 | 6/2009 |
| WO | 2009072076 A3 | 6/2009 |
| WO | 2009072077 A1 | 6/2009 |
| WO | 2009073867 A1 | 6/2009 |
| WO | 2009073868 A1 | 6/2009 |
| WO | 2009075985 A2 | 6/2009 |
| WO | 2009075985 A3 | 6/2009 |
| WO | 2009114341 A2 | 9/2009 |
| WO | 2009114341 A3 | 9/2009 |
| WO | 2009118682 A2 | 10/2009 |
| WO | 2009118682 A3 | 10/2009 |
| WO | 2009118682 A4 | 10/2009 |
| WO | 2009118683 A2 | 10/2009 |
| WO | 2009118683 A3 | 10/2009 |
| WO | 2009118683 A4 | 10/2009 |
| WO | 2009136358 A1 | 11/2009 |
| WO | 2009136358 A4 | 11/2009 |
| WO | 2009140536 A2 | 11/2009 |
| WO | 2009140536 A3 | 11/2009 |
| WO | 2009140539 A2 | 11/2009 |
| WO | 2009140539 A3 | 11/2009 |
| WO | 2009140543 A2 | 11/2009 |
| WO | 2009140543 A3 | 11/2009 |
| WO | 2009140551 A2 | 11/2009 |
| WO | 2009140551 A3 | 11/2009 |
| WO | 2010014116 A1 | 2/2010 |
| WO | 2010062410 A1 | 6/2010 |
| WO | 2010062662 A2 | 6/2010 |
| WO | 2010062662 A3 | 6/2010 |
| WO | 2010065043 A1 | 6/2010 |
| WO | 2010002960 A1 | 7/2010 |
| WO | 2011049985 A1 | 4/2011 |

OTHER PUBLICATIONS

Bower, et al. "Innovative PV Micro-Inverter Topology Eliminates Electrolytic Capacitors for Longer Lifetime," 1-4244-0016-3-06 IEEE p. 2038.

"Solar Sentry's Competitive Advantage," 1 page with table summarizing Solar Sentry's sustainable competitive advantage over two primary alternative approaches.

Dallas Semiconductor; Battery I.D. chip from Dallas Semiconductor monitors and reports battery pack temperature, Bnet World Network, Jul. 10, 1995.

deHaan, S.W.H., et al; Test results of a 130W AC module, a modular solar AC power station, Photovoltaic Energy Conversion, 1994; Conference Record of the 24th IEEE Photovoltaic Specialists Conference Dec. 5-91994; 1994 IEEE First World Conference, vol. 1, pp. 925-928.

European patent application No. 1999111425 filed Nov. 6, 1999; and various office actions.

Gomez, M; "Consulting in the solar power age," IEEE-CNSV: Consultants' Network of Silicon Valley, Nov. 13, 2007.

Guo, G.Z.; "Design of a 400W, 1 Omega, Buck-boost Inverter for PV Applications," 32nd Annual Canadian Solar Energy Conference, Jun. 10, 2007.

Wang, Ucilia; Greentechmedia; "National semi casts solarmagic;" www.greentechmedia.com; Jul. 2, 2008.

Kroposki, H. Thomas and Witt, B & C; "Progress in Photovoltaic Components and Systems," National Renewable Energy Laboratory, May 200; NREL-CP-520-27460.

Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; p. 2255.

Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.

Kern, G; "SunSine (TM)300: Manufacture of an AC Photovoltaic Module," Final Report, Phases I & II, Jul. 25, 1995-Jun. 30, 1998; National Renewable Energy Laboratory, Mar. 1999; NREL-SR-520-26085.

Kang, F et al; Photovoltaic Power Interface Circuit Incorporated with a Buck-boost Converter and a Full-bridge Inverter;' doi:10.1016-j.apenergy2004.10.009.

Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; pp. 622-625.

Lim, Y.H. et al; "Simple Maximum Power Point Tracker for Photovoltaic Arrays," Electronics Letters May 25, 2000; vol. 36, No. 11.

Linear Technology Specification Sheet, LTM4607.

Matsuo, H et al; Novel Solar Cell Power Supply System using the Multiple-input DC-DC Converter;' Telecommunications Energy Conference, 1998; INTELEC, 20th International, pp. 797-8022.

solar-electric.com; Northern Arizona Wind & Sun, All About MPPT Solar Charge Controllers; Nov. 5, 2007.

Oldenkamp, H. et al; AC Modules: Past, Present and Future, Workshop Installing the Solar Solution; pp. 22-23; Jan. 1998; Hatfield, UK.

Presher, Gordon E. Jr. (first named inventor); Portion of File Wrapper, Information Disclosure Statement by Applicant.

Rodriguez, C; "Analytic Solution to the Photovoltaic Maximum Power Point Problem;" IEEE Transactions of Power Electronics, vol. 54, No. 9, Sep. 2007.

DeDoncker, Rik; "Power Converter for PV-Systems," Institute for Power Electrical Drives, RWTH Aachen Univ.

Roman, E et al; "Intelligent PV Module for Grid-Connected PV Systems;" IEEE Transactions of Power Electronics, vol. 53, No. 4, Aug. 2006.

Russell, M.C. et al; "The Massachusetts Electric Solar Project: A Pilot Project to Commercialize Residential PC Systems," Photovoltaic Specialists Conference 2000; Conference Record of the 28th IEEE; pp. 1583-1586.

SatCon Power Systems, PowerGate Photovoltaic 50kW Power Converter System; Spec Sheet; Jun. 2004.

Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.

Shimizu, et al; "Generation Control Circuit for Photovoltaic Modules," IEEE Transactions on Power Electronics; vol. 16, No. 3, May 2001.

Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32.

Walker, G.R. et al; "Cascaded DC-DC Converter Connection of Photovoltaic Modules," IEEE Transactions of Power Electronics, vol. 19, No. 4, Jul. 2004.

Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003.

Cambridge Consultants—Brochure—Interface 43.

United States Provisional Application filed Oct. 15, 2007, U.S. Appl. No. 60/980,157.

United States Provisional Application filed Oct. 23, 2007, U.S. Appl. No. 60/982,053.

United States Provisional Application filed Nov. 15, 2007, U.S. Appl. No. 60/986,979.

United States Provisional Application filed Dec. 6, 2006, U.S. Appl. No. 60/868,851.

United States Provisional Application filed Dec. 6, 2006, U.S. Appl. No. 60/868,893.

United States Provisional Application filed Dec. 7, 2006, U.S. Appl. No. 60/868,962.
United States Provisional Application filed Mar. 26, 2007, U.S. Appl. No. 60/908,095.
United States Provisional Application filed May 9, 2007, U.S. Appl. No. 60/916,815.
Updates to previously cited U.S. Appl. No. 12/152,566, filed May 14, 2008, First Named Inventor Jianhui Zhang.
Updates to previously cited U.S. Appl. No. 11/875,799, filed Oct. 19, 2007, First Named Inventor Ron Hadar.
Updates to previously cited U.S. Appl. No. 12/253,868, filed Oct. 17, 2008, First Named Inventor Dan Kininis.
Updates to previously cited U.S. Appl. No. 12/254,780, filed Oct. 20, 2008, First Named Inventor Earl G. Powell.
Updates to previously cited U.S. Appl. No. 12/260,720, filed Oct. 29, 2008, First Named Inventor Earl G. Powell.
Updates to previously cited U.S. Appl. No. 12/340,540, filed Dec. 19, 2008, First Named Inventor Mordechay Avrutski.
Updates to previously cited U.S. Appl. No. 12/357,357, filed Jan. 21, 2009, First Named Inventor Earl G. Powell.
Updates to previously cited U.S. Patent Application No. A22 filed Feb. 24, 2009, First Named Inventor Ron Hadar.
Updates to previously cited U.S. Appl. No. 12/467,117, filed May 15, 2009, First Named Inventor Leonid Rozenboim.
Updates to previously cited U.S. Appl. No. 12/542,632, filed Aug. 17, 2009, First Named Inventor Ron Hadar.
Updates to previously cited U.S. Appl. No. 12/567,169 filed Sep. 25, 2009, First Named Inventor Ron Hadar.
Updates to previously cited U.S. Appl. No. 12/454,244, filed May 14, 2009, First Named Inventor Jianhui Zhang.
Updates to previously cited U.S. Appl. No. 12/628,977, filed Dec. 1, 2009, First Named Inventor Ron Hadar.
Updates to previously cited U.S. Appl. No. 12/628,997, filed Dec. 1, 2009, First Named Inventor Ron Hadar.
Updates to previously cited U.S. Appl. No. 12/202,110, filed Aug. 29, 2008, First Named Inventor Mordechay Avrutski.
Updates to previously cited U.S. Appl. No. 12/467,116, filed May 15, 2009, First Named Inventor Leonid Rozenboim.
Updates to previously cited U.S. Appl. No. 12/506,929, filed Jul. 21, 2009, First Named Inventor Ron Hadar.
Updates to previously cited U.S. Appl. No. 11/950,224, filed Dec. 4, 2007, First Named Inventor Meir Adest.
Updates to previously cited U.S. Appl. No. 11/950,271, filed Dec. 4, 2007, First Named Inventor Meir Adest.
Updates to previously cited U.S. Appl. No. 11/950,307, filed Dec. 4, 2007, First Named Inventor Meir Adest.
Updates to previously cited U.S. Appl. No. 11/951,419, filed Dec. 4, 2007, First Named Inventor Meir Adest.
Updates to previously cited U.S. Appl. No. 11/951,485, filed Dec. 6, 2007, First Named Inventor Meir Adest.
Updates to previously cited U.S. Appl. No. 12/411,294, filed Mar. 25, 2009, First Named Inventor Guy Sella.
Updates to previously cited U.S. Appl. No. 12/435,549, filed May 5, 2009, First Named Inventor Meir Gazit.
Updates to previously cited U.S. Appl. No. 12/409,763, filed Mar. 24, 2009, First Named Inventor Tzachi Glovinsky.
Updates to previously cited U.S. Appl. No. 12/409,604, filed Mar. 24, 2009, First Named Inventor Tzachi Glovinsky.
Updates to previously cited U.S. Appl. No. 12/329,525, filed Dec. 5, 2008, First Named Inventor Meir Adest.
Updates to previously cited U.S. Appl. No. 12/314,114, filed Dec. 4, 2008, First Named Inventor Meir Gzait.
Updates to previously cited U.S. Appl. No. 12/187,335, filed Aug. 6, 2008, First Named Inventor Amir Fishelov.
Updates to previously cited U.S. Appl. No. 12/338,610, filed Dec. 18, 2008, First Named Inventor James Allen.
International Patent Application No. PCT/US08/60345. International Prelimianry Report on Patentability dated Aug. 30, 2010.
U.S. Appl. No. 12/363,709, Accelerated Examination Support Document filed Jan. 30, 2009.
U.S. Appl. No. 12/363,709, First Amended Accelerated Examination Support Document filed Jul. 15, 2009.

Knaupp, W. et al., Operation of A 110 kW PV facade with 100 W AC photovoltaic modules, 25th PVSC; May 13-17, 1996; Washington, D.C.
Schoen.T. J. N., BIPV overview & getting PV into the marketplace in the Netherlands, The 2nd World Solar Electric Buildings Conference: Sydney Mar. 8-10, 2000.
Stern M., et al. Development of a Low-Cost Integrated 20-kW-AC Solar Tracking Subarray for Grid-Connected PV Power System Applications—Final Report, National Renewable Energy Laboratory, Jun. 1998.
Verhoeve, C.W.G., et al., Recent Test Results of AC-Module inverters, Netherlands Energy Research Foundation ECN, 1997.
Román, E., et al. Experimental results of controlled PV module for building integrated PV systems; Science Direct; Solar Energy, vol. 82, Issue 5, May 2008, pp. 471-480.
Linares, L., et al. Improved Energy Capture in Series String Photovoltaics via Smart Distributed Power Electronics; Proceedings APEC 2009: 24th Annual IEEE Applied Power Electronics Conference. Washington, D.C., Feb. 2009.
International Application No. PCT/US09/41044, Search Report dated Jun. 5, 2009.
International Application No. PCT/US09/41044, Written Opinion dated Jun. 5, 2009.
International Application No. PCT/US08/79605, Search Report dated Feb. 3, 2009.
International Application No. PCT/US08/79605, Written Opinion dated Feb. 3, 2009.
International Application No. PCT/US08/80794, Search Report dated Feb. 23, 2009.
International Application No. PCT/US08/80794, Written Opinion dated Feb. 23, 2009.
International Application No. PCT/US08/57105, International Preliminary Report on Patentability, mailed Mar. 12, 2010.
International Application No. PCT/US08/70506 corrected International Preliminary Report on Patentability, mailed Jun. 25, 2010.
U.S. Appl. No. 61/170,567, filed Jul. 17, 2009, First Named Inventor Jianhui Zhang.
U.S. Appl. No. 12/456,777, filed Jun. 23, 2010, First Named Inventor Jianhui Zhang.
U.S. Appl. No. 12/456,776, filed Jun. 23, 2010, First Named Inventor Jianhui Zhang.
U.S. Appl. No. 12/152,566, filed May 14, 2008, First Named Inventor Jianhui Zhang.
U.S. Appl. No. 12/152,491, filed May 14, 2008, First Named Inventor Jianhui Zhang.
U.S. Appl. No. 12/152,478, filed May 14, 2008, First Named Inventor Jianhui Zhang.
U.S. Appl. No. 61/170,578, filed Apr. 17, 2009, First Named Inventor Jianhui Zhang.
U.S. Appl. No. 61/200,601, filed Dec. 2, 2008, First Named Inventor Ron Hadar.
U.S. Appl. No. 61/200,279, filed Nov. 26, 2008, First Named Inventor Ron Hadar.
U.S. Appl. No. 61/137,741, filed Aug. 1, 2008, First Named Inventor Mordechay Avrutski.
U.S. Appl. No. 12/506,929, filed Jul. 21, 2009, First Named Inventor Ron Hadar.
U.S. Appl. No. 12/411,317, filed Mar. 25, 2009, First Named Inventor Ron Hadar.
U.S. Appl. No. 12/202,110, filed Aug. 29, 2008, First Named Inventor Mordechay Avrutski.
U.S. Appl. No. 60/207,296, filed Feb. 10, 2009, First Named Inventor Ron Hadar.
U.S. Appl. No. 61/039,050, filed Mar. 24, 2008, First Named Inventor Tzachi Glovinski.
U.S. Appl. No. 60/992,589, filed Dec. 5, 2007, First Named Inventor Tzachi Glovinski.
U.S. Appl. No. 60/916,815, filed May 9, 2007, First Named Inventor Meir Adest.
U.S. Appl. No. 60/908,095, filed Mar. 26, 2007, First Named Inventor Meir Adest.
U.S. Appl. No. 60/868,962, filed Dec. 7, 2006, First Named Inventor Meir Adest.

U.S. Appl. No. 60/868,893, filed Dec. 6, 2006, First Named Inventor Meir Adest.
U.S. Appl. No. 60/868,851, filed Dec. 6, 2006, First Named Inventor Meir Adest.
U.S. Appl. No. 12/411,294, filed Mar. 25, 2009, First Named Inventor Guy Sella.
U.S. Appl. No. 12/329,520, filed Dec. 5, 2008, First Named Inventor Meir Adest.
U.S. Appl. No. 12/328,742, filed Dec. 4, 2008, First Named Inventor Meir Adest.
U.S. Appl. No. 12/314,115, filed Dec. 4, 2008, First Named Inventor Meir Adest.
U.S. Appl. No. 12/314,113, filed Dec. 4, 2008, First Named Inventor Meir Adest.
U.S. Appl. No. 11/951,562, filed Dec. 6, 2007, First Named Inventor Meir Adest.
U.S. Appl. No. 11/951,485, filed Dec. 6, 2007, First Named Inventor Meir Adest.
U.S. Appl. No. 11/951,419, filed Dec. 6, 2007, First Named Inventor Meir Adest.
U.S. Appl. No. 11/950,307, filed Dec. 4, 2007, First Named Inventor Meir Adest.
U.S. Appl. No. 11/950,271, filed Dec. 4, 2007, First Named Inventor Meir Adest.
U.S. Appl. No. 11/950,224, filed Dec. 4, 2007, First Named Inventor Meir Adest.
Feuermann, D. et al., Reversible low solar heat gain windows for energy savings. The Jacob Blaustein Institute, Israel.
Tse, K.K. et al. "A Novel Maximum Power Point Tracking Technique for PV Panels;" Dept. of Electronic Engineering, City Univerisity of Hong Kong; Source: Pesc Record—IEEE Annual Power Electronics Specialists Conference, v 4, 2001, p. 1970-1975, Jun. 17-21, 2001; Abstract.
U.S. Appl. No. 11/875,799, filed Oct. 19, 2007, First Named Inventor Ron Hadar.
U.S. Appl. No. 12/253,868, filed Oct. 17, 2008, First Named Inventor Dan Kininis.
U.S. Appl. No. 12/254,780, filed Oct. 20, 2008, First Named Inventor Earl G. Powell.
U.S. Appl. No. 12/260,720, filed Oct. 29, 2008, First Named Inventor Earl G. Powell.
U.S. Appl. No. 12/340,540, filed Dec. 19, 2008, First Named Inventor Mordechay Avrutski.
U.S. Appl. No. 12/357,357, filed Jan. 21, 2009, First Named Inventor Earl G. Powell.
U.S. Appl. No. 12/366,897, filed Feb. 5, 2009, First Named Inventor Earl G. Powell.
U.S. Appl. No. 12/392,042, filed Feb. 24, 2009, First Named Inventor Ron Hadar.
U.S. Appl. No. 12/467,117, filed May 15, 2009, First Named Inventor Leonid Rozenboim.
U.S. Appl. No. 12/542,632, filed Aug. 17, 2009, First Named Inventor Ron Hadar.
U.S. Appl. No. 12/567,169, filed Sep. 25, 2009, First Named Inventor Ron Hadar.
U.S. Appl. No. 12/628,977, filed Dec. 1, 2009, First Named Inventor Ron Hadar.
U.S. Appl. No. 12/628,997, filed Dec. 1, 2009, First Named Inventor Ron Hadar.
Edelmoser, Karl H. and Himmelstoss, Felix A; High Efficiency DC-to-AC Power Inverter with Special DC Interface; Automatika 46 (2005) 3-4, 143-148, Professional Paper, ISSN 0005-1144.
Esmaili, Gholamreza; Application of Advanced Power Electronics in Renewable Energy Sources and Hygrid Generating Systems, Ohio State University, Graduate Program in Electrical and Computer Engineering, 2006, Dissertation.
Dooyong, Jung; "Soft Switching Boost Converter for Photovoltaic Power Generation System;" http://www.conftool.com/epe-pemc2008/index.php?page=browseSessions&form_session=26 &presentations=show&metadata=show, abstract.
Joo, Hyuk Lee; "Soft Switching Multi-Phase Boost Converter for Photovoltaic System;" http://www.conftool.com/epepemc2008/index.php?page=browseSessions&form_session=26&presentations=show&metadata=show, abstract.
Kuo, J.-L.; "Duty-based Control of Maximum Power Point Regulation for Power Converter in Solar Fan System with Battery Storage," http:www.actapress.com/PaperInfo.aspx?PaperID=30260&reason=500, abstract.
Enslin, J.H.R.; "Integrated Photovoltaic Maximum Power Point Tracking Converter;" Industrial Electronics, IEEE Transactions on vol. 44, Issue 6, Dec. 1997, pp. 769-773; http://ieeexplore.ieee.org/Xplore/login.jsp?url=/ie13/41/14174/00649937.pdf?temp=x.
Dehbonei, Hooman; Corp author(s): Curtin University of Technology, School of Electrical and Computer Engineering; 2003; Description: xxi, 284 leaves; ill.; 31 cm. Dissertation: Thesis. Abstract.
Duncan, Joseph, 1981, Corp Author(s): Massachussetts Institute of Technology, Dept. of Electrical Engineering and Computer Science; 2005, Description: 80p.: ill.; 29 cm. Dissertation: Thesis (M. Eng.). Abstract.
Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages).
Association for Applied Solar Energy, Alt. Journal; Uniform Title: Solar energy (Photnix, AZ); Key Title: Solar energy; Preceding Title: Journal of solar energy, science and engineering; Standard No. ISSN: 0038-092X CODEN: SRENA4. No abstract available.
Chung, H.S.H.; Hui Tse, K.K.; "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.
Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p. 97-103. Abstract.
Rajan, Anita; "Maximum Power Point Tracker Optimized for Solar Powered Cars;" Society of Automotive Engineers, Transactions, v 99, n. Sect 6, 1990, p. 1408-1420; Abstract.
Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p. 2264-2271. Abstract.
Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565. Abstract.
Esram, T., Chapman, P.L., "Comparison of Photovoltaic Array Maximum Power Point Tracking Techniques," Energy Conversion, IEEE Transactions, Vo. 22, No. 2, pp. 439-449, Jun. 2007.
Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p. 1785-1790. Abstract.
Anon Source; International Symposium on Signals, Circuits and Systems, Jul. 12-13, 2007; Iasi, Romania; Publisher: Institute of Electrical and Electroncis Engineers Computer Society; Abstract.
Case, M.J.; "Minimum Component Photovoltaic Array Maximum Power Point Tracker," Vector (Electrical Engineering), Jun. 1999; p. 4-8; Abstract.
Daher, Sergio; "Analysis, Design and Implementation of a High Efficiency Multilevel Converter for Renewable Energy Systems," Kassel University Press, ISBN: 978-3-89958-236-9, 2006, 147 pages Abstract.
Xue, John, "PV Module Series String Balancing Converters," Supervised by Geoffrey Walker, Nov. 6, 2002; University of Queensland, School of Information Technology and Electrical Engineering.
Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp. 228-234.

Reimann, T; Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp. 978-984. Abstract.

Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; pp. 775-780; Abstract.

Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, pp. 1048-1057; Abstract.

Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, pp. 858-863; Abstract.

Duan, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article No. 4582577. Abstract.

Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp. 78-82 and 12-15. Abstract.

Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract.

Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331; Abstract.

Power Article, Aerospace Systems Lab, Washington University, St. Louis, MO;.

International Application No. PCT/US08/60345, International Search Report dated Aug. 18, 2008.

International Application No. PCT/US08/60345, Written Opinion dated Aug. 18, 2008.

International Application No. PCT/US08/57105, International Search Report dated Jun. 25, 2008.

International Application No. PCT/US08/57105, Written Opinion dated Jun. 25, 2008.

International Application No. PCT/US08/70506, International Search Report dated Sep. 26, 2008.

International Application No. PCT/US08170506, Written Opinion dated Sep. 26, 2008.

Chen, J., et al. Buck-Boost PWM Converters Having Two Independently Controlled Switches, IEEE Power Electronics Specialists Conference, Jun. 2001, vol. 2, pp. 736-741.

Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea.

Chen, J., et al. A New Low-Stress Buck-Boost Converter for Universal-Input PFC Applications, IEEE Applied Power Electronics Conference, Feb. 2001.

U.S. Appl. No. 12/467,116, filed May 15, 2009, First Named Inventor Leonid Rozenboim.

U.S. Appl. No. 11/951,419, filed Dec. 4, 2007, First Named Inventor Meir Adest.

U.S Appl. No. 12/329,520, filed Dec. 5, 2008, First Named Inventor Meir Adest.

U.S. Appl. No. 12/435,592, filed May 5, 2009, First Named Inventor Meir Gazit.

U.S. Appl. No. 12/409,763, filed Mar. 24, 2009, First Named Inventor Tzachi Glovinsky.

U.S. Appl. No. 12/409,604, filed Mar. 24, 2009, First Named Inventor Tzachi Glovinsky.

U.S. Appl. No. 12/329,525, filed Dec. 5, 2008, First Named Inventor Meir Adest.

U.S. Appl. No. 12/314,114, filed Dec. 4, 2008, First Named Inventor Meir Gzait.

U.S. Appl. No. 12/187,335, filed Aug. 6, 2008, First Named Inventor Amir Fishelov.

National Semiconductor News Release—National semiconductor's SolarMagic Chipset Makes Solar Panels "Smarter" May 2009.

SM3320 Power Optimizer Specifications; SolarMagic Power Optimizer Apr. 2009.

U.S. Appl. No. 12/338,610, filed Dec. 18, 2008, First Named Inventor James Allen.

TwentyNinety.com/en/about-us/, printed Aug. 17, 2010; 3 pages.

Parallel U.S. Appl. No. 12/682,882; Examiner's Interview Summary dated Oct. 20, 2010; mailed Oct. 26, 2010.

Parallel U.S. Appl. No. 12/738,068; Examiner's Interview Summary dated Oct. 20, 2010.

Parallel U.S. Appl. No. 12/738,068; Nonfinal Office Action dated Nov. 24, 2010.

European Patent Application No. 07 873 361.5 Office Communication dated Jul. 12, 2010 and applicant's response dated Nov. 22, 2010.

International Patent Application No. PCT/US2008/079605. International Preliminary Report on Patentability dated Jan. 21, 2011.

Parallel U.S. Appl. No. 12/738,068; Examiner's Interview Summary dated Feb. 3, 2011.

Parallel U.S. Appl. No. 12/682,882; Examiner's Interview Summary dated Feb. 3, 2011.

International Patent Application No. PCT/US2010/053253. International Search Report and International Written Opinion of the International Searching Authority dated Feb. 22, 2011.

Parallel U.S. Appl. No. 12/738,068; Notice of Allowance dated Feb. 24, 2011.

Parallel U.S. Appl. No. 12/955,304; Nonfinal Office Action dated Mar. 8, 2011.

Parallel U.S. Appl. No. 12/682,882; Final Office Action dated May 13, 2011.

Parallel U.S. Appl. No. 12/995,704; Notice of allowance dated Jul. 19, 2011.

Parallel International Application No. PCT/US09141044; International Preliminary Report on Patentabiity dated Jul. 6, 2011.

Parallel U.S. Appl. No. 12/682,882; Notice of allowance dated Sep. 9, 2011.

Parallel U.S. Appl. No. 13/275,147; Nonfinal office action dated Dec. 29, 2011.

Parallel U.S. Appl. No. 13/059,955; Nonfinal office action dated Jan. 23, 2012.

International Application No. PCT/US10/53253; International Preliminary Report on Patentabiity dated Jan. 25, 2012.

* cited by examiner

HIGH EFFICIENCY REMOTELY CONTROLLABLE SOLAR ENERGY SYSTEM

This application is the United States National Stage of International Application No. PCT/US2008/070506, filed Jul. 18, 2008, which is a continuation-in-part of prior International Application No. PCT/US2008/060345, filed Apr. 15, 2008, and a continuation-in-part of prior International Application No. PCT/US2008/057105, filed Mar. 14, 2008, and which claims benefit of and priority to U.S. Provisional Application No. 60/980,157, filed Oct. 15, 2007, U.S. Provisional Application No. 60/982,053, filed Oct. 23, 2007, and U.S. Provisional Application No. 60/986,979, filed Nov. 9, 2007; each hereby incorporated herein by reference.

TECHNICAL FIELD

This invention relates to the technical field of solar energy, specifically, methods and apparatus for remotely managing electrical power from some type of solar energy source to enhance how it is made available for use in a variety of applications. Through a variety of different aspects, the invention provides techniques and circuitry that can be used to control the production of power at high efficiency from a solar energy source such as a solar panel, or a sea of strings of panels so that this power can be provided for AC use, perhaps for transfer to a power grid or the like. These aspects can exist independently and relate to: 1) power management in a disconnectable fashion, 2) sequenced start up of a solar power system, 3) providing a safety output system that can be handled by installers and maintenance personnel and advantageously controlled, 4) providing functional control of a system either on site or remotely such as from an administrative facility, 5) having a system that can achieve pattern analysis for operational, installation, and maintenance indications, and 6) systems that can simulate a solar power output such as for specific purposes.

BACKGROUND

Solar electrical energy that is electrical energy created from insolation that is environmentally compatible is highly desirable. For years, solar power has been touted as one of the most promising for our increasingly industrialized society. Even though the amount of solar power theoretically available far exceeds most, if not all, other energy sources (alternative or not), there remain practical challenges to utilizing this energy. In general, solar power remains subject to a number of limitations that have kept it from fulfilling the promise it holds. In one regard, it has been a challenge to implement in a manner that provides adequate electrical output as compared to its cost. The present invention aids in addressing an important aspect of this in a manner that significantly increases the ability to cost-effectively permit solar power to be electrically harnessed so that an AC output may be a cost-effective source of electrical power whether it be provided for internal use or for public consumption, such as grid connection or the like.

Focusing on solar power as it may be applied in embodiments of the invention, one of the most efficient ways to convert solar power into electrical energy is through the use of solar cells. These devices create a photovoltaic DC current through the photovoltaic effect. Often these solar cells are linked together electrically to make a combination of cells into a solar panel or a PV (photovoltaic) panel. PV panels are often connected in series to provide high voltage at a reasonable current. Voltage, current, and power levels may be provided at an individual domestic level, such as for an individual house or the like. Similarly, large arrays of many, many panels may be combined in a sea of panels to create significant, perhaps megawatt outputs to public benefit perhaps as an alternative to creating a new coal burning power plant, a new nuclear power plant, or the like.

Regardless of the nature of the combination, the output (perhaps of a solar cell or a solar panel, or even combinations thereof) is then converted to make the electrical power most usable since the power converters often employed can use high voltage input more effectively. This converted output is then often inverted to provide an AC output as generally exists in more dispersed power systems whether at an individual domestic or even a public level.

In installing or connecting a solar energy system, at least two considerations can be present: safety and ease. As may be appreciated, solar energy sources or solar panels are items that usually provide some level of power any time there is insolation present. Thus, if installation or merely handling of a solar energy source occurs in daylight, these sources can—and should—be viewed "hot," as items that are already producing electrical power or have a dangerous voltage present. Thus they must be handled with extreme care. Even if not accomplished in direct sunlight, these sources are usually generating some unknown level of power. At any level, this power can be dangerous. Usually, the solar panels need to be handled with insulating gloves by experienced, electrically qualified personnel. This can increase the cost and complexity of solar panel installation and maintenance operations.

Similarly, the electrical nature of most solar sources can vary. This can make installation more complex as well. For practical reasons, it can be desirable to connect differing makes, models, ages, or even condition sources together to generate power or increase the power of an existing solar energy system (1). It may also be desirable to make installation less dependent on such factors so that optimally any sources can be hooked together to generate the desired amount of power. The present invention provides improvements that facilitate installation, make it easier, and even make it safer.

As mentioned, a converted output is often inverted to provide an AC output. DC-DC conversion of DC to a more appropriate DC can be considered a first stage of power control. When this first stage is included, in some systems converters sometimes have their input handled by an MPPT (maximum power point tracking) circuit to extract the maximum amount of power from one or more or even a string of series connected panels. One problem that arises with this approach, though, is that often the PV panels act as current sources and when combined in a series string, the lowest power panel can limit the current through every other panel. In a second stage in some systems, namely the inversion function to transform the DC into AC, another problem can be that operation of the conversion at maximum power point (MPP) can be somewhat incompatible with or at least suboptimal for an inverter. Prior to the present invention, it was widely seen that it was just an inherent characteristic that needed to be accepted and that the MPP conversion function was so electrically critical that it was generally accepted as a control requirement that made suboptimization at the inverter level merely a necessary attribute that was perhaps inherent in any converted-inverted system. Perhaps surprisingly, the goal of optimizing both the MPP conversion function while also optimizing the inversion function was just not seen as an achievable or perhaps at least significant goal. This was addressed in a prior invention disclosure by the present inventors and that shows way to achieve an extraordinarily efficient system. It is with this type of a system that the present invention is discussed, although it should be understood that that type of application is not required and the present invention is not limited that that type of a system.

As background, solar cells historically have been made from semiconductors such as silicon pn junctions. These junctions or diodes convert sunlight into electrical power. These diodes can have a characteristically low voltage output, often on the order of 0.6 volts. Such cells may behave like current sources in parallel with a forward diode. The output current from such a cell may be a function of many construction factors and, is often directly proportional to the amount of sunlight. The low voltage of such a solar cell can be difficult to convert to power suitable for supplying power to an electric power grid. Often, many diodes are connected in series on a photovoltaic panel. For example, a possible configuration could have 36 diodes or panels connected in series to make 21.6 volts. With the shunt diode and interconnect losses in practice such panels might only generate 15 volts at their maximum power point (MPP). For some larger systems having many such panels, even 15 volts may be too low to deliver over a wire without substantial losses. In addition, typical systems today may combine many panels in series to provide voltages in the 100's of volts in order to minimize the conduction loss between the PV panels and a power converter. Electrically, however, there can be challenges to finding the right input impedance for a converter to extract the maximum power from such a string of PV panels. Naturally, the input usually influences the output. Input variances can be magnified because, the PV panels usually act as current sources and the panel producing the lowest current can sometimes limit the current through the whole string. In some undesirable situations, weak panels can become back biased by the remainder of the panels. Although reverse diodes can be placed across each panel to limit the power loss in this case and to protect the panel from reverse breakdown, there still can be significant variances in the converted output and thus the inverted input. In solar panel systems, problems can arise due to: non-uniformity between panels, partial shade of individual panels, dirt or accumulated matter blocking sunlight on a panel, damage to a panel, and even non-uniform degradation of panels over time to name at least some aspects. Just the fact that a series connection is often desired to get high enough voltage to efficiently transmit power through a local distribution to a load, perhaps such as a grid-tied inverter further adds considerations. In real world applications, there is also frequently a desire or need to use unlike types of panels without regard to the connection configuration desired (series or parallel, etc.).

In addition, other than systems of the present inventors have been at relatively lower efficiency levels. For example, in the article by G. R. Walker, J. Xue and P. Sernia entitled "PV String Per-Module Maximum Power Point Enabling Converters" those authors may have even suggested that efficiency losses were inevitable. Lower levels of efficiency, such as achieved through their 'enhanced' circuitries, were touted as acceptable. Similarly, two of the same authors, G. R. Walker and P. Sernia in the article entitled "Cascaded DC-DC Converter Connection of Photovoltaic Modules" suggested that the needed technologies would always be at an efficiency disadvantage. These references even include efficiency vs. power graph showing a full power efficiency of approximately 91%. With the high cost of PV panels' operation through such a low efficiency converter it is no wonder that solar power has been seen as not yet readily acceptable for the marketplace. The present inventors have disclosed ways to achieve much higher efficiencies and two particular disclosures are incorporated herein by reference as disclosing improved systems that can utilize the present invention. The patent disclosure entitled "Systems for Highly efficient Solar Power" filed internationally as PCT application no. PCT/US08/57105 provides an improved converter topology and other methods that permit solar power systems to operate at higher efficiency. The patent disclosure entitled "AC Power Systems for Renewable Electrical Energy" filed internationally as PCT application no. PCT/US08/60345 provides inverter and system improvements that, among other aspects, can be implemented in a panel sea with large collections of solar panels. The present invention provides operational power control enhancements for these as well as other systems and discloses ways to control power from higher efficiency sources.

Another less understood problem with large series strings of PV panels may be with highly varying output voltage, the inverter stage driving the grid my need to operate over a very wide range also lowering its efficiency. It may also be a problem if during periods of time when the inverter section is not powering the grid that the input voltage to this stage may increase above regulatory limits. Or conversely, if the voltage during this time is not over a regulatory limit then the final operational voltage may be much lower than the ideal point of efficiency for the inverter. In addition, there may be start-up and protection issues which add significant cost to the overall power conversion process. Other less obvious issues affecting Balance of System (BOS) costs for a solar power installation are also involved.

Most high power systems involve large strings or large arrays of panels. They can be much bigger than a football field in size and can generate many, many megawatts of power from thousands of panels. Control, maintenance, and even identification of so many panels can pose unique challenges. For instance, in some systems, the only practical way to identify if a particular panel is in need of maintenance is if that malfunction is of a visual nature such as the panel itself is cracked or the like. Electrically, individual panels may not be so significant a contributor that a mere individual panel reduced output or perhaps even non-existent contribution may be noticeable. Similarly, control of individual panels can be a challenge in that wiring may need to be run to thousands of panels to permit each to be controlled as needed. Often the impracticality or cost of such a need makes it impractical to control individual panels and only a global level of control at either a field, sub area, or string level is practical to achieve. The present invention provides improvements that can permit individual control to be achieved in a practical manner. Thus, what at least one aspect of electrical solar power needs is an improvement in power control. The present invention provides this needed improvement.

DISCLOSURE OF THE INVENTION

As mentioned with respect to the field of invention, the invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the present invention discloses achievements, systems, and different initial exemplary control functionalities through which one may achieve some of the goals of the present invention. Systems provide for power controlled systems of photovoltaic conversion for use in high efficiency renewable energy creation or otherwise, among other aspects. Through a variety of different aspects, the invention provides remote control power techniques specifically developed for issues existing for certain types of solar power circuitry. Independently and apart from each other the invention provides: 1) a remote power management system that allows individual disconnection from a large array, 2) controlled sequenced start up solar power system, 3) a safety output system that can be controlled remotely and can permit safer handling by installers and maintenance personnel, 4) a functional control system either on site or remote such as from an administrative facility, 5) a system with the capability of pattern analysis for operational, installation, and maintenance indications, and 6) a power simulation solar power system such as for specific purposes. Each of these and other aspects is discussed below.

MODE(S) FOR CARRYING OUT THE INVENTION

As mentioned above, the invention discloses a variety of aspects that may be considered independently or in combination with others. Initial understanding begins with the fact that one embodiment of a solar energy power system according to the present invention may combine any of the following concepts and circuits including: an inverter, a converter, changeable functional control components, and a code compliant capability. Aspects may include a very high efficiency photovoltaic converter and even output voltage and/or output current protected system. Each of these should be understood from a general sense as well as through embodiments that display initial applications for implementation. Initial benefits are discussed individually and in combination in the following discussion as well as how each represents a general group of designs rather than just those initially disclosed.

Figure 1:
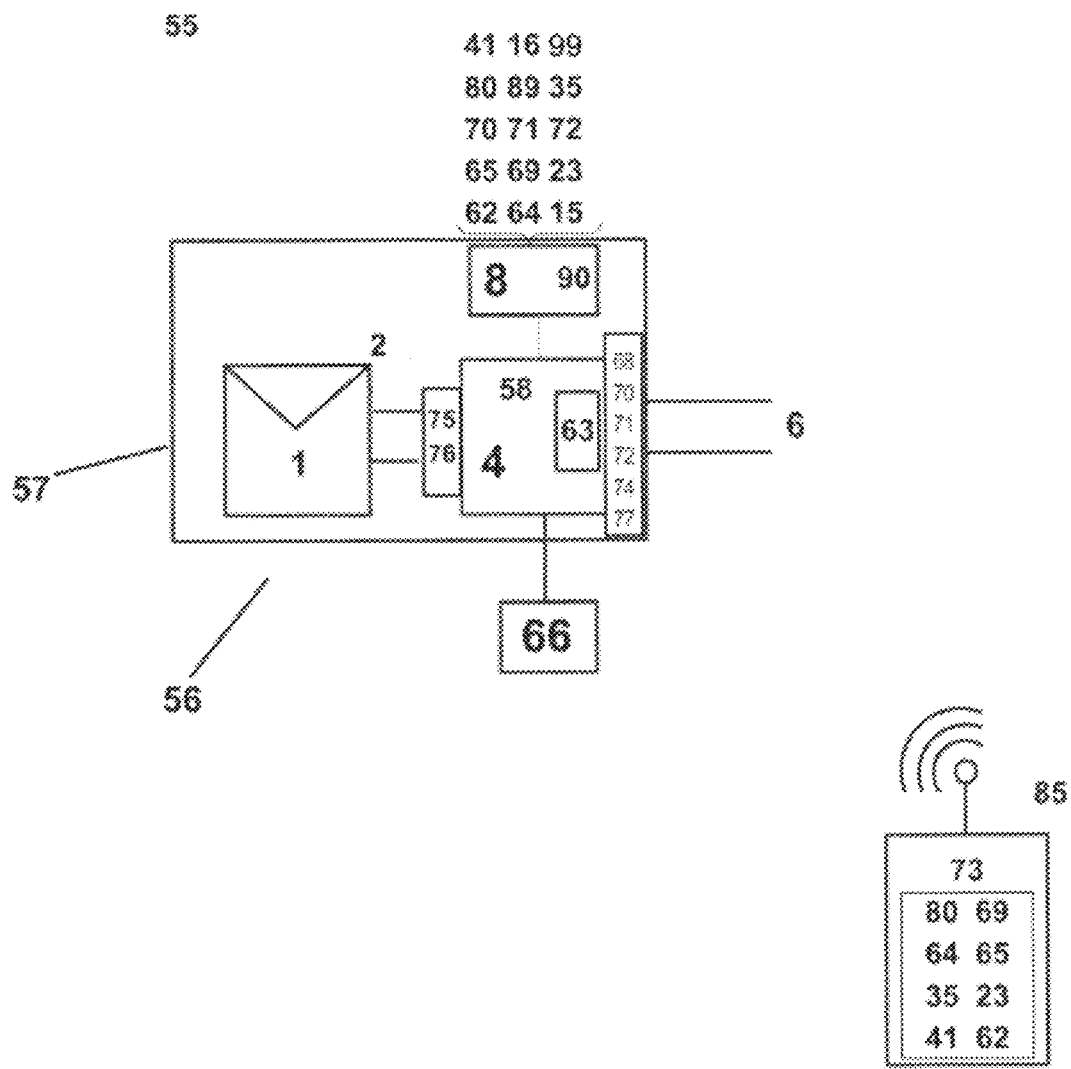
FIG. 1 shows a block diagram of a controlled system according to one embodiment of the invention for a single representative solar source.

FIG. 1 shows one embodiment of a solar energy power system illustrating the basic conversion and inversion principles of the present invention. As shown, it involves a solar energy source (1) feeding into a photovoltaic DC-DC power converter (4) providing a converted output to a photovoltaic DC-AC inverter (5) that may perhaps ultimately interface with a grid (10). As may be appreciated, the solar energy source (1) may be a solar cell, a solar panel, or perhaps even a string of panels. Regardless, the solar energy source (1) may create an output such as a DC photovoltaic output (2). This DC photovoltaic output (2) may be established as a DC photovoltaic input to the DC-DC power converter (4). Similarly, the DC-DC power converter (4) may create an output such as a DC photovoltaic output (6). This DC photovoltaic output (6), or more generally photovoltaic DC converter output, may be established as an inverter input (29) to a photovoltaic DC-AC inverter (5). Ultimately, the photovoltaic DC-AC inverter (5) may act to invert the converted DC and create an AC output such as a photovoltaic AC power output (30) which may be established as an input to a grid (10), a domestic electrical system, or both, or some other power consuming device or thing.

Solar energy systems (55) can have individual panels or may be a field of panels that generate solar energy electrical power. Systems can generate substantial solar energy electrical power output that may be nearly or above 90% of an optimal amount from any given system at any given time. This can range from a few watts to a many megawatt level. Regardless of size, however, it can be advantageous to manage the power for desired results, and this management can be a remote action. The methods of power management can range from management of individual sources, individual panels, individual strings, entire fields, or any combination of these. In many configurations, the solar energy system (55) may be made up of a collection of solar energy sources (1) assembled as a solar panel (56) that is a discrete unit defined by a photovoltaic electrical power containment (57) that electrically isolates the sources as an assembled item with a singular DC photovoltaic output (6). A photovoltaic electrical power containment (57) can be mechanical or merely electrical in nature; further it may also include within its real or conceptual boundary either discrete components or integral capabilities, perhaps such as a converter, an inverter, a control, or any other functionality. A discrete solar panel (56) and its associated DC photovoltaic output (6) can have a solar panel voltage and a solar panel current. When the solar panel (56) is, or its assembled solar energy sources (1) are, subjected to solar insolation, it will generate a substantial solar energy electrical power output. Many of these sources or panels can be electrically combined together to generate higher power or higher voltage and these connections can effectively connect the DC photovoltaic outputs (6) by some type of photovoltaic power combination circuit (59) which may even be a simple wire connection. Either at the panel level, or at their DC photovoltaic outputs, the sources can convert a high percentage of the insolation power into electrical energy and thus they can act as high efficiency sources. The DC photovoltaic output (2) is often converted from having an initial characteristic or characteristics to another and thus it is common for the step of DC converting to occur through a photovoltaic DC-DC power converter (4). This photovoltaic DC-DC power converter (4) may have varying levels of complexity and may have photovoltaic power conversion circuitry (58) that acts to achieve its desired result.

The DC-DC power converter (4) (as well as any other aspect) may have its operation controlled by a capability generally indicated as converter functionality control circuitry or a photovoltaic power functionality change controller (8). This can exist or be controlled remotely. As one of ordinary skill in the art should well appreciate, this converter functionality control circuitry or a photovoltaic power functionality change controller (8) may be embodied as true circuitry hardware or it may be firmware or even software to accomplish the desired control and would still fall within the meaning of a photovoltaic power functionality change controller (8). Similarly, the DC-DC power converter (4) should be considered to represent photovoltaic DC-DC power conversion circuitry. In this regard it is likely that hardware circuitry is necessary, however combinations of hardware, firmware, and software should still be understood as encompassed by the circuitry term.

The photovoltaic DC-AC inverter (5) may also have its operation controlled by inverter control circuitry (38) that likewise may be embodied as true circuitry hardware or it may be firmware or even software to accomplish the desired control and would still fall within the meaning of an inverter controlling step or an inverter control circuitry (38).

As illustrated in FIG. 1, the various elements may be connected to each other. Direct connection is but one manner in which the various elements may be responsive to each other, that is, some effect in one may directly or indirectly cause an effect or change in another. For example, while there could be a connection between the inverter control circuitry (38) and the photovoltaic power functionality change controller (8), effects can occur and responsiveness can exist even without the connection. In fact, in a preferred embodiment, no such direct connection is used as the effect can be caused even without such a direct connection.

Sequencing through some basic aspects of the schematic diagram, it can be understood that the DC-DC power converter (4) may act to convert its input and thus provide a converted DC photovoltaic output (6) which may serve as an input to the photovoltaic DC-AC inverter (5) which may be of a variety of designs. This photovoltaic DC-AC inverter (5) may serve as one way to accomplish the step of inverting the DC power into an inverted AC such as a photovoltaic AC power output (7) that can be used by, for example, a power grid (10) through some connection termed an AC power grid interface (9). In this manner the system may create a DC photovoltaic output (6) which may be established as an input to some type of photovoltaic DC-AC inverter (5). This step of inverting an input should be understood as encompassing and creation of any substantially alternating signal from any substantially unidirectional current flow signal even if that signal is not itself perfectly, or even substantially, steady.

Figure 2:
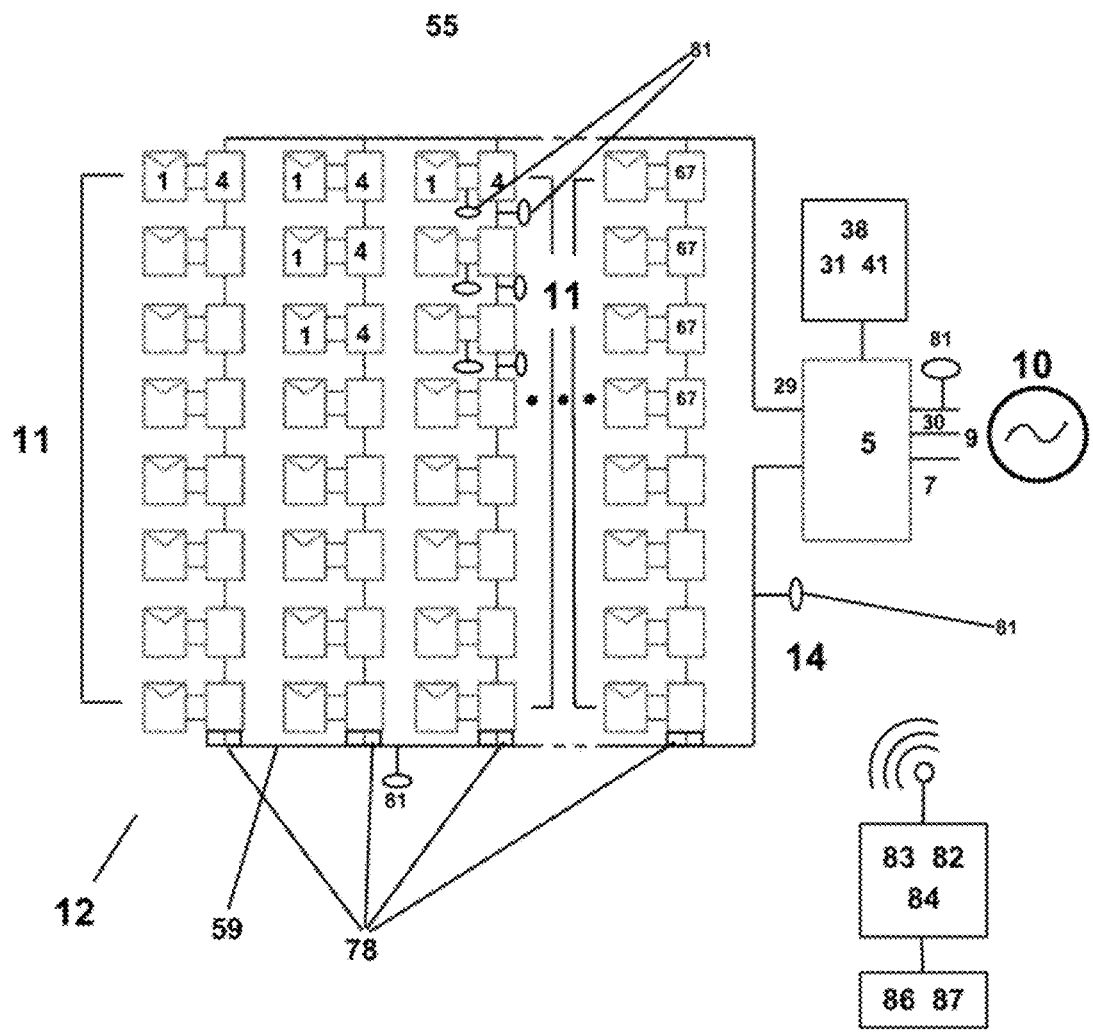
FIG. 2 shows a schematic of a sea of interconnected strings of panels according to one embodiment of the invention.
Figure 5:
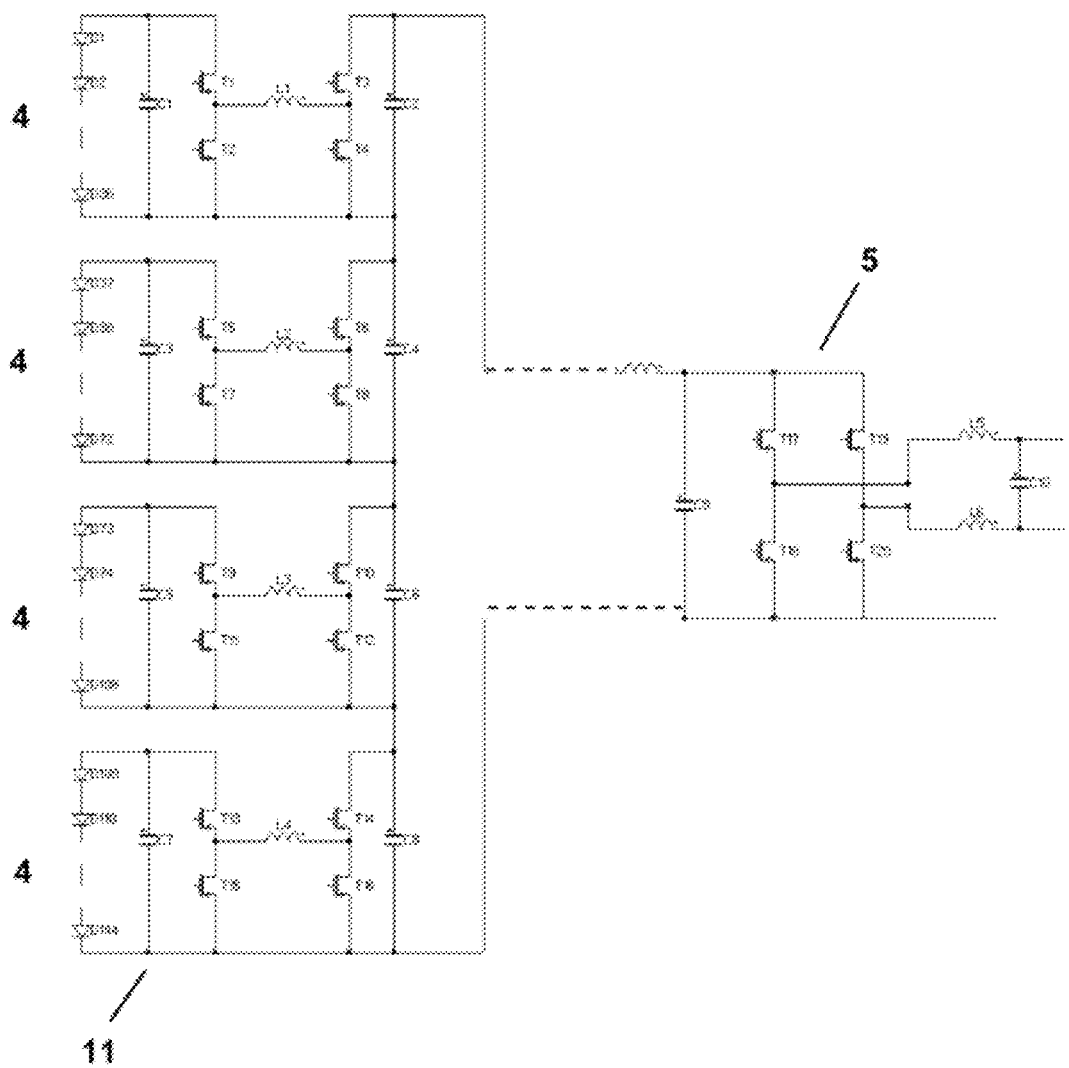
FIG. 5 shows an embodiment of the invention with series connected panels and a single grid-tied inverter configuration.

As shown in FIGS. 2 and 5, individual solar energy sources (1)—whether at a cell, panel, or module level—may be combined to create a series of electrically connected sources. When solar panels (56) are connected together to achieve higher voltages or powers, a solar panel string (11) may be created. This may be a simple serial connection of outputs and may result in a solar panel string current, a solar panel string power, and a solar panel string voltage. When converted outputs exist, it may be desirable to serially connect photovoltaic DC-DC power converters (60) into a string of electrical series responsive DC-DC converted solar panel outputs. Of course, combinations may be responsive through either series or parallel connections. As shown in FIGS. 2 and 5, the connected plurality may form a string of electrically connected items, perhaps such as a string of electrically connected solar panels (11). As shown in FIG. 2, each of these strings may themselves be a component to a much larger combination perhaps forming a photovoltaic array (12) or even a sea of combined solar energy sources. By either physical or electrical layout, certain of these cells, panels, or strings may be adjacent in that they may be exposed to somewhat similar electrical, mechanical, environmental, solar exposure (or insolative) conditions. In situations where large arrays or seas are provided, it may be desirable to include a high voltage DC-AC solar power inverter perhaps with a three phase high voltage inverted AC photovoltaic output as schematically illustrated in FIG. 2.

As illustrated for an electrically serial combination, output may be combined so that their voltages may add whereas their currents may be identical. Conversely, electrically parallel combinations may exist. FIGS. 2 and 5 illustrate embodiments that are connected to accomplish serially combining or serially connecting items such as the converted DC photovoltaic outputs to create a converted DC photovoltaic input to a photovoltaic DC-AC inverter (5). As shown, these serial connections may be of the converted DC photovoltaic outputs which may then create a converted DC photovoltaic output which may serve as a converted DC photovoltaic input (14) to some type of photovoltaic DC-AC inverter (5) or other load. Again, each solar energy source (1) may be a solar source such as at the cell, panel, string, or even array level. As would be well understood, parallel connections and the step of parallel connecting converters or their outputs could be accomplished as well.

As mentioned above, circuitry and systems can be configured to extract as much power as possible from a solar energy source (1). This is especially applicable for a solar power source or sources, and particularly so for solar panels (56), where insolation can be variable from source to even adjacent source. Electrically, high efficiency may be accomplished by achieving operation at one or more solar cell's, panel's, or string's maximum power point (MPP) by MPP circuitry or maximum power point tracking (MPPT). Thus, in embodiments, a solar power system according to the invention may include an MPPT control circuit with a power conversion circuit. It may even include range limiting circuitry as discussed later, and significant to embodiments of this invention is that it can be used with MPP-based systems to achieve high efficiencies.

Figure 3:
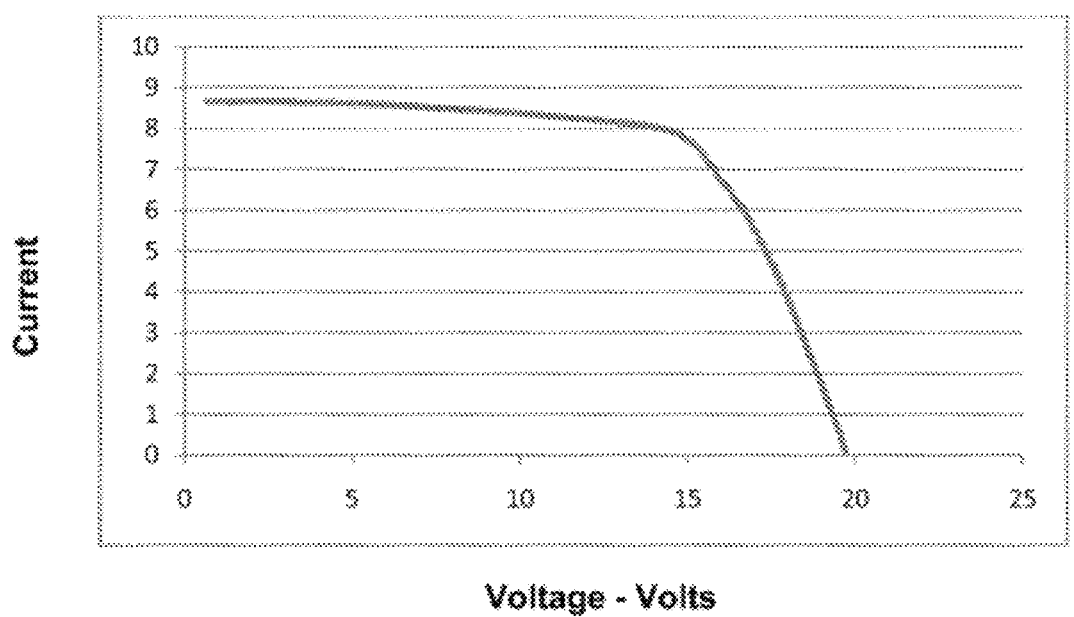
FIG. 3 shows a plot of a current and voltage relationship for a representative solar panel.
Figure 4:
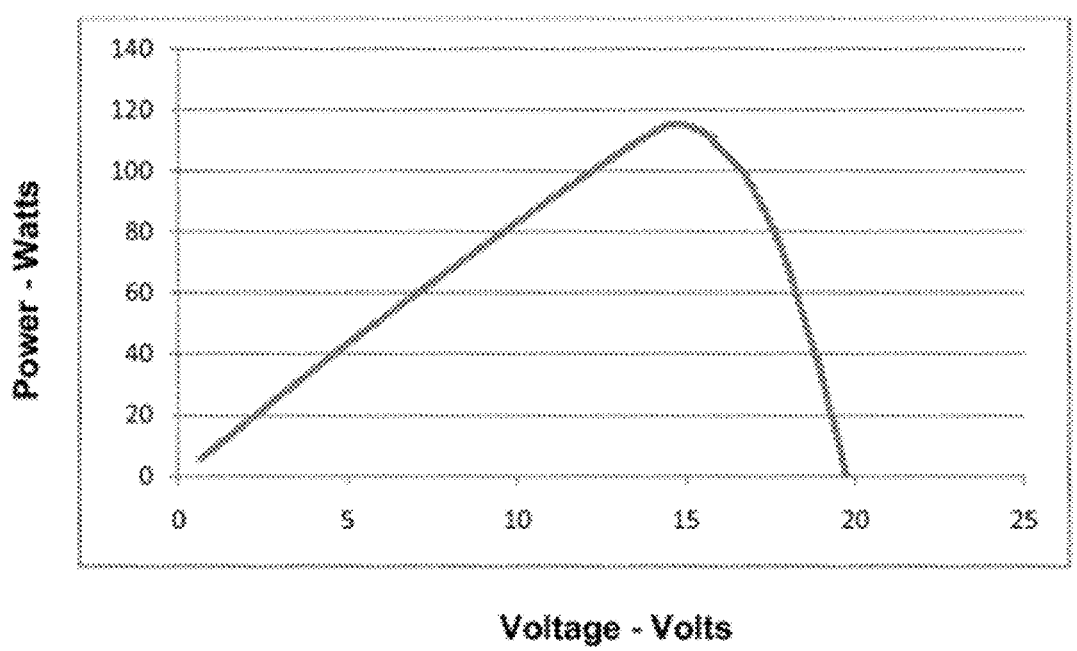
FIG. 4 shows a plot of a power and voltage relationship for a similar panel.

This aspect of maximum power point operation is illustrated by reference to FIGS. 3 and 4 and the Maximum Power Point Tracking (MPPT) circuit may be configured to find the optimum point for extracting power from a given panel or other solar energy source (1). As background, it should be understood that a panel such as may be measured in a laboratory may exhibit the voltage and current relationships indicated in FIG. 3. Current in Amps is on the vertical axis. Voltage in volts is on the horizontal axis. If one multiplies the voltage times the current to derive power this is shown in FIG. 4. Power is now on the vertical axis. The goal of an embodiment of an MPPT circuit as used here may be to apply an appropriate condition to a panel such that the panel may operate to provide its peak power. One can see graphically that the maximum power point on this panel under the measurement conditions occurs when the panel produces approximately 15 volts and 8 amperes. This may be determined by a maximum photovoltaic power point converter functionality control circuitry (15) which may even be part or all of the modality of operation of some functionality control circuitry, of a converter, of converter functionality control circuitry, or even more generally, of photovoltaic power functionality change controller (8). As but one example, when achieved in or as part of the conversion process, the converter or the step of converting may provide a maximum photovoltaic power point modality of photovoltaic DC-DC power conversion. This may be accomplished by switching and perhaps also by duty cycle switching at the converter or even inverter level and as such the system may accomplish maximum photovoltaic power point duty cycle switching or the step of maximum photovoltaic voltage determinatively duty cycle switching.

In terms of achieving high efficiency, the MPP capability can be achieved for individual panels or more generally, sources. Each solar panel (56) may have its own individually panel dedicated maximum photovoltaic power point converter functionality control (16). This can occur as part of the process of individual panel DC converting the output or perhaps as part of the process of individual panel DC-AC inverting the output. Regardless how implemented, all that may be necessary is that at some level each power source or items of electrical power generation has its own capability to achieve its own MPP as distinct from another item's own MPP. Thus, when embodied at a panel level, systems may have individually panel dedicated process capability. When implemented through either a hardware or software process control, there may be maximum photovoltaic power point control circuitry (15) that is individual and perhaps independent from other such controls.

Figure 7:
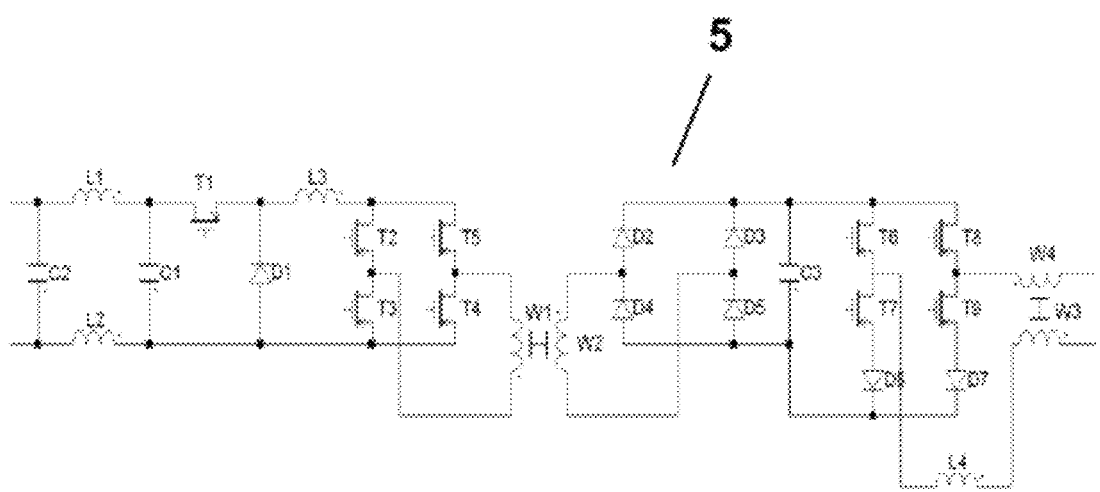
FIG. 7 shows a prior art system with a grid-tied inverter.

FIG. 7 illustrates one type of photovoltaic DC-AC inverter (5) that may be used. Naturally as may be appreciated from the earlier comments enhanced inverters that need not control MPP may be used. In one aspect of the invention, the inverter may have its input controlled at an optimal level. For example, a separate control input could be used so that the input voltage is at a most optimal level, perhaps such as a singular sweet spot or the like as discussed in the referenced patent disclosures.

As mentioned above, various elements of a solar energy system (55) may have operation controlled for a desired result by a functionality control circuitry. This may encompass localized or physically separate hardware or software at any level. Thus, such a capability can be indicated elementally in a general sense as a photovoltaic power functionality change controller (8). A photovoltaic power functionality change controller (8) can be any capability that alters or merely controls operation to achieved a desired result, whether it be maintaining MPP, avoiding undesired parameters, achieving safety, facilitating installation or connection, or otherwise. A photovoltaic power functionality change controller (8) can act to alterably control electrical operation of one or even a number of solar panels (56). This can be achieved by controlling switching, by electrically transitioning operational modes, or by generally controlling an output. In various embodiments, voltage, current, power, or any other parameter can be controlled at a source, panel, string, or other level. As but some examples, when embodied or implemented at a panel level, a photovoltaic power functionality change controller (8) may present a solar panel voltage, current, or power functionality controller. At a string level, systems may present a photovoltaic power functionality change controller (8) such as a solar panel string current functionality controller or a solar panel string voltage functionality controller. As may be appreciated from the above discussion, such control can be achieved at converter or inverter levels. At an converter level, the photovoltaic power functionality change controller (8) can be a solar panel converter current functionality controller, a solar panel converter voltage functionality controller, or a solar panel converter power functionality controller to name a few. As another more specific example, at an inverter input level the photovoltaic power functionality change controller (8) can be a solar panel inverter input current functionality controller, a solar panel inverter input voltage functionality controller, or a solar panel inverter input power functionality controller to name a few. The photovoltaic power functionality change controller (8) can alter between different modes of operation or control so there can be an alterable power functionality, an alterable power conversion-functionality, or an alterable power inversion-functionality. This can be used to control output.

Figure 8A:
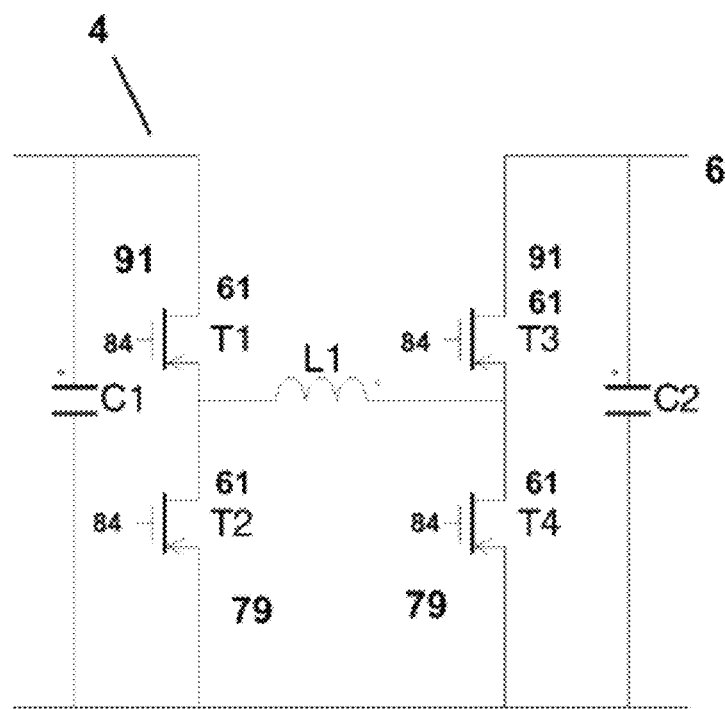
FIGS. 8A and 8B show two types of dual mode power conversion circuits such as might be used in embodiments of the invention.
Figure 8B:
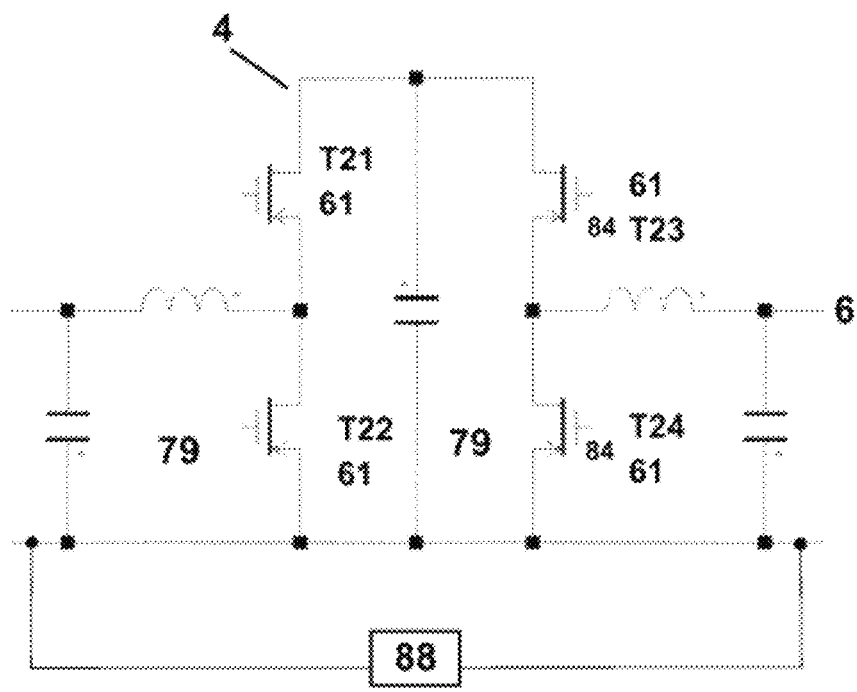

As mentioned in the present inventor's incorporated patent applications, switching converters can be used. Two types of implementations for such photovoltaic DC-DC power converters (4) are shown in FIGS. 8A and 8B. Some architectures may combine a PV panel with MPP and even a dual mode power conversion circuitry to make what may be referred to as a power conditioner (PC) element. As discussed, the power conditioners may be combined in series or parallel or any combination of series/parallel strings and even seas of panels that may produce their full output. Even differing types of panels, differing types of converters, and differing types of inverters may be combined.

Whether control is achieved at a converter or inverter level or otherwise, in switching elements such as controlling individual solar panel transistors (61), control may be achieved by hardware or software control. For a converter, this may be achieved by controlling individual panel DC-DC converter transistor switching or by controlling switching of at least one the DC-DC power converters (4). Thus systems can be considered as having converter functionality control circuitries (62) which may represent hardware or software combinations. For individual panel level control, there may be individually panel dedicated photovoltaic power functionality change controllers (8) and these may be associated with individually panel dedicated photovoltaic DC-DC power converters (4). As mentioned elsewhere in this and the incorporated patent disclosures, limit controlling can occur to avoid undesired parameters and this can occur at the step of DC converting perhaps by having systems that achieve a method of power conversion-alteration.

One aspect that may be desirable is for embodiments to include an ability to be totally disconnected so there is no output even in instances in which insolation is impinging on a solar panel or source. This can be achieved in a variety of ways and may be initially understood in reference to the photovoltaic DC-DC power converter (4). Consider embodiments that utilize individual panel photovoltaic DC-DC power converters (4) where these devices involve a variety of switches such as individual solar panel transistors (61). In these types of embodiments, it may be desirable through either a localized determination or setting or even some type of remote control, to totally disconnect the output such as to safeguard an installer or maintenance handler or the like. When accomplished at a converter level, embodiments can have a converter switch disconnect (63) that literally makes an output turned off even if solar insolation exists. This can be accomplished by simply appropriately switching individual solar panel converters off and so embodiments may include individual panel dedicated converter functionality control circuitries and their individual control processes.

Again, considering the converter level as but one example, embodiments can include a photovoltaic power functionality change controller (8) or a separate element that acts as a disconnect control; perhaps such as a converter switch disconnect control (64). This converter switch disconnect control (64) can act as a converter inoperability switch disconnect control or may be a converter inoperability switch disconnect controller to operate one or more DC disconnects (67). DC disconnects (67) may be any type of a switch or disconnect, including but not limited to, transistors, relays, and even relays that provide galvanic isolation. Of course other elements can be similarly present and can be similarly controlled if desired. In elements that include solar panel transistors (61), such may be field effect transistors and thus photovoltaic power functionality change controller (8) or a separate element can act as a photovoltaic DC-DC converter field effect transistor controller so as to control field effect transistor switching within the solar energy system (55) or perhaps of one or more photovoltaic DC-DC power converters (4). This can be accomplished by merely controlling switch timing such as by a field effect transistor timing controller (65). When acting at least some times with regularity, systems can be considered as having duty cycle switch control circuitry (31), which again can be implemented as hardware, software, or some combination of both.

As may be appreciated from the aspect of individual control such as individual MPP control, disconnection can be achieved independently at a source, panel, string, or other level. Thus, embodiments can include the capability of independent electrically DC disconnecting some element. This may be apart from a DC-AC inversion and so embodiments may present the capability of independent electrically DC disconnecting within the solar energy system (55) or also independently switching a DC output. Thus, at least a portion of the DC photovoltaic outputs (6) can be electrically disconnected. At a panel level, embodiments may have individual solar panel output DC disconnects (67). These may be configured to be controllable and there may be a photovoltaic power functionality change controller (8) or a separate element that acts as an individual solar panel disconnect control or for individual panel controlling of at least one solar panel disconnect. For safety considerations, this can be accomplished within the photovoltaic electrical power containment (57) or at some similarly appropriate locations and thus embodiments can achieve the process of integrally individually disconnecting an output.

Disconnection of an output can also be a safety issue and so there can be elements or capabilities that assure the existence of a disconnect state and even assure that sources or panels are not inadvertently switched on. Embodiments can include an independent output DC disconnect position authentication element (66) that determines a disconnect position or configuration apart from the mere prior existence of an appropriate control command.

In disconnecting an output, transitions between states can occur. On and off states can exist in various configurations, for example, these may be considered as an operational state condition (on) or an interrupt state condition (off). Thus in embodiments where there is individual panel disconnect control, the processes of individual panel controlling an operational state condition and individual panel controlling an interrupt state condition can be included such as for a solar panel disconnect or the like. On and off states can similarly involve a solar panel disconnect state set control (69). This may be considered as a solar panel disconnect operational state set control to permit the solar panel (56) to become operational at an appropriate time or times. These times may be incidental to normal operation, incidental to maintenance, or even incidental to installation or changing of the system in some manner. For instance, systems may have the capability of establishing an individual panel installation state condition such as off to facilitate safe handling of the panels, sources, or the like.

Merely switching a disconnect such as individual solar panel output DC disconnects (67) can present challenges because there are times such as night, shipping, or the like, when there may be no power available and state maintenance or assurance can be difficult. Thus, embodiments may need to achieve a reliable or recallable state condition, perhaps such as by establishing a solar panel pre-power disconnect state condition such as a condition (e.g., off) that exists any time power or output is not generated. A pre-power disconnect state condition can be a safety enhancement that either through appropriate power down, low power, or nighttime control, or through automatic control perhaps such as when a fault occurs, or both, is established. Systems can include a solar panel disconnect pre-power set control and in some embodiments, this could be configured to operate injunction with a solar panel disconnect pre-power state recall so that systems can process for recalling a solar panel pre-power disconnect state condition. This may be through non-volatile memory or the like.

Similarly, embodiments can establish a solar panel power-up disconnect state condition or there can be a solar panel power up disconnect control that achieves a desired state condition in instances of power up, either initially or even every morning. This can be accomplished locally, globally, or from a distance and there can be systems that have a solar panel power up disconnect set control, solar panel repower disconnect set circuitry (70), a solar panel disconnect state recall (77), and even solar panel repower disconnect state recall circuitry (71) to establish a solar panel repower disconnect state condition or for recalling a solar panel repower disconnect state condition. Again each of the foregoing functions can be accomplished by hardware, software, or even a combination of both. In systems that can become aware or perhaps even sense a low power situation, there can be a capability to act appropriately upon such a condition. Systems can even be capable of using an unusually low amount of power to achieve or confirm appropriate disconnect state status. This level of power can be such that far before a danger is posed, the system uses the limited amount of power available to switch itself off or to confirm that a prior state setting exists. Further, embodiments could have such capability or elements configured to accept some power even prior to a conversion capability or element so that any losses or power needs of conversion would not reduce the capability available or reduce the level at which such a result could be achieved. Configurations could utilize pre-conversion solar panel power such as electrically prior to a photovoltaic DC-DC power converter (4) or the like. Thus, embodiments can present low power generation controlling of a solar panel disconnect in a variety of configurations and can have a low power generation solar panel disconnect control perhaps as part of a photovoltaic power functionality change controller (8) or as a separate element. This can be achieved when there is only indirect insolation, perhaps such as when in shade, at twilight, or otherwise and so systems can have an indirect insolation power generation solar panel disconnect control perhaps that may utilize indirect insolation power for its desired result.

Regardless how configured, a disconnect control can function in conjunction with a resettable solar panel disconnect state set control or as part of a step of operating a resettable solar panel disconnect state set control. It can also function in conjunction with a memory or setting indication that acts to permit recalling a solar panel disconnect state condition or as a resettable solar panel disconnect state set control. This can occur via electronics or mechanically, perhaps such as by dip switches, jumpers, or the like and so systems can have a mechanical solar panel disconnect installation state set control (68) that can act to mechanically establish an individual panel. Some such systems can take into account the cost and/or operational practicalities of not requiring a battery or continued source of energy to recall or control the existence of a condition, thus systems can have a non-energy storage solar panel disconnect state recall that maintains some type of state information regardless of the application of power to the system. This may involve a prior state or just a default state (such as off) and can occur via electronics or mechanically, perhaps such as by dip switches, jumpers, or the like and so systems can have a non-battery solar panel disconnect state recall or a non-energy storage disconnect state recall. Any such systems can be power tolerant in that they can maintain, achieve, or confirm a condition even if they lose power, perhaps even for an extended period of time, thus embodiments may include a power tolerant solar panel disconnect control (76) that may even for some embodiments power tolerantly establish a solar panel disconnect state condition.

One aspect that can be helpful in presenting a safely handle-able system can be the aspect of providing a system that has a default condition that is safe, such as a default off condition. This aspect can be achieved by controlling a selected default position solar panel disconnect that automatically (whether mechanically, by electronics, or by software control) is controlled to or achieves a selected default position and thus the system may include a controlled selected default position solar panel disconnect. This may be an open default position solar panel disconnect (72) or the system may have an open default position solar panel disconnect control. Such may be individual or total and systems may be configured for defaulting to an open switch state for all or only a portion of the DC photovoltaic outputs (6) to effectively control the danger of an output or to accommodate connection of differing panel types or capabilities. Thus some or all of the panels may have a nominally open individual solar panel output DC disconnect or may have some capability to control to achieve operating a nominally open individual solar panel output DC disconnect, that is a disconnect that whether mechanically, by electronics, or by software control achieves an off or disconnected state upon some or any number of different types of situations. For systems that include elements that have field effect transistors, there may be one or more individual panel controlling a field effect transistor default open disconnects and there may be a field effect transistor default open disconnect control. As mentioned above, all of the foregoing may exist in power off or low power situations, through inclusion of a power off default open solar panel disconnect control or the like.

At situations of manufacture or assembly of the solar panels (56) or installation or change of the solar energy system (55), establishment of a safety condition such as an off state can be helpful and thus there may be an ability for individual panel controlling a manufacture state condition or an installation state condition. There can be a selected default position solar panel disconnect control that establishes the panel off or otherwise, and so there can be a solar panel disconnect installation state set control (73) and even a solar panel disconnect manufacture state set control (74).

As mentioned, elements can be controlled to limit an electrical parameter for some desired result. This can be to protect components, to protect operators, to comply with electrical code requirements, to remove a problematic component from the system without disrupting operation, or for other reasons. The electrical parameters that can be considered are, of course varied by the situation. A disconnect may be use upon reaching or approaching a particular limit and so the individual solar panel output DC disconnects can present a similar variety of disconnects. A few examples of the type of disconnects that can be included may be any individual or combination of disconnects including, but not limited to: a limited mode solar panel output DC disconnect, a disconnect that is responsive to sensing at least one photovoltaic power condition, an individual solar panel maximum voltage DC disconnect, a maximum current disconnect, or practical maximum voltage or current individual solar panel disconnects, practical maximum voltage limited disconnecting, to name a few. Further, disconnects may be integral to a photovoltaic electrical power containment (57) such as to enhance operator or handler safety. Thus, embodiments may include the capability of limited mode integrally individually disconnecting or even individual solar panel maximum voltage limited integrally individually disconnecting at some level. This can occur at individual panels or other sources and any disconnection function can be controlled to merely remove a component, thus it can permit electrical sequestration of a potentially problematic component or otherwise. Naturally, disconnecting can occur or be controlled with reference to a variety of conditions or locations. As but one example, such could be electrically prior to, or even coincident with, any process of DC-DC converting or a photovoltaic DC-DC power converter (4), and the system can even have a pre-conversion solar panel disconnect (75) or a pre-conversion solar panel disconnect control input.

As mentioned above, assuredly providing a safely operable condition can be important to certain embodiments of the invention. This can include providing the capability for operability and non-operability. Generally, embodiments of the invention can include an ability to change between different operating modes and so there may be included one or more interchangeable DC photovoltaic safety output condition solar energy sources. Such sources may have the ability to transition between or to be controlled to achieve differing safety output conditions and the source can be processed for transitioning the interchangeable DC photovoltaic safety output condition or conditions. Such conditions can generally include a first DC photovoltaic safety output condition and a second DC photovoltaic safety output condition. These may be a safety output operable condition in which a desired output of some sort is permitted or perhaps switched on, and perhaps a safety output interrupt condition in which an output is prohibited or perhaps switched off. The transition may be controlled by a photovoltaic safety output condition transition controller (99) and in systems where independent panels are switchable, this photovoltaic safety output condition transition controller may even be a panel independent photovoltaic safety output condition transition controller so that differing panels or the like can be treated differently or at least independently. By focusing on a condition of a specific item or at a specific location, perhaps such as a converter output, the controller can be configured as one or more types of controllers, in this example, such as a photovoltaic converter output condition transition controller.

In configurations of the invention that include devices involving field effect transistors, it can be convenient to control one or more field effect transistors to achieve the desired goals. With respect to transitioning between conditions, one way to achieve this is through a photovoltaic safety output field effect transistor switch controller that controls one or more field effect transistors. This can occur at individual panel or other levels and at a converter or other component level, the latter such as through an individual panel photovoltaic DC-DC converter field effect transistor switch controller. For configurations that cause converter field effect transistors to be switched in a way that make an output inoperable, the controller may be considered as an inoperability photovoltaic DC-DC converter field effect transistor switch controller. Inverters can be similarly controlled so there can also be a photovoltaic inverter output condition transition controller.

As may be appreciated from the discussion regarding safety and also that of potential component problems, there can be included one or more sensor (81). Sensors (81) may be conceptually reactive to or even physically located at a variety of locations or conditions and generally, such are considered as electrically contrary solar power condition sensors. These may detect any electrical condition that might be electrically contrary to that anticipated or desired and as a result it or they may provide information upon which a control such as converter functionality control circuitry or a photovoltaic power functionality change controller (8) can base (even if only partially) a decision. This decision can be to electrically disconnect an item or group of items in response to the sensing event and may even be made based on a process of remotely comparing performance values. Comparisons can be made within a string or outside of it and so there can be either the capability or both the capability of comparing inter-string performance values comparing intra-string performance values or inter-string values.

In string disconnect arrangements or decisions, an individual panel string deenergization may be effected perhaps by an individual string panel deenergization control. Components or groups of components can even be sequestered electrically from the system and the system can continue operation, albeit perhaps in some reduced output configuration. Thus there can be included the process of individual panel string sequestration controlling of at least one solar panel or other disconnect or even an individual string panel sequestration control (78). More generally, processes can include individually disconnecting any component. For a converter, there can be inoperability DC-DC converter transistor switching by some transistor disconnect control. Focusing on the converter operation as but one way to achieve this, this inoperability can be accomplished as part of the function of DC converting. For certainty of operation since component failures can exist, in this converter example, this can be accomplished by DC-DC converter total transistor switching to assuredly stop operation. Thus a photovoltaic DC-DC power converter operation controller (80) or a photovoltaic DC-DC power converter output controller or a photovoltaic DC-DC power converter switch controller can act to cause the desired effect. It can also be accomplished to operate only the parallel converter switches (79) or the series converter switches (91) and so there can be a parallel converter switch disconnect control, a series converter switch disconnect control, or both, or the like. The aspect of disconnecting a source should be understood in a broad sense, so that the action of disconnecting and the disconnect element(s), such as the DC disconnects (67) can have many different functions beyond merely switching off an item. As but one example, in a series string, a bypass diode can be used to provide a current path for the remainder of the string. Such a diode could be as shown in FIG. 8B as item T24. This type of diode can be separately supplied or it may be a parasitic element of a field effect transistor switch. Short circuit disconnect functions can also be used in appropriate circumstances. Any of this can occur an individual panel level such as to make at least one individual solar panel converter, inverter, or other component inoperable and so processes can include items such as independently electrically discontinuing the process of individual panel DC-AC inverting, or the like.

Any such action can be based on a variety of factors or parameters and so the sensors (81), whether physically or only conceptually existing, and achieve sensing of a high current condition anywhere within the solar energy system (55), sensing of a high voltage condition, sensing of a photovoltaic DC-DC power converter voltage input, sensing of a photovoltaic DC-DC power converter voltage output, and more generally, simply sensing of an electrically contrary solar power condition. This condition can exist at a string level or other level at some point within the solar energy system (55) and so there can be reaction to an internal string or external string condition, and systems can include an external-string reactive power functionality controller for example for reacting to an external-string reactive power condition or the like.

There may be individual panel solar power condition sensors and individually panel sensing of an electrically contrary solar power condition. There may also be sensors that act to detect a fault or even a ground fault and so there can be one or more ground fault solar power condition solar power condition sensors. Whether as a result of a ground fault or otherwise, there can be an arc interrupt control and there may be more generally a high current solar power condition sensor or a high or even low voltage solar power condition sensor. A controller that can utilize this type of input somehow can even be considered as a panel fault reactive power functionality controller, and processes can include sensing a ground fault solar power condition and likely reacting to a solar panel ground fault condition. In situation where there could be an arc, reaction can be very fast and so there can be the capability of interrupting an arc while it is forming or progressing and so there can be a capability to act mid-arc and interrupt that potential or real arc condition within the solar energy system (55).

Systems can also react to a situation of reverse bias such as when one panel in a string is not able to provide an adequate output and so disconnect state protection circuitry can include reverse bias disconnect state protection switches or circuitry so that there can be reverse bias disconnecting of a potential drain even if protected to some degree by diodes.

As mentioned above, for safety, redundancy or even secure control can be beneficial and thus any safety output can include a redundant photovoltaic safety output condition transition control or even a secure photovoltaic safety output condition transition controller such as might require a password, be encrypted, or otherwise avoid the possibility of unintentional or even malicious activity. These may exist for independent individual solar panel output DC disconnects. Finally, in instances in which an unanticipated activity such as shut off of a particular component occurs, there may be an indication of the event. This can include a local or a remote reporting. This reporting can include reporting one or more operational indications. Thus systems may include a remote safety output condition reporter element that reports to a remote location, perhaps even the internet (secure or otherwise) so a corrective or otherwise appropriate action can be taken and then the output can be re-established if or when appropriate and the system can then cause a substantially full solar energy source photovoltaic output, that is the desired amount in any particular condition. Re-establishing a connection of that particular source or sources can be dependent on permissible conditions and so there can be a condition dependent solar energy source connection control.

Another aspect of the invention is the possibility of considering inverter factors in the output of the converter. Although discussed in more detail in other solar power patent disclosures of the present inventors, it is known that some inverters can have a level of voltage input at which the inverter achieves its inverting most efficiently. This is often referred to as the inverter input sweet spot and it is often associated with a specific voltage level for a specific inverter. Aspects of the invention can be included even with the capability of providing a photovoltaic inverter sourced controlling operation. This can include providing a set point or perhaps substantially constant voltage output as the inverter input (29). By this capability inverter input may be maintained independent of and even without regard to a separately maintained MPP level of operation. As mentioned in the referenced disclosures, voltage levels can be achieved through duty cycle switching of either or both the photovoltaic DC-DC power converter (4) and/or the photovoltaic DC-AC inverter (5). This duty cycle control can be used to facilitate aspects of the present invention, too.

Of significant importance is using the aspects of the invention with systems that have a high level of efficiency. As discussed in the referenced patent disclosures, efficiency gains can be accomplished by switching operation of transistor switches in unique topologies. Systems that do not substantially change the form of power into heat rather than electrical energy can have efficiency as high as about 99.2% efficiency. As the referenced disclosures discuss, operation can be at levels of from 97, 97.5, 98, 98.5 up to either 99.2 or essentially the wire transmission loss efficiency (which can be considered the highest possible). The combined ability to operate the inverter at its most efficient, sweet spot while simultaneously operating the panels at their MPP can be provided with aspects of the invention.

One aspect of embodiments of the invention that can provide significant operational and management advantages can be the capability to remotely effect a functional change or remotely effect a power functionality change or transition. This can be achieved through inclusion of a remote power functionality change controller. This can be wired or can even be, as shown in FIGS. 1 and 2, a remote power functionality change controller configured as a wireless device. Any such device can effect functional changes including but not limited to operation of a solar panel disconnect and it is in this last type of operation that it is conceptually discussed as a radio transmission individual solar panel disconnect control (85) in FIG. 1 and as a remote individual solar panel disconnect control (82) in FIG. 2 each of which may be a type of remote power functionality change controller. Regardless of how configured, embodiments can generally include an ability or device that can remotely cause power control changes (disconnect or otherwise) in one or more sources, panels, or strings, whether individually, globally, or in groups.

A remote control capability can be fixed or programmable. It can be altered by a manufacturer, installer, user, or maintenance personnel in a limited of predetermined ways, perhaps such as by menu selection, or even in entirely flexible ways. It can also be programmable at individual or grouped levels. Thus, embodiments can include a programmable power functionality controller (86) that can programmably control some type of electrical operation. For example, an individual solar panel programmable power functionality controller can be provided to act at an individual panel level or otherwise. For users, a user programmable power functionality controller can be provided, for maintenance personnel, a maintenance programmable power functionality controller can be provided. In instances where different makes, models, or even types of components are hooked together, such as to provide a growing power capability system (as many are), embodiments can accommodate such changes not only by the disconnect control mentioned earlier, but by providing a programmable solar energy source connection control, perhaps such as a solar panel model programmable power functionality controller that can set programming appropriate to a particular model or even serial number of an installed component or perhaps combinations of installed components. Thus, embodiments can provide a disparate component integratable system and even method of generating disparate component integratable solar power. Controllers can thus be considered as a solar panel model characteristic power functionality controller perhaps with a solar panel model input capability.

Embodiments can have a remotely programmable functionality that can remotely control operation of one or more solar panels in individual, grouped, string limited, or even global manners. For example, focusing at a string level, such as for a string of electrically connected solar panels (11), a physically distant activity can cause remotely directing a multi-panel functional change. This can, of course, be a variety of changes ranging from, but not limited to: remotely controlling a solar panel string current functionality, remotely controlling a solar panel string voltage functionality, remotely controlling a photovoltaic DC-DC power converter operation, remotely controlling an aspect of electrically transitioning such as from one condition to another, remotely controlling switching one or more DC-DC power converters, remotely controlling a solar panel inverter input current functionality, remotely controlling a solar panel inverter input power functionality, remotely controlling a solar panel inverter input voltage functionality, remotely controlling switching of one or more field effect transistors, or even just remotely controlling switching timing to achieve a desired effect. Remote control of the disconnects mentioned earlier can be achieved as well and these can occur or be controlled at a individual or group level, thus systems can achieve remotely controlling individual operation of number of solar panel disconnects or even just remotely disconnecting a DC output of one or more solar panels. As mentioned, this can be achieved at the converter or even inverter level, thus systems can have a variety of configurations, including but not limited to configurations which act to remotely effecting converter switch inoperability and remotely controlling a solar panel voltage functionality. Of course the reporting mentioned earlier can be included incidental to the remote control functionality and there can be an ability to remotely report an action or occurrence subsequent to that step taking place, perhaps such as remotely reporting an independently electrical DC disconnect event.

As mentioned, the feature of remotely controlling the solar panel or power functions can be wired or wireless. When wireless controlling operation of solar panel disconnects, the radio transmission individual solar panel disconnect control (85) can be distantly located. It may of course be internet connected so it could be anywhere in the world. More than likely, however, it is advantageous to have such a control located at a centralized facility that oversees the entire panel field, panel sea, or the like. Such a capability can be through a centralized, multi-panel remote power functionality change controller or by centrally directing a functional change. This can also be an administrative location, that is one that handles operation of at least some functions of the overall field, and thus embodiments can include an administrative panel sea facility control (83). Various configurations can be used and these can include a mesh system of communication, a Zigbee type of arrangement, or more generally, just a multi-panel remote power functionality change controller.

As mentioned above, two factors can be present in such a system. First, since disconnect status can present a safety issue; a redundant or otherwise confirmational control protocol can be utilized. Second when including radio communication there can be a desired for a secure communication capability to avoid inadvertent actions or even malicious actions. The secure aspect of this can involve passwords, encryption, or other aspects to avoid outside interference to achieve the process of securely commanding a transition or other operation. The confirmational capability can be by providing some type of control-independent output DC disconnect position information element that provides position information apart from the mere fact that a control message has been sent. This can act to independently confirm a position of a solar panel disconnect to assure that the desired action was, indeed, accomplished. Confirmation can occur by independently authenticating a position of a solar panel disconnect. Thus systems can have the radio transmission individual solar panel disconnect control (85) or the remote individual solar panel disconnect control (82) configured as a radio transmission fail-safe solar panel disconnect control or a remote individual fail-safe solar panel disconnect control, as but two examples of the many fail-safe devices or processes that can be included.

As mentioned above, there can also be a redundant control in some embodiments. Such a control can be a redundant photovoltaic safety output condition transition control, or a redundant disconnect control and, while note limited to this context, it is from this perspective that such a need is easy to understand. With respect to a disconnect, it may be desirable to have an ability to shut a system off apart from a central control capability. For example, maintenance personnel may need to assuredly disconnect a panel so that any control is slaved to the control indicated by their desires. This may occur by a secondary controller that may be hardwired, mechanical, or even a separate portable remote control unit that can control the immediate panel of interest through a global, specified, limited distance, or other command capability. Thus, embodiments of the solar energy system (55) may include an independent secondary solar panel disconnect control and by operating such a secondary solar panel disconnect control, the maintenance personnel may be considered as redundantly commanding a transition. In instances where the control is accomplished globally (e.g., relative to the overall panel field or some significant portion thereof) the action can be by control of field effect transistors or the like. Thus, there can be a global gate control (84), perhaps such as a converter global gate control that controls a collection of different converters, perhaps such as a string or the entire sea. This can merely be considered as one type of way of directing a multi-panel functional change or it may be a way of globally gating a number of solar panel converters such as the photovoltaic DC-DC converters (4). Of course a radio transmission control can be global or individual, such as shown in for the radio transmission individual solar panel disconnect control (85).

Mentioned earlier was an aspect of providing component limit protection. There can be control of limits based on a variety of parameters, including but not limited to: voltage limit output control, a voltage limited component, establishing a safety margin maximum voltage individual solar panel maximum voltage, establishing a safety margin maximum voltage limited disconnection capability or process, voltage limited integrally individually disconnecting a panel or the like, a current limit output control, a power limit output control, a field effect transistor breakdown limited control, and even a field effect transistor breakdown limited integrally individually disconnection capability. Apart from device or component limits, there can be a capability to provide a code compliance capability such as a local electrical code or the like. This is also where a fail-safe or redundant control capability can be useful as some code requirements specify a redundant or secondary control assurance. Regardless how configured, in general embodiments can include a code compliance output controller (41). A code compliance output controller (41) can effect control at a variety of levels, including but not limited to: a code compliant current limit output control, a code compliant current limit output control, a code compliant electrical parameter rate of change limit output control, a code compliant electrical parameter rate of change limit output control, a code compliant power limit output control code compliant power limit output control, a code compliant timed electrical parameter limit output control, a code compliant timed electrical parameter limit output control, a code compliant voltage limit output control, a code compliant voltage limit output control, a code compliantly limiting a converted DC output, an electrical code maximum voltage individual solar panel maximum voltage, an electrical code maximum voltage limited disconnection capability, an electrical code programmable power functionality controller, an individual solar panel code compliance output controller, an individual solar panel code compliantly limited system, an output limit control, an output limiting a converted DC output, or even a process of providing an electrical code programmable power functionality controller.

Figure 6:
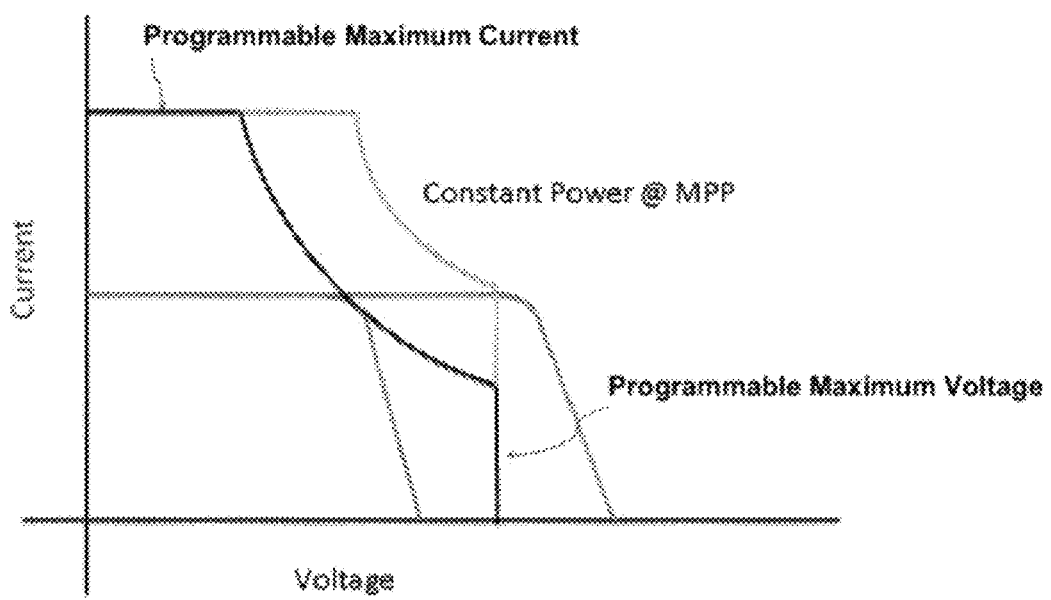
FIG. 6 shows a plot of solar panel output operational conditions for differing temperatures and output paradigms.

As illustrated in FIG. 6, there may be maximum power point capability as well as a remote or programmable limit controllable limit. This limit may be maximum voltage or maximum current as shown. Further any parameter can be a function of another parameter, for example, maximum voltage can be a function of current and maximum current can be a function of voltage. As the inclusion of FIG. 6 in the inventors' referenced patent disclosures further explains, DC-DC converters may include temperature effects as well.

One aspect that can be important to some systems is the capability of soft starting a string or field so that a fast, large electrical transition does not occur such as when the system is shut down during a full insolation condition or when a substantially full solar energy source photovoltaic input is available. This can be achieved by providing an electrical parameter gradual increase solar energy source connection control that may gradually increase at least one electrical parameter for the system or for the photovoltaic power combination circuit (59). This can be accomplished for example, by an electrically sequential solar panel connection control or more generally an electrically sequential solar energy source connection control (35). Sequential operation as a method activation can be in any manner; it may be ordered, random, or even dependent upon inherent manufacturing variances if they are determined to be sufficient to permit a soft enough electrical transition from one state of operation to another. In an ordered connecting type of system, there may be an ordered sequential solar energy source connection control. Ordered or not, embodiments may achieve one-by-one electrically connecting of a number of items or it may even have a one panel-by-one panel solar energy source connection control. The sequential operation can be string based and there can be an inter-string sequential solar energy source connection control or perhaps even an intra-string sequential solar energy source connection control so that individual strings are treated as sources to be sequentially connected or activated.

Any sequential control may be controlled by a radio transmission control or a remote functionality change controller, if present, and so there may be a radio transmission sequential solar panel connection control or a remote sequential solar panel connection control that may sequentially control operation of a number of solar sources or panels, that may sequentially electrically connect such items, or may act in some sequential fashion. There can even be a capability to alter a start sequence, perhaps such as when some panels or components are not functional, and so systems can include an alterable electrically sequential solar energy source connection control.

A variety of soft start or other sequential capabilities can be employed, such as to protect components so as to address abrupt changes in condition. Soft transition photovoltaic power conversion control circuitry (35) or the step of softly transitioning a photovoltaic electrical parameter or more specifically even softly transitioning a converted photovoltaic power level electrical parameter can be included. Another mode of operation may be to make a value proportional to some other aspect. For example, there can be advantages to making voltage proportional to current such as to provide soft start capability or the like. There can be can ramped photovoltaic current power conversion control circuitry, ramped photovoltaic voltage power conversion control circuitry, or the steps of ramping (which be linear or may have any other shape) a photovoltaic current level, ramping a photovoltaic voltage level, or the like. Duty cycle operations and switching can be used to achieve any such results at a converter or inverter level.

Whether incidental to the capability to disconnect, and therefore isolate, sources or panels or not, embodiments of the invention can include a capability for sophisticated pattern analysis such as by comparing output or other functionality of individual sources or panels. Systems can capture one or more electrical parameter for each of a number of sources or panels to assess performance of the panels, the system, the sea of panels, or even the installation. Analysis can occur globally, that is for the entire sea of panels, temporally, that is with respect to time effects such as insolation or panel aging changes, historically, that is with respect to changes that occur over time, comparatively, deductively, with approximation or estimation functions, or otherwise. As but some examples, a global system may determine an insolation condition, perhaps such as determining an insolation utilization indication; a temporal system of pattern analysis may determine a daily condition, a seasonal condition, an annual condition, or any temporal condition (including but not limited to a temporal shade condition or the like). Systems can include a pattern analyzer (87). The pattern analyzer (87) may be hardware or, more likely, software to conduct pattern recognition analysis of data and may be used to determine at least one locational indication such as if a panels is occasionally shaded and thus should be moved for optimal function or the like. It may also determine one or more operational indications such as percentage efficiency as compared to likely insolation expectations (which themselves may be a result of the pattern analysis), operational change efficiency as compared to the new system, or the like. Changes can be deduced of calculated by conducting a multi-panel comparison or be conducting a historical variation assessment. Comparisons can be made relative to performance values from a number of solar panels. Deductions and determinations can be made relative to pointing, a shade condition, an average deviation or variation, and even an orientation indication, to name but a few. Whether from a pattern type of analysis or just from individual values, systems can conduct a suboptimal assessment, an installation assessment, and a maintenance assessment to recommend or evaluate actions or the like. High producer panels can be identified and an efficiency indication can be determined perhaps even among a number of solar panels.

Embodiments of solar energy systems (55) that have individual MPP per panel or the like can include a capability to simulate a power output. This can be particularly important, for example, when components that are disparate are used. Considering a configuration where an inverter with an MPP capability is combined with a converter that also achieves such a capability, it can be understood that such might not work stably and so simulating a power output conditions, perhaps such as MPP, might be desired. Such a photovoltaic power simulator can be for individual panels or strings and so there can be an individual solar panel string photovoltaic power simulator (90) that can simulate an individual solar panel string power output. Similarly, an individual solar panel photovoltaic power simulator can be included to simulate an individual solar panel power output. There can also be individually panel dedicated photovoltaic power simulators. Such items may simulate a maximum power point condition and thus may be considered a maximum photovoltaic power point simulator. Systems may also include simulating a synthetic maximum or other voltage or current or power condition. There may also be a photovoltaic inverter power simulator that simulates a DC-AC photovoltaic inverter parameter of some type.

In configurations such as where there is an inverter with an MPP capability combined with a converter that also achieves such a capability, it can be possible to control the converter switches to achieve a bypass operation so that the converter, or more particularly its MPP capability, is effectively taken out of the system. Thus embodiments can automatically by-pass normal operation of a photovoltaic DC-DC power converter (4) or any other component. There can be individual solar panel DC-DC power converter by-pass control or a photovoltaic DC-DC power converter by-pass controller. Any of these may be programmable or remotely controlled such as by a remote photovoltaic DC-DC power converter by-pass control that remotely controls a by-pass of a normal operation.

The aforementioned need or propriety for the aspect of by-passing normal operation can be detected by a sensor. Thus the by-pass function can be automatic and there can be an automatic photovoltaic DC-DC power converter by-pass controller. The sensing can be periodic sensing of a photovoltaic DC-DC power converter voltage input, output, or otherwise. Such an input or output sensor can be considered generally as examples of photovoltaic power simulation condition sensor (90). This photovoltaic power simulation condition sensor (90) may control the step of simulating a power output and the photovoltaic power conversion circuitry may be responsive to the sensors. This can even sense a transient condition that informs the decision making and so there can be a transient photovoltaic power simulation condition sensor that transiently senses something.

Sensors can use a variety of ways to automatically determine that a by-pass or other action is appropriate. One example can be by a comparison of the voltage in to the voltage out of a converter. For a photovoltaic DC-DC converter (4) such as described in the prior patent disclosures of the present inventors and as shown in FIGS. 7 and 8, if the voltage in is equal to the voltage out, not significant conversion is occurring and thus, a simple by-pass may be appropriate. Thus systems can include a $V_{in}$-$V_{out}$ comparator (88) and a by-pass can be indicated when the two values are roughly equal. This can even be deduced from the timing or operation of the switches. Systems or embodiments can include an automatic photovoltaic DC-DC power converter voltage input and photovoltaic DC-DC power converter voltage output comparator and in response to this, can action can occur. This can be periodic. There can also be a periodic or otherwise photovoltaic DC-DC power converter voltage input or output sensor. When indicated, the by-pass can occur of all or even a part of a string, thus systems can include a partial string photovoltaic power simulator.

As mentioned above, the PCs and photovoltaic DC-DC power converters (4) may handle individual panels. They may be attached to a panel, to a frame, or separate. Embodiments may have converters physically integral to such panels in the sense that they are provided as one attached unit for ultimate installation. This can be desirable such as when there are independent operating conditions for separate solar sources, and even adjacent solar sources to accommodate variations in insolation, condition, or otherwise. Each panel or the like may achieve its own MPP, and may coordinate protection with all others in a string or the like.

The aspect of addressing an external as well as an internal output can be helpful to meeting code or other requirements when there is no way to know what type of panel or other component the system is hooked to. In situations where an internal signal (perhaps such as the signal transmitting power from a rooftop collection of panels to a basement inverter grid connection) is not permitted to exceed a specified level of voltage, current, or otherwise needs to meet limitations on existing wiring or circuit breakers or the like, embodiments can provide the dynamically reactive control as code compliant dynamically reactive photovoltaic power control circuitry perhaps as a code compliance output controller (41). It may also provide the step of code compliantly dynamically reactively controlling an internal output. This can occur through operation of the photovoltaic DC-DC converter (4), the photovoltaic DC-AC inverter (5), or otherwise. Of course this code complaint feature can be slaved to take dominance over other features such as MPP activity, sweet spot activity, boundary condition activity, or the like. In this manner embodiments can provide slaved code compliant dynamically reactive photovoltaic power control circuitry or can provide the step of slavedly code compliantly dynamically reactively controlling internal output, perhaps through operation of the photovoltaic DC-DC converter (4) or otherwise. Beyond code compliance, it can be readily understood how the general feature of a dynamically reactive control can act to permit connection to existing or dissimilar sources as well. Thus whether by programming, circuitry, or other configuration, embodiments can provide reactive power control circuitry, perhaps through operation of the photovoltaic DC-DC converter (4). Of course this can all be accomplished while maintaining the inverter input at an optimum level in appropriate circumstances and thus embodiments can include reactive inverter input optimization photovoltaic power control circuitry.

As the invention becomes more accepted it may be advantageous to permit comparison with more traditional technologies or operating conditions. This can be achieved by simple switch operation whereby traditional modes of operation can be duplicated or perhaps adequately mimicked to permit a comparison. Thus, for a solar focus, systems may include a solar power conversion comparator that can compare first and second modes of operation, perhaps the improved mode of an embodiment of the present invention and a traditional, less efficient mode. This comparator may involve indicating some solar energy parameter for each. In this regard, the shunt switch operation disable element may be helpful. From this a variety of difference can be indicated, perhaps: solar power output, solar power efficiency differences, solar power cost differences, solar power insolation utilization comparisons, and the like. Whether through software or hardware or otherwise, embodiments can include an ability to function with a first power capability and a second power capability. These may be traditional and improved capabilities, perhaps such as a traditional power conversion capability and an improved power conversion capability or a traditional power inversion capability and an improved power inversion capability. The inverter control circuitry (38) or the photovoltaic power functionality change controller (8) or otherwise can be configured to achieve either or both of these first and second capabilities. As one example, the inverter can act to achieve an input voltage that would have been seen without the features of the present invention and thus embodiments can provide an off-maximum efficiency inverter input voltage control. In instances where the improved embodiment achieves inverter sweet spot operation capability, embodiments may act to compare the steps of traditionally power inverting a DC photovoltaic input and sweet spot input inverting a DC photovoltaic input. Any of these can provide a user any type of output to inform the user for comparison with other systems.

As can be easily understood from the foregoing, the basic concepts of the present invention may be embodied in a variety of ways. It involves both solar power generation techniques as well as devices to accomplish the appropriate power generation. In this application, the power generation techniques are disclosed as part of the results shown to be achieved by the various circuits and devices described and as steps which are inherent to utilization. They are simply the natural result of utilizing the devices and circuits as intended and described. In addition, while some circuits are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and circuits described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not—and, conversely, were there effectively disclosure of the act of "converting", such a disclosure should be understood to encompass disclosure of a "converter" and even a "means for converting." Such changes and alternative terms are to be understood to be explicitly included in the description.

Any patents, publications, or other references mentioned in this application for patent or its list of references are hereby incorporated by reference. Any priority case(s) claimed at any time by this or any subsequent application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References or other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

LIST OF REFERENCES

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| 4,127,797 | Nov. 28, 1978 | Perper |
| 4,168,124 | Sep. 18, 1979 | Pizzi |
| 4,218,139 | Aug. 19, 1980 | Sheffield |
| 4,222,665 | Sep. 16, 1980 | Tachizawa et al. |
| 4,249,958 | Feb. 10, 1981 | Baudin et al. |
| 4,341,607 | Jul. 27, 1982 | Tison |
| 4,375,662 | Mar. 01, 1983 | Baker |
| 4,390,940 | Jun. 28, 1983 | Corbefin et al. |
| 4,404,472 | Sep. 13, 1983 | Steigerwald |
| 4,445,030 | Apr. 24, 1984 | Carlson |
| 4,445,049 | Apr. 24, 1984 | Steigerwald |
| 4,528,503 | Jul. 9, 1985 | Cole |
| 4,580,090 | Apr. 1, 1986 | Bailey et al. |
| 4,581,716 | Apr. 8, 1986 | Kamiya |
| 4,619,863 | Oct. 28, 1986 | Taylor |
| 4,626,983 | Dec. 02, 1986 | Harada et al. |
| 4,725,740 | Feb. 16, 1988 | Nakata |
| 4,749,982 | Jun. 7, 1988 | Rikuna et al. |
| 4,794,909 | Jan. 3, 1989 | Elden |
| 4,873,480 | Oct. 10, 1989 | Lafferty |
| 4,896,034 | Jan. 23, 1990 | Kiriseko |
| 5,027,051 | Jun. 25, 1991 | Lafferty |
| 5,028,861 | Jul. 2, 1991 | Pace et al. |
| 5,401,561 | Mar. 28, 1995 | Fisun et al. |
| 5,503,260 | Apr. 2, 1996 | Riley |
| 5,646,502 | Jul. 8, 1997 | Johnson |
| 5,669,987 | Sep. 23, 1997 | Takehara et al. |
| 5,689,242 | Nov. 18, 1997 | Sims et al. |
| 5,741,370 | Apr. 21, 1998 | Hanoka |
| 5,747,967 | May 05, 1998 | Muljadi et al. |
| 5,896,281 | Apr. 20, 1999 | Bingley |
| 5,923,100 | Jul. 13, 1999 | Lukens et al. |
| 6,046,401 | Apr. 4, 2000 | McCabe |
| 6,081,104 | Jun. 27, 2000 | Kern |
| 6,124,769 | Sep. 26, 2000 | Igarashi et al. |
| 6,181,590 | Jan. 30, 2001 | Yamane et al. |
| 6,180,868 | Jan. 30, 2001 | Yoshino et al. |
| 6,218,820 | Apr. 17, 2001 | D'Arrigo et al. |
| 6,278,052 | Aug. 21, 2001 | Takehara et al. |
| 6,281,485 | Aug. 28, 2001 | Siri |
| 6,282,104 | Aug. 28, 2001 | Kern |
| 6,331,670 | Dec. 18, 2001 | Takehara et al. |
| 6,351,400 | Feb. 26, 2002 | Lumsden |
| 6,369,462 | Apr. 09, 2002 | Siri |
| 6,433,522 | Aug. 13, 2002 | Siri |
| 6,441,896 | Aug. 27, 2002 | Field |
| 6,448,489 | Sep. 10, 2002 | Kimura et al. |
| 6,515,215 | Feb. 4, 2003 | Mimura |
| 6,545,211 B1 | Apr. 8, 2003 | Mimura |
| 6,593,521 | Jul. 15, 2003 | Kobayashi |
| 6,624,350 | Sep. 23, 2003 | Nixon et al. |
| 6,686,533 | Feb. 3, 2004 | Raum et al. |
| 6,750,391 | Jun. 15, 2004 | Bower et al. |
| 6,791,024 | Sep. 14, 2004 | Toyomura |
| 6,804,127 | Oct. 12, 2004 | Zhou |
| 6,889,122 | May 03, 2005 | Perez |
| 6,914,418 | Jul. 05, 2005 | Sung |
| 6,920,055 | Jul. 19, 2005 | Zeng et al. |
| 6,952,355 | Oct. 04, 2005 | Rissio et al. |
| 6,958,922 | Oct. 25, 2005 | Kazem |
| 6,984,965 | Jan. 10, 2006 | Vinciarelli |
| 7,046,531 | May 16, 2006 | Zocchi et al. |
| 7,091,707 | Aug. 15, 2006 | Cutler |
| 7,158,395 | Jan. 02, 2007 | Deng et al. |
| 7,227,278 | Jun. 05, 2007 | Realmuto et al. |
| 7,274,975 | Sep. 25, 2007 | Miller |
| 7,333,916 | Feb. 19, 2008 | Warfield et al. |
| 20060162772 A1 | Jul. 27, 2006 | Preser et al. |
| 20040211456 | Oct. 28, 2004 | Brown, Jacob E. et al. |
| 20050002214A1 | Jan. 06, 2005 | Deng et al. |
| 20050068012A1 | Mar. 31, 2005 | Cutler |
| 20050162018A1 | Jul. 28, 2005 | Realmuto et al. |
| 20060103360A9 | May 18, 2006 | Cutler |
| 20060174939A1 | Aug. 10, 2006 | Matan |
| 20070035975A1 | Feb. 15, 2007 | Dickerson et al. |
| 20010007522 A1 | Jul. 12, 2001 | Nakagawa et al. |
| 20030111103 A1 | Jun. 19, 2003 | Bower et al. |
| 20070069520 A1 | Mar. 29, 2007 | Schetters |
| 20070133241 A1 | Jun. 14, 2007 | Mumtaz et al. |
| 20030075211 | Apr. 24, 2003 | Makita et al. |
| 20050109386 | May 26, 2005 | Marshall |
| 20070171680 | Jul. 26, 2007 | Perreault et al. |

II. FOREIGN PATENT DOCUMENTS

| Foreign Patent Document | PUB'N DATE | PATENTEE OR APPLICANT NAME |
|---|---|---|
| WO 2003036688 A2 | Apr. 3, 2003 | Pharmaderm Laboratories, Ltd. |
| WO 2004100344 A2 | Nov. 18, 2004 | Ballard Power Systems Corporation |
| WO 2004100348 A1 | Nov. 18, 2004 | Encesys Limited |
| WO 2005027300 A1 | Mar. 24, 2005 | Solarit AB |
| WO 2005036725 A1 | Apr. 21, 2005 | Konin-Klijke Philips Electronics |
| WO 2006005125 A1 | Jan. 19, 2006 | Central Queensland University et al. |
| WO 2006071436 A2 | Jul. 06, 2006 | ISG Technologies, LLC |
| WO 2006078685 A2 | Jul. 27, 2006 | Presher, Gordon E., Jr. & Warren, Carlton L. |
| WO 2006013600 A2 | Feb. 09, 2006 | Universita Degli Studi DiRoma "La Sapienza" |
| WO 2006013600 A3 | Feb. 09, 2006 | Universita Degli Studi DiRoma "La Sapienza" |
| WO 2006048688 A1 | May 11, 2006 | Encesys Limited |
| WO 2006048689 A2 | May 11, 2006 | Encesys Limited |
| WO 2006048689 A3 | May 11, 2006 | Encesys Limited |
| WO 2006137948 A2 | Dec. 28, 2006 | ISG Technologies, LLC |
| WO 2007007360 A2 | Jan. 18, 2007 | Universita Degli Studi Di Salerno |
| WO 2007080429 A2 | Jul. 19, 2007 | Encesys Limited |
| EP 0964415 A1 | Dec. 15, 1999 | Igarashi, Katsuhiko-TDK Corp |
| EP 0677749 A2 | Oct. 18, 1996 | Canon Kabushiki |
| EP 0677749 A3 | Jan. 17, 1996 | Canon Kabushiki |
| EP 0780750 B1 | Mar. 27, 2002 | Nakata, et al. |
| EP 0824273 A2 | Feb. 18, 1998 | Canon Kabushiki Kaisha |
| EP 0964457 A2 | Dec. 15, 1999 | Canon Kabushiki Kaisha |
| EP 00978884 A3 | Mar. 22, 2000 | Canon Kabushiki Kaisha |
| EP 0964457 A3 | Dec. 15, 1999 | Canon Kabushiki Kaisha |
| EP 1120895 A3 | May 06, 2004 | Murata Manufacturing Co, et al. |
| GB 2434490 A | Jul. 25, 2007 | Enecsys Limited, et al. |
| GB 2421847 A | Jul. 05, 2006 | Enecsys Limited, et al. |
| GB 1231961 | Sep. 9, 1969 | Panajula Karajanni |
| GB 2419968 A | May 10, 2006 | Enecsys Limited, et al. |
| GB 2415841 A | Jan. 04, 2006 | Enecsys Limited, et al. |
| GB 612859 | Nov. 18, 1948 | Standard Telephones and Cables Limited |
| GB 310362 | Sep. 26, 1929 | Rheinishce Metallwaaren-Und Maschinenfabrik Sommerda Aktien-Gesellschaft |
| JP56042365 A2 | Apr. 20, 1981 | Seiko Epson Corp. |
| JP 06141261 A2 | May 20, 1994 | Olympus Optical Co. Ltd. |
| JP 62154121A | Sep. 07, 1987 | Kyogera Corp |
| JP 07026849 U2 | Jan. 27, 1995 | Sekisui House Ltd. |
| JP 08204220 A2 | Aug. 9, 1996 | Mitsubishi Electric Corp. |
| JP 09097918 A2 | Apr. 8, 1997 | Canon Inc. |
| JP 60027964 A2 | Feb. 3, 1985 | NEC Corp. |
| JP 60148172 A2 | Aug. 5, 1985 | Seikosha Co. Ltd |
| JP 06035555 A2 | Feb. 10, 1994 | Japan Storage Battery Co. Ltd. |
| JP 08181343 A2 | Jul. 12, 1996 | Sharp Corp. |
| JP 2002231578 A | Aug. 16, 2002 | Meidensha Corp |
| JP 2000020150 A | Jan. 21, 2000 | Toshiba Fa Syst Eng Corp. et al. |
| JP 08066050 A | Mar. 08, 1996 | Hitachi Ltd |
| JP 08033347 A | Feb. 02, 1996 | Hitachi Ltd, et al. |
| JP 07222436 A | Aug. 18, 1995 | Meidensha Corp |
| JP 05003678 A | Jan. 08, 1993 | Toshiba F EE Syst KK, et al. |

III. NON-PATENT LITERATURE DOCUMENTS

Northern Arizona Wind & Sun; solar-electric.com; All about MPPT Solar Charge Controllers; Nov. 05, 2007
SatCon Power Systems, PowerGate Photovoltaic 50 kW Power Converter System, June 2004
Bower, et al. Innovative PV Micro-Inverter Topology Eliminates Electrolytic Capacitors for Longer Lifetime, 1-4244-0016-3, 06 IEEE p. 2038
Guo, Gene Z., Design of a 400 W, 1Φ. Buck-Boost Inverter for PV Applications. 32. nd. Annual Canadian Solar Energy Conference Jun. 10, 2007
Hua, C. et al., Control of DC/DC converters for solar energy system with maximum power tracking, Department of Electrical Engineering; National Yumin University of Science & Technology, Taiwan, Volume 2, Issue, 9-14 Nov 1997 Page(s): 827-832
Kang, F. et al., Photovoltaic power interface circuit incorporated with a buck-boost converter and a full-bridge inverter; doi:10.1016/j.apenergy.2004.10.009
Kretschmar K., et al. An AC converter with a small DC link capacitor for a 15 kW permanent magnet synchronous integral motor, Power Electronics and Variable Speed Drives, 1998. Seventh International Conference on (Conf. Publ. No. 456) Volume, Issue, 21-23 Sep 1998 Page(s): 622-625
Lim, Y. H. et al., Simple maximum power point tracker for photovoltaic arrays, Electronics Letters May 25, 2000 Vol. 36, No. 11
Matsuo, H. et al., Novel solar cell power supply system using the multiple-input DC-DC converter, Telecommunications Energy Conference, 1998. INTELEC. Twentieth International, Volume, Issue, 1998 Page(s): 797-8022
Román, E. et al. Intelligent PV Module for Grid-Connected PV Systems, IEEE Transactions of Power Electronics, Vol. 53. No. 4 August 2006
Takahashi, I. et al. Development of a long-life three-phase flywheel UPS using an electrolytic capacitorless converter/inverter, 1999 Scripta Technica, Electr. Eng. Jpn, 127(3): 25-32
Walker, G. R. et al, Cascaded DC-DC Converter Connection of Photovoltaic Modules, IEEE Transactions of Power Electronics, Vol. 19. No. 4 July 2004

III. NON-PATENT LITERATURE DOCUMENTS

Walker, G. R. et al., "PV String Per-Module Power Point Enabling Converters," School of Information Technology and Electrical Engineering, The University of Queensland, presented at the Australasian Universities Power Engineering Conference, AUPEC2003, Christchurch, Sep. 28,-Oct. 1, 2003.
Hashimoto, et al. A Novel High Performance Utility Interactive Photovoltaic Inverter System, Department of Electrical Engineering, Tokyo Metropolitan University, 1-1 Minami-Osawa, Hachioji, Tokyo, 192-0397, Japan, p. 2255
Shimizu, et al. Generation Control Circuit for Photovoltaic Modules, EII Transactions on Power Electronics, Vol 16, No. 3, May 2001
Linear Technology, LTM4607 Specification Sheet
United States Provisional Application filed Oct. 15, 2007, Ser. No. 60/980,157
United States Provisional Application filed Oct. 23, 2007, Ser. No. 60/982,053
United States Provisional Application filed Nov. 15, 2007, Ser. No. 60/986,979
International Application filed Mar. 14, 2008, Ser. No. PCT/US08/57105
International Application filed Apr. 15, 2008, Ser. No. PCT/US08/60345
H. Thomas, Kroposki, B and C. Witt, "Progress in Photovoltaic Components and Systems", National Renewable Energy Laboratory, May 2000, NREL/CP-520-27460
Kern, G, "SunSine ™ 300: Manufacture of an AC Photovoltaic Module," Final Report, Phases I & II Jul. 25, 1995-Jun. 30, 1998, National Renewable Energy Laboratory, March 1999, NREL/SR-520-26085
Schekulin, Dirk; Bleil, Andreas; Binder, Christoph; Schumm, Gerhard; "Module-integratable Inverters in the Power-Range of 100-400 Watts," 13$^{th}$ European Photovoltaic Solar Energy Conference, Oct. 23-27, 1995, Nice, France; p 1893-1896.
Portion of File Wrapper, Information Disclosure Statement by Applicant, Gordon E. Presher, Jr (first named inventor), Attorney Docket Number 1199 001 301 0202
"Solar Sentry Corp.," http://www.solarsentry.com/, Protecting Your Solar Investment, 2005
"Solar Sentry's Competitive Advantage," 1 page with table summarizing Solar Sentry's sustainable competitive advantage over two primary alternative approaches.
European Patent application No. 99111425.7-1235; various office actions

--- thus, the applicant(s) should be understood to have support to claim and make a statement of invention to at least: i) each of the power source devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application. Limitations such as arose in Hakim v. Cannon Avent Group, PLC, 479 F.3d 1313 (Fed. Cir 2007), or the like are expressly not intended in this or any subsequent related matter.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Clauses as Potential Statements of Invention May Include any of the Following Original Presentations:

1. A high efficiency, controlled solar panel energy system comprising:
    at least one solar panel having a DC photovoltaic output;
    a photovoltaic electrical power containment for which said DC photovoltaic output exists;
    a plurality of individual photovoltaic power conversion circuitries responsive to said DC photovoltaic output;
    at least one photovoltaic DC-DC power converter operation controller to which said photovoltaic power conversion circuitries are responsive;
    a plurality of individually panel dedicated maximum photovoltaic power point converter functionality control circuitries;
    a remote power functionality change controller; and
    a plurality of individual solar panel output DC disconnects responsive to said remote power functionality change controller.

2. A high efficiency, controlled solar panel energy system as described in claim 1 or any other claim wherein said remote power functionality change controller comprises a centralized, remote power functionality change controller.

3. A high efficiency, controlled solar panel energy system as described in claim 2 or any other claim and further comprising at least one string of electrical series responsive DC-DC converted solar panel outputs.

4. A high efficiency, controlled solar panel energy system as described in claim 3 or any other claim wherein said at least one string of electrical series responsive DC-DC converted solar panel outputs comprises a plurality of serially connected photovoltaic DC-DC power converters.

5. A high efficiency, controlled solar panel energy system as described in claim 4 or any other claim wherein said plurality of individual solar panel output DC disconnects comprises a plurality of open default position solar panel disconnects.

6. A high efficiency, controlled solar panel energy system as described in claim 4 or 5 and further comprising an independent output DC disconnect position authentication element.

7. A high efficiency, controlled solar panel energy system as described in claim 6 or any other claim wherein said centralized, remote power functionality change controller comprises a radio transmission individual solar panel disconnect control.

8. A high efficiency, controlled solar panel energy system as described in claim 7 or any other claim wherein said radio transmission individual solar panel disconnect control comprises a radio transmission individual solar panel disconnect control selected from a group consisting of:
    a solar panel string voltage functionality controller,
    a solar panel string current functionality controller,
    a solar panel inverter input voltage functionality controller,
    a solar panel inverter input current functionality controller,
    a solar panel inverter input power functionality controller, and
    a solar panel voltage functionality controller.

9. A high efficiency, controlled solar panel energy system as described in claim 7 or any other claim wherein said plurality of individual solar panel output DC disconnects comprises a plurality of solar panel power up disconnects.

10. A high efficiency, controlled solar panel energy system as described in claim 7 or any other claim wherein said centralized, remote power functionality change controller comprises a photovoltaic DC-DC power converter switch controller.

11. A high efficiency, controlled solar panel energy system as described in claim 10 or any other claim wherein said photovoltaic DC-DC power converter switch controller comprises a photovoltaic DC-DC converter field effect transistor controller.

12. A high efficiency, controlled solar panel energy system as described in claim 11 or any other claim wherein said field effect transistor controller comprises a converter inoperability switch disconnect controller.

13. A high efficiency, controlled solar panel energy system as described in claim 11 or any other claim wherein said field effect transistor controller comprises a field effect transistor timing controller.

14. A high efficiency, controlled solar panel energy system as described in claim 13 or any other claim and further comprising at least one maximum photovoltaic power point simulator.

15. A method of controlled, high efficiency power generation from a solar panel energy system comprising the steps of:
providing at least one solar panel;
electrically containing said at least one solar panel in a containment having a DC photovoltaic output;
DC converting said DC photovoltaic output;
remotely controlling said step of DC converting said DC photovoltaic output;
individually generating power at a panel dedicated maximum photovoltaic power point;
remotely directing a functional change in said step of DC converting said DC photovoltaic output; and
individually disconnecting said DC photovoltaic output of said containment for at least one solar panel.

16. A method of controlled, high efficiency power generation from a solar panel energy system as described in claim 15 or any other claim wherein said step of remotely directing a functional change in said step of DC converting said DC photovoltaic output comprises the step of centrally directing a functional change in said step of DC converting said DC photovoltaic output.

17. A method of controlled, high efficiency power generation from a solar panel energy system as described in claim 16 or any other claim and further comprising the step of utilizing an electrical series responsive plurality of solar panels to generate electrical power.

18. A method of controlled, high efficiency power generation from a solar panel energy system as described in claim 17 or any other claim wherein said step of utilizing an electrical series responsive plurality of solar panels to generate electrical power comprises the step of utilizing a plurality of serially connected photovoltaic DC-DC power converters to generate electrical power.

19. A method of controlled, high efficiency power generation from a solar panel energy system as described in claim 18 or any other claim wherein said step of individually disconnecting said DC photovoltaic output of said containment for at least one solar panel comprises the step of controlling an open default position solar panel disconnect.

20. A method of controlled, high efficiency power generation from a solar panel energy system as described in claim 18 or 19 or any other claim and further comprising the step of independently authenticating a position of a solar panel disconnect.

21. A method of controlled, high efficiency power generation from a solar panel energy system as described in claim 20 or any other claim wherein said step of remotely directing a functional change comprises the step of wireless controlling operation of a plurality of solar panel disconnects.

22. A method of controlled, high efficiency power generation from a solar panel energy system as described in claim 21 or any other claim wherein said step of wireless controlling operation of a plurality of solar panel disconnects comprises a step selected from a group consisting of:
remotely controlling a solar panel string voltage functionality,
remotely controlling a solar panel string current functionality,
remotely controlling a solar panel inverter input voltage functionality,
remotely controlling a solar panel inverter input current functionality,
remotely controlling a solar panel inverter input power functionality, and
remotely controlling a solar panel voltage functionality.

23. A method of controlled, high efficiency power generation from a solar panel energy system as described in claim 21 or any other claim wherein said step of remotely directing a functional change in said step of DC converting said DC photovoltaic output comprises the step of remotely disconnecting a DC output of at least one solar panel.

24. A method of controlled, high efficiency power generation from a solar panel energy system as described in claim 21 or any other claim wherein said step of remotely directing a functional change in said step of DC converting said DC photovoltaic output comprises the step of remotely controlling switching of at least one DC-DC power converter.

25. A method of controlled, high efficiency power generation from a solar panel energy system as described in claim 24 or any other claim wherein said step of remotely controlling switching of at least one DC-DC power converter comprises the step of remotely controlling switching of at least one field effect transistor for said at least one DC-DC power converter.

26. A method of controlled, high efficiency power generation from a solar panel energy system as described in claim 25 or any other claim wherein said step of remotely controlling switching of at least one field effect transistor for said at least one DC-DC power converter comprises the step of remotely effecting converter switch inoperability for said at least one DC-DC power converter.

27. A method of controlled, high efficiency power generation from a solar panel energy system as described in claim 25 or any other claim wherein said step of remotely controlling switching of at least one field effect transistor for said at least one DC-DC power converter comprises the step of remotely controlling switching timing for at least one field effect transistor for said at least one DC-DC power converter.

28. A method of controlled, high efficiency power generation from a solar panel energy system as described in claim 27 or any other claim and further comprising the step of simulating a maximum power point for at least one of said plurality of converted DC outputs.

29. A power managed solar energy system comprising:
at least one solar panel having a DC photovoltaic output;
a photovoltaic electrical power containment for which said DC photovoltaic output exists; and
an individual solar panel output DC disconnect electrically connected to said DC photovoltaic output.

30. A power managed solar energy system as described in claim 29 or any other claim wherein said at least one solar energy panel comprises a comprises at least one plurality of solar panels and further comprising a plurality of individually panel dedicated maximum photovoltaic power point converter functionality control circuitries.

31. A power managed solar energy system as described in claim 29 or any other claim and further comprising at least one string of electrical series responsive DC-DC converted solar panel outputs.

32. A power managed solar energy system as described in claim 31 or any other claim wherein said at least one string of electrical series responsive DC-DC converted solar panel outputs comprises a plurality of serially connected photovoltaic DC-DC power converters.

33. A power managed solar energy system as described in claim 32 or any other claim wherein said at least one string of electrical series responsive DC-DC converted solar panel outputs further comprises a plurality of individually panel dedicated maximum photovoltaic power point converter functionality controls.

34. A power managed solar energy system as described in claim 29 or any other claim wherein said individual solar panel output DC disconnect electrically connected to said DC photovoltaic output comprises a nominally open individual solar panel output DC disconnect.

35. A power managed solar energy system as described in claim 29 or any other claim and further comprising an individual solar panel disconnect control to which said individual solar panel output DC disconnect is responsive.

36. A power managed solar energy system as described in claim 35 or any other claim wherein said individual solar panel disconnect control comprises a selected default position solar panel disconnect control.

37. A power managed solar energy system as described in claim 36 or any other claim wherein said selected default position solar panel disconnect control comprises an open default position solar panel disconnect control.

38. A power managed solar energy system as described in claim 35 or any other claim wherein said individual solar panel disconnect control comprises a power off default open solar panel disconnect control.

39. A power managed solar energy system as described in claim 38 or any other claim wherein said power off default open solar panel disconnect control comprises a field effect transistor default open disconnect control.

40. A power managed solar energy system as described in claim 35 or any other claim wherein said individual solar panel disconnect control comprises an individual string panel sequestration control.

41. A power managed solar energy system as described in claim 35 or any other claim wherein said individual solar panel disconnect control comprises an individual string panel deenergization control.

42. A power managed solar energy system as described in claim 29 or any other claim and further comprising a control-independent output DC disconnect position information element.

43. A power managed solar energy system as described in claim 42 or any other claim and further comprising an independent output DC disconnect position authentication element.

44. A power managed solar energy system as described in claim 35 or any other claim wherein said individual solar panel disconnect control comprises a solar panel disconnect state set control.

45. A power managed solar energy system as described in claim 44 or any other claim wherein said solar panel disconnect state set control comprises:
 a solar panel disconnect manufacture state set control; and
 a solar panel disconnect operational state set control.

46. A power managed solar energy system as described in claim 35 or 45 or any other claim and further comprising a solar panel disconnect installation state set control.

47. A power managed solar energy system as described in claim 46 or any other claim wherein said solar panel disconnect installation state set control comprises a mechanical solar panel disconnect installation state set control.

48. A power managed solar energy system as described in claim 46 or any other claim wherein said solar panel disconnect installation state set control comprises a resettable solar panel disconnect state set control.

49. A power managed solar energy system as described in claim 35 or any other claim wherein said solar panel disconnect control comprises a remote individual solar panel disconnect control.

50. A power managed solar energy system as described in claim 49 or any other claim wherein said remote individual solar panel disconnect control comprises a radio transmission individual solar panel disconnect control.

51. A power managed solar energy system as described in claim 29 or any other claim wherein said solar panel output DC disconnect comprises a limited mode solar panel output DC disconnect.

52. A power managed solar energy system as described in claim 51 or any other claim wherein said limited mode solar panel output DC disconnect comprises a voltage limited solar panel output DC disconnect.

53. A power managed solar energy system as described in claim 52 or any other claim wherein said voltage limited solar panel output DC disconnect comprises a field effect transistor breakdown limited solar panel output DC disconnect.

54. A power managed solar energy system as described in claim 52 or any other claim wherein said voltage limited solar panel output DC disconnect comprises an individual solar panel maximum voltage DC disconnect.

55. A power managed solar energy system as described in claim 54 or any other claim wherein said individual solar panel maximum voltage DC disconnect comprises an individual solar panel maximum voltage DC disconnect selected from a group consisting of:
 a practical maximum voltage individual solar panel maximum voltage DC disconnect;
 an established safety margin maximum voltage individual solar panel maximum voltage DC disconnect; and
 an electrical code maximum voltage individual solar panel maximum voltage DC disconnect.

56. A power managed solar energy system as described in claim 29 or any other claim wherein said solar panel output DC disconnect comprises a transistor disconnect control.

57. A power managed solar energy system as described in claim 56 or any other claim wherein said transistor disconnect control comprises a converter switch disconnect control.

58. A power managed solar energy system as described in claim 57 or any other claim wherein said converter switching disconnect control comprises a converter inoperability switch disconnect control.

59. A power managed solar energy system as described in claim 57 or any other claim wherein said converter inoperability switch disconnect control comprises a parallel converter switch disconnect control.

60. A power managed solar energy system as described in claim 57 or any other claim wherein said converter inoperability switch disconnect control comprises a converter global gate control.

61. A power managed solar energy system as described in claim 29, 30, 31, 33, or 50 or any other claim and further comprising a power tolerant solar panel disconnect control.

62. A power managed solar energy system as described in claim 61 or any other claim wherein said power tolerant solar panel disconnect control comprises a solar panel disconnect state recall.

63. A power managed solar energy system as described in claim 62 or any other claim wherein said solar panel disconnect state recall comprises a solar panel power up disconnect control.

64. A power managed solar energy system as described in claim 62 or any other claim wherein said solar panel disconnect state recall comprises a solar panel disconnect state recall selected from a group consisting of:
 a non-energy storage solar panel disconnect state recall, and
 a non-battery solar panel disconnect state recall.

65. A power managed solar energy system as described in claim 29, 30, 31, 33, or 50 or any other claim and further comprising reverse bias disconnect state protection circuitry.

66. A power managed solar energy system as described in claim 65 or any other claim wherein said reverse bias disconnect state protection circuitry comprises solar panel repower disconnect set circuitry.

67. A power managed solar energy system as described in claim 66 or any other claim wherein said solar panel repower disconnect set circuitry comprises solar panel repower disconnect state recall circuitry.

68. A power managed solar energy system as described in claim 29, 30, 31, 33, or 50 or any other claim and further comprising a solar panel power up disconnect set control.

69. A power managed solar energy system as described in claim 68 or any other claim wherein said solar panel power up disconnect set control comprises a solar panel disconnect pre-power set control.

70. A power managed solar energy system as described in claim 69 or any other claim wherein said solar panel disconnect pre-power set control comprises a solar panel disconnect pre-power state recall.

71. A power managed solar energy system as described in claim 29, 30, 31, 33, or 50 or any other claim and further comprising a low power generation solar panel disconnect control.

72. A power managed solar energy system as described in claim 71 or any other claim wherein said low power generation solar panel disconnect control comprises an indirect insolation power generation solar panel disconnect control.

73. A power managed solar energy system as described in claim 71 or any other claim wherein said low power generation solar panel disconnect control comprises a pre-conversion solar panel disconnect control input.

74. A power managed solar energy system as described in claim 29, 30, 31, 33, or 50 or any other claim and further comprising a secondary solar panel disconnect control.

75. A power managed solar energy system as described in claim 74 or any other claim wherein said secondary solar panel disconnect control comprises an independent secondary solar panel disconnect control.

76. A power managed solar energy system as described in claim 75 or any other claim wherein said independent secondary solar panel disconnect control comprises a radio transmission fail-safe solar panel disconnect control.

77. A power managed solar energy system comprising:
at least one solar panel having a DC photovoltaic output; and
an individual solar panel output DC disconnect electrically connected to said DC photovoltaic output.

78. A power managed solar energy system as described in claim 77 or any other claim wherein said at least one solar panel comprises a comprises at least one plurality of solar panels and further comprising a plurality of individually panel dedicated maximum photovoltaic power point converter functionality control circuitries.

79. A power managed solar energy system as described in claim 77 or any other claim and further comprising at least one string of electrical series responsive DC-DC converted solar panel outputs.

80. A power managed solar energy system as described in claim 79 or any other claim wherein said at least one string of electrical series responsive DC-DC converted solar panel outputs comprises a plurality of serially connected photovoltaic DC-DC power converters.

81. A power managed solar energy system as described in claim 80 or any other claim wherein said at least one string of electrical series responsive DC-DC converted solar panel outputs further comprises a plurality of individually panel dedicated maximum photovoltaic power point converter functionality controls.

82. A power managed solar energy system as described in claim 77 or any other claim wherein said solar panel output DC disconnect electrically connected to said DC photovoltaic output comprises a nominally open solar panel output DC disconnect.

83. A power managed solar energy system as described in claim 77 or any other claim and further comprising an individual solar panel disconnect control to which said solar panel output DC disconnect is responsive.

84. A power managed solar energy system as described in claim 83 or any other claim wherein said individual solar panel disconnect control comprises a selected default position solar panel disconnect control.

85. A power managed solar energy system as described in claim 83 or any other claim wherein said selected default position solar panel disconnect control comprises an open default position solar panel disconnect control.

86. A power managed solar energy system as described in claim 77 or any other claim and further comprising a control-independent output DC disconnect position information element.

87. A power managed solar energy system as described in claim 86 or any other claim and further comprising an independent output DC disconnect position authentication element.

88. A power managed solar energy system as described in claim 83 or any other claim wherein said individual solar panel disconnect control comprises a remote individual solar panel disconnect control.

89. A power managed solar energy system as described in claim 88 or any other claim wherein said remote individual solar panel disconnect control comprises a radio transmission individual solar panel disconnect control.

90. A power managed solar energy system as described in claim 77 or any other claim wherein said solar panel output DC disconnect comprises a transistor disconnect control.

91. A power managed solar energy system as described in claim 90 or any other claim wherein said transistor disconnect control comprises a converter switch disconnect control.

92. A power managed solar energy system as described in claim 91 or any other claim wherein said converter switching disconnect control comprises a converter inoperability switch disconnect control.

93. A power managed solar energy system as described in claim 91 or any other claim wherein said converter inoperability switch disconnect control comprises a parallel converter switch disconnect control.

94. A power managed solar energy system as described in claim 91 or any other claim wherein said converter inoperability switch disconnect control comprises a converter global gate control.

95. A method of power management for a solar energy system comprising the steps of:
providing at least one solar panel;
electrically containing said at least one solar panel in a containment having a DC photovoltaic output; and
individually disconnecting said DC photovoltaic output of said containment for said at least one solar panel.

96. A method of power management for a solar energy system as described in claim 95 or any other claim wherein said step of providing at least one solar panel comprises the step of providing at least one plurality of solar panels and further comprising the step of individually generating power at a panel dedicated maximum photovoltaic power point for said at least one plurality of solar panels.

97. A method of power management for a solar energy system as described in claim 95 or any other claim and further comprising the step of utilizing an electrical series responsive plurality of solar panels to generate electrical power.

98. A method of power management for a solar energy system as described in claim 97 or any other claim wherein said step of utilizing an electrical series responsive plurality of solar panels to generate electrical power comprises the step of utilizing a plurality of serially connected photovoltaic DC-DC power converters to generate electrical power.

99. A method of power management for a solar energy system as described in claim 98 or any other claim and further comprising the step of individually generating power at a panel dedicated maximum photovoltaic power point.

100. A method of power management for a solar energy system as described in claim 95 or any other claim wherein said step of integrally individually disconnecting said DC photovoltaic output of said containment for said at least one solar panel comprises the step of operating a nominally open individual solar panel output DC disconnect.

101. A method of power management for a solar energy system as described in claim 95 or any other claim and further comprising the step of individual panel controlling at least one solar panel disconnect.

102. A method of power management for a solar energy system as described in claim 101 or any other claim wherein said step of individual panel controlling at least one solar panel disconnect comprises the step of controlling a selected default position solar panel disconnect.

103. A method of power management for a solar energy system as described in claim 102 or any other claim wherein said step of controlling a selected default position solar panel disconnect comprises the step of controlling an open default position solar panel disconnect.

104. A method of power management for a solar energy system as described in claim 101 or any other claim wherein said step of individual panel controlling at least one solar panel disconnect comprises the step of individual panel controlling a power off default open solar panel disconnect.

105. A method of power management for a solar energy system as described in claim 104 or any other claim wherein said step of individual panel controlling a power off default open solar panel disconnect comprises the step of individual panel controlling a field effect transistor default open disconnect.

106. A method of power management for a solar energy system as described in claim 101 or any other claim wherein said step of individual panel controlling at least one solar panel disconnect comprises the step of an individual panel string sequestration controlling at least one solar panel disconnect.

107. A method of power management for a solar energy system as described in claim 101 or any other claim wherein said step of individual panel controlling at least one solar panel disconnect comprises the step of controlling an individual panel string deenergization.

108. A method of power management for a solar energy system as described in claim 95 or any other claim and further comprising the step of independently confirming a position of a solar panel disconnect.

109. A method of power management for a solar energy system as described in claim 108 or any other claim and further comprising the step of independently authenticating a position of a solar panel disconnect.

110. A method of power management for a solar energy system as described in claim 101 or any other claim wherein said step of individual panel controlling at least one solar panel disconnect comprises the step of individual panel controlling a state condition of at least one solar panel disconnect.

111. A method of power management for a solar energy system as described in claim 110 or any other claim wherein said step of individual panel controlling a state condition of at least one solar panel disconnect comprises the steps of:
individual panel controlling a manufacture state condition of at least one solar panel disconnect; and
individual panel controlling an operational state condition of at least one solar panel disconnect.

112. A method of power management for a solar energy system as described in claim 101 or 111 or any other claim and further comprising the step of establishing an individual panel installation state condition of at least one solar panel disconnect.

113. A method of power management for a solar energy system as described in claim 112 or any other claim wherein said step of establishing an individual panel installation state condition of at least one solar panel disconnect comprises the step of mechanically establishing an individual panel installation state condition of at least one solar panel disconnect.

114. A method of power management for a solar energy system as described in claim 112 or any other claim wherein said step of establishing an individual panel installation state condition of at least one solar panel disconnect comprises the step of operating a resettable solar panel disconnect state set control.

115. A method of power management for a solar energy system as described in claim 101 or any other claim wherein said step of individual panel controlling at least one solar panel disconnect comprises the step of remotely controlling individual operation of a plurality of solar panel disconnects.

116. A method of power management for a solar energy system as described in claim 115 or any other claim wherein said step of remotely controlling individual operation of a plurality of solar panel disconnects comprises the step of wireless controlling operation of a plurality of solar panel disconnects.

117. A method of power management for a solar energy system as described in claim 95 or any other claim wherein said step of integrally individually disconnecting said DC photovoltaic output of said containment for said at least one solar panel comprises the step of limited mode integrally individually disconnecting said DC photovoltaic output.

118. A method of power management for a solar energy system as described in claim 117 or any other claim wherein said step of limited mode integrally individually disconnecting said DC photovoltaic output comprises the step of voltage limited integrally individually disconnecting said DC photovoltaic output.

119. A method of power management for a solar energy system as described in claim 118 or any other claim wherein said step of voltage limited integrally individually disconnecting said DC photovoltaic output comprises the step of field effect transistor breakdown limited integrally individually disconnecting said DC photovoltaic output.

120. A method of power management for a solar energy system as described in claim 118 or any other claim wherein said step of voltage limited integrally individually disconnecting said DC photovoltaic output comprises the step of individual solar panel maximum voltage limited integrally individually disconnecting said DC photovoltaic output.

121. A method of power management for a solar energy system as described in claim 120 or any other claim wherein said step of individual solar panel maximum voltage limited integrally individually disconnecting said DC photovoltaic output comprises the step of individual solar panel maximum voltage limited integrally individually disconnecting said DC photovoltaic output selected from a group consisting of:
practical maximum voltage limited disconnecting said DC photovoltaic output;
established safety margin maximum voltage limited disconnecting said DC photovoltaic output; and
electrical code maximum voltage limited disconnecting said DC photovoltaic output.

122. A method of power management for a solar energy system as described in claim 95 or any other claim wherein said step of integrally individually disconnecting said DC photovoltaic output of said containment for said at least one solar panel comprises the step of controlling individual solar panel transistors.

123. A method of power management for a solar energy system as described in claim 122 or any other claim wherein said step of controlling individual solar panel transistors comprises the step of switching at least one individual solar panel converter.

124. A method of power management for a solar energy system as described in claim 123 or any other claim wherein said step of switching at least one individual solar panel converter comprises the step of making at least one individual solar panel converter inoperable.

125. A method of power management for a solar energy system as described in claim 123 or any other claim wherein said step of making at least one individual solar panel converter inoperable comprises the step of operating parallel converter switches.

126. A method of power management for a solar energy system as described in claim 123 or any other claim wherein said step of switching at least one individual solar panel converter comprises the step of globally gating a plurality of solar panel converters.

127. A method of power management for a solar energy system as described in claim 95, 96, 97, 99, or 116 or any other claim and further comprising the step of power tolerantly establishing a solar panel disconnect state condition.

128. A method of power management for a solar energy system as described in claim 127 or any other claim wherein said step of power tolerantly establishing a solar panel disconnect state condition comprises the step of recalling a solar panel disconnect state condition.

129. A method of power management for a solar energy system as described in claim 128 or any other claim wherein said step of recalling a solar panel disconnect state condition comprises the step of establishing a solar panel power up disconnect state condition.

130. A method of power management for a solar energy system as described in claim 128 or any other claim wherein said step of recalling a solar panel disconnect state condition comprises the step of recalling a solar panel disconnect state condition selected from a group consisting of:
non-energy storage recalling a solar panel disconnect state condition, and
non-battery recalling a solar panel disconnect state condition.

131. A method of power management for a solar energy system as described in claim 95, 96, 97, 99, or 116 or any other claim and further comprising the step of reverse bias disconnecting at least one individual solar panel.

132. A method of power management for a solar energy system as described in claim 131 or any other claim wherein said step of reverse bias disconnecting at least one individual solar panel comprises the step of establishing a solar panel repower disconnect state condition.

133. A method of power management for a solar energy system as described in claim 132 or any other claim wherein said step of establishing a solar panel repower disconnect state condition comprises the step of recalling a solar panel repower disconnect state condition.

134. A method of power management for a solar energy system as described in claim 95, 96, 97, 99, or 116 or any other claim and further comprising the step of establishing a solar panel power-up disconnect state condition.

135. A method of power management for a solar energy system as described in claim 134 or any other claim wherein said step of establishing a solar panel power-up disconnect state condition comprises the step of establishing a solar panel pre-power disconnect state condition.

136. A method of power management for a solar energy system as described in claim 135 or any other claim wherein said step of establishing a solar panel pre-power disconnect state condition comprises the step of recalling a solar panel pre-power disconnect state condition.

137. A method of power management for a solar energy system as described in claim 95, 96, 97, 99, or 116 or any other claim and further comprising the step of low power generation controlling a solar panel disconnect.

138. A method of power management for a solar energy system as described in claim 137 or any other claim wherein said step of low power generation controlling a solar panel disconnect comprises the step of utilizing indirect insolation power.

139. A method of power management for a solar energy system as described in claim 137 or any other claim wherein said step of providing a low power generation controlling a solar panel disconnect comprises the step of utilizing pre-conversion solar panel power.

140. A method of power management for a solar energy system as described in claim 95, 96, 97, 99, or 116 or any other claim and further comprising the step of operating a secondary solar panel disconnect control.

141. A method of power management for a solar energy system as described in claim 140 or any other claim wherein said step of operating a secondary solar panel disconnect control comprises the step of operating an independent secondary solar panel disconnect control.

142. A method of power management for a solar energy system as described in claim 141 or any other claim wherein said step of operating an independent secondary solar panel disconnect control comprises the step of operating a radio transmission fail-safe solar panel disconnect control.

143. A method of power management for a solar energy system comprising the steps of:

providing at least one solar panel having a DC photovoltaic output; and integrally individually disconnecting said DC photovoltaic output for said at least one solar panel.

144. A method of power management for a solar energy system as described in claim 143 or any other claim wherein said step of providing at least one solar panel comprises the step of providing at least one plurality of solar panels and further comprising the step of individually generating power at a panel dedicated maximum photovoltaic power point for said at least one plurality of solar panels.

145. A method of power management for a solar energy system as described in claim 143 or any other claim and further comprising the step of utilizing an electrical series responsive plurality of solar panels to generate electrical power.

146. A method of power management for a solar energy system as described in claim 145 or any other claim wherein said step of utilizing an electrical series responsive plurality of solar panels to generate electrical power comprises the step of utilizing a plurality of serially connected photovoltaic DC-DC power converters to generate electrical power.

147. A method of power management for a solar energy system as described in claim 146 or any other claim and further comprising the step of individually generating power at a panel dedicated maximum photovoltaic power point.

148. A method of power management for a solar energy system as described in claim 143 or any other claim wherein said step of integrally individually disconnecting said DC photovoltaic output comprises the step of operating a nominally open individual solar panel output DC disconnect.

149. A method of power management for a solar energy system as described in claim 143 or any other claim and further comprising the step of individual panel controlling at least one solar panel disconnect.

150. A method of power management for a solar energy system as described in claim 149 or any other claim wherein said step of individual panel controlling at least one solar panel disconnect comprises the step of controlling a selected default position solar panel disconnect.

151. A method of power management for a solar energy system as described in claim 150 or any other claim wherein said step of controlling a selected default position solar panel disconnect comprises the step of controlling an open default position solar panel disconnect.

152. A method of power management for a solar energy system as described in claim 143 or any other claim and further comprising the step of independently confirming a position of a solar panel disconnect.

153. A method of power management for a solar energy system as described in claim 152 and further comprising the step of independently authenticating a position of a solar panel disconnect.

154. A method of power management for a solar energy system as described in claim 149 or any other claim wherein said step of individual panel controlling at least one solar panel disconnect comprises the step of remotely controlling individual operation of a plurality of solar panel disconnects.

155. A method of power management for a solar energy system as described in claim 54 or any other claim wherein said step of remotely controlling individual operation of a plurality of solar panel disconnects comprises the step of wireless controlling operation of a plurality of solar panel disconnects.

156. A method of power management for a solar energy system as described in claim 143 or any other claim wherein said step of integrally individually disconnecting said DC photovoltaic output comprises the step of controlling individual solar panel transistors.

157. A method of power management for a solar energy system as described in claim 156 or any other claim wherein said step of controlling individual solar panel transistors comprises the step of switching at least one individual solar panel converter.

158. A method of power management for a solar energy system as described in claim 157 or any other claim wherein said step of switching at least one individual solar panel converter comprises the step of making at least one individual solar panel converter inoperable.

159. A method of power management for a solar energy system as described in claim 157 or any other claim wherein said step of making at least one individual solar panel converter inoperable comprises the step of operating parallel converter switches.

160. A method of power management for a solar energy system as described in claim 161 or any other claim wherein said step of switching at least one individual solar panel converter comprises the step of globally gating a plurality of solar panel converters.

161. A method of activation for a solar energy system comprising the steps of:
establishing at least one plurality of solar energy sources, each having a DC photovoltaic output;
electrically combining said plurality of DC photovoltaic outputs from said plurality of solar energy sources in a photovoltaic power combination circuit to support a substantial solar energy electrical power output;
establishing at least a portion of said DC photovoltaic outputs electrically disconnected from said photovoltaic power combination circuit;
subjecting said plurality of solar energy sources to solar insolation;
sequentially electrically connecting at least a portion of said DC photovoltaic outputs to said photovoltaic power combination circuit;
causing substantially full solar energy source photovoltaic input to said photovoltaic power combination circuit; and
supporting a substantial solar energy electrical power output by said substantially full solar energy source photovoltaic input through said photovoltaic power combination circuit to generate electrical power.

162. A method of activation for a solar energy system as described in claim 161 or any other claim wherein said step of establishing at least a portion of said DC photovoltaic outputs electrically disconnected from said photovoltaic power combination circuit comprises the step of defaulting to an open switch state for at least a portion of said DC photovoltaic outputs.

163. A method of activation for a solar energy system as described in claim 161 or any other claim wherein said step of sequentially electrically connecting at least a portion of said DC photovoltaic outputs to said photovoltaic power combination circuit comprises the step of electrically gradually increasing at least one electrical parameter for said photovoltaic power combination circuit.

164. A method of activation for a solar energy system as described in claim 163 or any other claim wherein said step of electrically gradually increasing at least one electrical parameter for said photovoltaic power combination circuit comprises the step of electrically gradually increasing an electrical parameter selected from a group consisting of: a solar panel string voltage, a solar panel string current, a solar panel string power, a solar panel inverter input voltage, a solar panel inverter input current, a solar panel inverter input power, a solar panel voltage, a solar panel current, and a solar panel power.

165. A method of activation for a solar energy system as described in claim 161 or 163 or any other claim and further comprising the step of utilizing an electrical series responsive plurality of solar panels to generate electrical power.

166. A method of activation for a solar energy system as described in claim 165 or any other claim wherein said step of utilizing an electrical series responsive plurality of solar panels to generate electrical power comprises the step of utilizing a plurality of serially connected photovoltaic DC-DC power converters to generate electrical power.

167. A method of activation for a solar energy system as described in claim 163 or 166 or any other claim and further comprising the step of individually generating power at a panel dedicated maximum photovoltaic power point.

168. A method of activation for a solar energy system as described in claim 161 or 165 or any other claim wherein said step of sequentially electrically connecting at least a portion of said DC photovoltaic outputs to said photovoltaic power combination circuit comprises the step of sequentially controlling operation of a plurality of solar panels in said photovoltaic power combination circuit.

169. A method of activation for a solar energy system as described in claim 168 or any other claim wherein said step of sequentially controlling operation of a plurality of solar panels in said photovoltaic power combination circuit comprises the step of remotely controlling operation of a plurality of solar panels in said photovoltaic power combination circuit.

170. A method of activation for a solar energy system as described in claim 169 or any other claim wherein said step of remotely controlling operation of a plurality of solar panels in said photovoltaic power combination circuit comprises the step of wireless controlling operation of a plurality of solar panels in said photovoltaic power combination circuit.

171. A method of activation for a solar energy system as described in claim 165 or any other claim wherein said step of sequentially electrically connecting at least a portion of said DC photovoltaic outputs to said photovoltaic power combination circuit comprises the step of alterably controlling electrical operation of a plurality of solar panels in said photovoltaic power combination circuit.

172. A method of activation for a solar energy system as described in claim 171 or any other claim wherein said step of alterably controlling electrical operation of a plurality of solar panels in said photovoltaic power combination circuit comprises the step of programmably controlling electrical operation of a plurality of solar panels in said photovoltaic power combination circuit.

173. A method of activation for a solar energy system as described in claim 172 or any other claim wherein said step of programmably controlling electrical operation of a plurality of solar panels in said photovoltaic power combination circuit comprises the step of condition dependently controlling electrical operation of a plurality of solar panels in said photovoltaic power combination circuit.

174. A method of activation for a solar energy system as described in claim 173 or any other claim wherein said step of condition dependently controlling electrical operation of a plurality of solar panels in said photovoltaic power combination circuit comprises the step of condition dependently controlling electrical operation of a plurality of solar panels based on at least one condition selected from a group consisting of: a panel disconnected output condition, an insolation condition, an electrical condition, and a transient condition.

175. A method of activation for a solar energy system as described in claim 161 or any other claim wherein said step of sequentially electrically connecting at least a portion of said DC photovoltaic outputs to said photovoltaic power combination circuit comprises the step of one-by-one electrically connecting at least a portion of said DC photovoltaic outputs to said photovoltaic power combination circuit.

176. A method of activation for a solar energy system as described in claim 171 or any other claim wherein said step of one-by-one electrically connecting at least a portion of said DC photovoltaic outputs to said photovoltaic power combination circuit comprises the step of ordered connecting at least a portion of said DC photovoltaic outputs to said photovoltaic power combination circuit.

177. A method of activation for a solar energy system as described in claim 171 or any other claim wherein said step of ordered connecting at least a portion of said DC photovoltaic outputs to said photovoltaic power combination circuit comprises the step of inter-string connecting at least a portion of said DC photovoltaic outputs to said photovoltaic power combination circuit.

178. A method of activation for a solar energy system as described in claim 177 or any other claim wherein said step of ordered connecting at least a portion of said DC photovoltaic outputs to said photovoltaic power combination circuit comprises the step of intra-string connecting at least a portion of said DC photovoltaic outputs to said photovoltaic power combination circuit.

179. A method of activation for a solar energy system comprising the steps of:
establishing at least one plurality of solar energy sources, each having a DC photovoltaic output;
sequentially electrically connecting at least a portion of said DC photovoltaic outputs to a photovoltaic power combination circuit; and
generating substantial solar energy electrical power output from said photovoltaic power combination circuit.

180. A method of activation for a solar energy system as described in claim 179 or any other claim wherein said step of sequentially electrically connecting at least a portion of said DC photovoltaic outputs to said photovoltaic power combination circuit comprises the step of electrically gradually increasing at least one electrical parameter for said photovoltaic power combination circuit.

181. A method of activation for a solar energy system as described in claim 180 or any other claim wherein said step of electrically gradually increasing at least one electrical parameter for said photovoltaic power combination circuit comprises the step of electrically gradually increasing an electrical parameter selected from a group consisting of: a solar panel string voltage, a solar panel string current, a solar panel string power, a solar panel inverter input voltage, a solar panel inverter input current, a solar panel inverter input power, a solar panel voltage, a solar panel current, and a solar panel power.

182. A method of activation for a solar energy system as described in claim 179 or 180 or any other claim and further comprising the step of utilizing an electrical series responsive plurality of solar panels to generate electrical power.

183. A method of activation for a solar energy system as described in claim 182 or any other claim wherein said step of utilizing an electrical series responsive plurality of solar panels to generate electrical power comprises the step of utilizing a plurality of serially connected photovoltaic DC-DC power converters to generate electrical power.

184. A method of activation for a solar energy system as described in claim 180 or 183 or any other claim and further comprising the step of individually generating power at a panel dedicated maximum photovoltaic power point.

185. A method of activation for a solar energy system as described in claim 180 or any other claim wherein said step of sequentially controlling operation of a plurality of solar panels in said photovoltaic power combination circuit comprises the step of remotely controlling operation of a plurality of solar panels in said photovoltaic power combination circuit.

186. A method of activation for a solar energy system as described in claim 185 or any other claim wherein said step of remotely controlling operation of a plurality of solar panels in said photovoltaic power combination circuit comprises the step of wireless controlling operation of a plurality of solar panels in said photovoltaic power combination circuit.

187. A method of activation for a solar energy system as described in claim 182 or any other claim wherein said step of sequentially electrically connecting at least a portion of said DC photovoltaic outputs to said photovoltaic power combination circuit comprises the step of alterably controlling electrical operation of a plurality of solar panels in said photovoltaic power combination circuit.

188. A method of activation for a solar energy system as described in claim 187 or any other claim wherein said step of alterably controlling electrical operation of a plurality of solar panels in said photovoltaic power combination circuit comprises the step of programmably controlling electrical operation of a plurality of solar panels in said photovoltaic power combination circuit.

189. A method of activation for a solar energy system as described in claim 188 or any other claim wherein said step of programmably controlling electrical operation of a plurality of solar panels in said photovoltaic power combination circuit comprises the step of condition dependently controlling electrical operation of a plurality of solar panels in said photovoltaic power combination circuit.

190. A method of activation for a solar energy system as described in claim 189 or any other claim wherein said step of condition dependently controlling electrical operation of a plurality of solar panels in said photovoltaic power combination circuit comprises the step of condition dependently controlling electrical operation of a plurality of solar panels based on at least one condition selected from a group consisting of: a panel disconnected output condition, an insolation condition, an electrical condition, and a transient condition.

191. An activation-protected solar energy system comprising:
at least one plurality of solar energy sources, each having a DC photovoltaic output;
a photovoltaic power combination circuit responsive to at least some of said plurality of DC photovoltaic outputs; and
an electrically sequential solar energy source connection control to which said photovoltaic power combination circuit is responsive.

192. An activation-protected solar energy system as described in claim 191 or any other claim and further comprising an open default position solar panel disconnect control.

193. An activation-protected solar energy system as described in claim 191 or any other claim wherein said electrically sequential solar energy source connection control comprises an electrical parameter gradual increase solar energy source connection control.

194. An activation-protected solar energy system as described in claim 193 or any other claim wherein said electrical parameter gradual increase solar energy source connection control gradually increases an electrical parameter selected from a group consisting of:
a solar panel string voltage,
a solar panel string current,
a solar panel string power,
a solar panel inverter input voltage,
a solar panel inverter input current,
a solar panel inverter input power,
a solar panel voltage,
a solar panel current, and
a solar panel power.

195. An activation-protected solar energy system as described in claim 191 or 193 or any other claim and further comprising at least one string of electrical series responsive DC-DC converted solar panel outputs.

196. An activation-protected solar energy system as described in claim 195 or any other claim wherein said wherein said at least one string of electrical series responsive DC-DC converted solar panel outputs comprises a plurality of serially connected photovoltaic DC-DC power converters.

197. An activation-protected solar energy system as described in claim 193 or 196 or any other claim and further comprising a plurality of individually panel dedicated maximum photovoltaic power point converter functionality controls.

198. An activation-protected solar energy system as described in claim 191 or 195 or any other claim wherein said electrically sequential solar energy source connection control comprises an electrically sequential plurality of solar panels connection control.

199. An activation-protected solar energy system as described in claim 198 or any other claim wherein said electrically sequential plurality of solar panels connection control comprises a remote sequential solar panel connection control.

200. An activation-protected solar energy system as described in claim 199 or any other claim wherein said remote sequential solar panel connection control comprises a radio transmission sequential solar panel connection control.

201. An activation-protected solar energy system as described in claim 195 or any other claim wherein said electrically sequential solar energy source connection control comprises an alterable electrically sequential solar energy source connection control.

202. An activation-protected solar energy system as described in claim 201 or any other claim wherein said alterable electrically sequential solar energy source connection control comprises a programmable solar energy source connection control.

203. An activation-protected solar energy system as described in claim 202 or any other claim wherein said programmable solar energy source connection control comprises a condition dependent solar energy source connection control.

204. An activation-protected solar energy system as described in claim 203 or any other claim wherein said condition dependent solar energy source connection control comprises a condition dependent solar energy source connection control based on at least one condition selected from a group consisting of: a panel disconnected output condition, an insolation condition, an electrical condition, and a transient condition.

205. An activation-protected solar energy system as described in claim 191 or any other claim wherein said electrically sequential solar energy source connection control comprises a one panel-by-one panel solar energy source connection control.

206. An activation-protected solar energy system as described in claim 201 or any other claim wherein said one panel-by-one panel solar energy source connection control comprises an ordered sequential solar energy source connection control.

207. An activation-protected solar energy system as described in claim 206 or any other claim wherein said ordered sequential solar energy source connection control comprises an inter-string sequential solar energy source connection control.

208. An activation-protected solar energy system as described in claim 207 or any other claim wherein said ordered sequential solar energy source connection control comprises an intra-string sequential solar energy source connection control.

209. An activation-protected solar energy system comprising:
   at least one plurality of solar energy sources, each having a DC photovoltaic output; and
   an electrically sequential solar energy source connection control to which said at least one plurality of solar energy sources is responsive.

210. An activation-protected solar energy system as described in claim 209 or any other claim wherein said electrically sequential solar energy source connection control comprises an electrical parameter gradual increase solar energy source connection control.

211. An activation-protected solar energy system as described in claim 210 or any other claim wherein said electrical parameter gradual increase solar energy source connection control gradually increases an electrical parameter selected from a group consisting of:
   a solar panel string voltage,
   a solar panel string current,
   a solar panel string power,
   a solar panel inverter input voltage,
   a solar panel inverter input current,
   a solar panel inverter input power,
   a solar panel voltage,
   a solar panel current, and
   a solar panel power.

212. An activation-protected solar energy system as described in claim 209 or 210 or any other claim and further comprising at least one string of electrical series responsive DC-DC converted solar panel outputs.

213. An activation-protected solar energy system as described in claim 212 or any other claim wherein said wherein said at least one string of electrical series responsive DC-DC converted solar panel outputs comprises a plurality of serially connected photovoltaic DC-DC power converters.

214. An activation-protected solar energy system as described in claim 210 or 213 or any other claim and further comprising a plurality of individually panel dedicated maximum photovoltaic power point converter functionality controls.

215. An activation-protected solar energy system as described in claim 209 or 212 or any other claim wherein said electrically sequential solar energy source connection control comprises a electrically sequential plurality of solar panels connection control.

216. An activation-protected solar energy system as described in claim 215 or any other claim wherein said electrically sequential plurality of solar panels connection control comprises a remote sequential solar panel connection control.

217. An activation-protected solar energy system as described in claim 216 or any other claim wherein said remote sequential solar panel connection control comprises a radio transmission sequential solar panel connection control.

218. An activation-protected solar energy system as described in claim 216 or any other claim wherein said programmable solar energy source connection control comprises condition dependent solar energy source connection control.

219. An activation-protected solar energy system as described in claim 209 or any other claim wherein said electrically sequential solar energy source connection control comprises an inter-string sequential solar energy source connection control.

220. An activation-protected solar energy system as described in claim 209 or any other claim wherein said electrically sequential solar energy source connection control comprises an intra-string sequential solar energy source connection control.

221 A method of power secure handling of a solar energy system comprising the steps of:
   providing at least one plurality of interchangeable DC photovoltaic safety output condition solar energy sources, each having a DC photovoltaic output;
   electrically combining said plurality of DC photovoltaic outputs from said plurality of solar energy sources in a photovoltaic power combination circuit; and
   electrically transitioning at least one of said interchangeable DC photovoltaic safety output condition solar energy sources from a first DC photovoltaic safety output condition to a second DC photovoltaic safety output condition.

222. A method of power secure handling of a solar energy system as described in claim 221 or any other claim wherein said interchangeable DC photovoltaic safety output condition comprises an interchangeable safety output condition selected from a group consisting of a safety output operable condition and a safety output interrupt condition.

223. A method of power secure handling of a solar energy system as described in claim 222 or any other claim and further comprising the steps of:
   subjecting said plurality of solar energy sources to solar insolation;
   generating solar energy electrical power from said plurality of DC photovoltaic outputs in response to said solar insolation; and
   independently electrically disconnecting at least one of said plurality of solar panel outputs.

224. A method of power secure handling of a solar energy system as described in claim 223 or any other claim and further comprising the steps of:
   re-establishing said plurality of solar energy sources in a safely operable condition; and thereafter generating solar energy electrical power from said plurality of DC photovoltaic outputs in response to solar insolation.

225. A method of power secure handling of a solar energy system as described in claim 222 or any other claim and further comprising the step of re-establishing at least one of said solar energy sources in a safely operable condition.

226. A method of power secure handling of a solar energy system as described in claim 225 or any other claim and further comprising the step of generating solar energy electrical power from said plurality of DC photovoltaic outputs in response to said solar insolation.

227. A method of power secure handling of a solar energy system as described in claim 221 or any other claim and further comprising the step of sensing an electrically contrary solar power condition at some point within said solar energy system.

228. A method of power secure handling of a solar energy system as described in claim 227 or any other claim and further comprising the step of electrically disconnecting at least one of said plurality of solar panel outputs in response to said step of sensing an electrically contrary solar power condition at some point within said solar energy system.

229. A method of power secure handling of a solar energy system as described in claim 222 or 227 or any other claim and further comprising the step of remotely controlling said step of electrically transitioning at least one of said interchangeable DC photovoltaic safety output condition solar energy sources from a first DC photovoltaic safety output condition to a second DC photovoltaic safety output condition.

230. A method of power secure handling of a solar energy system as described in claim 227, 228, or 229 or any other claim wherein the step of sensing an electrically contrary solar power condition at some point within said solar energy system comprises the step of sensing a ground fault solar power condition within said solar energy system.

231. A method of power secure handling of a solar energy system as described in claim 222, 227, or 229 or any other claim and further comprising the step of redundantly commanding a transition from a safety output interrupt condition to a safety output operable condition.

232. A method of power secure handling of a solar energy system as described in claim 222, 227, 229, or 231 or any other claim and further comprising the step of securely commanding a transition from a safety output interrupt condition to a safety output operable condition.

233. A method of power secure handling of a solar energy system as described in claim 221 or any other claim wherein said step of independently electrically disconnecting at least one of said plurality of solar panel outputs from said photovoltaic power combination circuit comprises the step of independently electrically DC disconnecting at least one of said plurality of DC solar panel outputs from said photovoltaic power combination circuit.

234. A method of power secure handling of a solar energy system as described in claim 233 or any other claim and further comprising the step of remotely reporting subsequent to the step of independently electrically DC disconnecting at least one of said plurality of DC solar panel outputs from said photovoltaic power combination circuit.

235. A method of power secure handling of a solar energy system as described in claim 221 or any other claim wherein said step of establishing at least one plurality of solar energy sources comprises the step of establishing at least one plurality of solar panels and further comprising the step of individually generating power at a panel dedicated maximum photovoltaic power point.

236. A method of power secure handling of a solar energy system as described in claim 221 or any other claim wherein said step of generating solar energy electrical power from said plurality of DC photovoltaic outputs in response to said solar insolation comprises the step of utilizing an electrical series responsive plurality of solar panels to generate electrical power.

237. A method of power secure handling of a solar energy system as described in claim 236 or any other claim wherein said step of utilizing an electrical series responsive plurality of solar panels to generate electrical power comprises the step of utilizing a plurality of serially connected photovoltaic DC-DC power converters to generate electrical power.

238. A method of power secure handling of a solar energy system as described in claim 237 or any other claim and further comprising the step of individually generating power at a panel dedicated maximum photovoltaic power point.

239. A method of power secure handling of a solar energy system as described in claim 221 or any other claim wherein said step of electrically transitioning at least one of said interchangeable DC photovoltaic safety output condition solar energy sources from a first DC photovoltaic safety output condition to a second DC photovoltaic safety output condition comprises the step of independently switching a DC output of at least one of a plurality of solar panel outputs.

240. A method of power secure handling of a solar energy system as described in claim 221 or any other claim and further comprising the step of individual panel DC converting a DC photovoltaic output and wherein said step of independently electrically disconnecting at least one of said plurality of solar panel outputs from said photovoltaic power combination circuit comprises the step of independently electrically discontinuing said step of individual panel DC converting a DC photovoltaic output.

241. A method of power secure handling of a solar energy system as described in claim 221 or any other claim and further comprising the step of individual panel DC-AC inverting a DC photovoltaic output and wherein said step of independently electrically disconnecting at least one of said plurality of solar panel outputs from said photovoltaic power combination circuit comprises the step of independently electrically discontinuing said step of individual panel DC-AC inverting a DC photovoltaic output.

242. A method of power secure handling of a solar energy system as described in claim 227 or any other claim wherein said step of sensing an electrically contrary solar power condition at some point within said solar energy system comprises the step of individually panel sensing an electrically contrary solar power condition for said solar energy system.

243. A method of power secure handling of a solar energy system as described in claim 227 or 242 or any other claim wherein said step of sensing an electrically contrary solar power condition at some point within said solar energy system comprises the step of sensing a high current condition within said solar energy system.

244. A method of power secure handling of a solar energy system as described in claim 227 or 242 or any other claim wherein said step of sensing an electrically contrary solar power condition at some point within said solar energy system comprises the step of sensing a high voltage condition within said solar energy system.

245. A method of power secure handling of a solar energy system as described in claim 221 or 244 or any other claim wherein said step of electrically transitioning at least one of said interchangeable DC photovoltaic safety output condition solar energy sources from a first DC photovoltaic safety output condition to a second DC photovoltaic safety output condition comprises the step of interrupting an arc condition within said solar energy system.

246. A method of power secure handling of a solar energy system as described in claim 221 or any other claim wherein said step of electrically transitioning at least one of said interchangeable DC photovoltaic safety output condition solar energy sources from a first DC photovoltaic safety output condition to a second DC photovoltaic safety output condition comprises the step of controlling field effect transistor switching within said solar energy system.

247. A method of power secure handling of a solar energy system as described in claim 246 or any other claim wherein said step of controlling field effect transistor switching within said solar energy system comprises the step of controlling individual panel DC-DC converter transistor switching within said solar energy system.

248. A method of power secure handling of a solar energy system as described in claim 247 or any other claim wherein said step of controlling individual panel DC-DC converter transistor switching within said solar energy system comprises the step of inoperability DC-DC converter transistor switching within said solar energy system.

249. A method of power secure handling of a solar energy system as described in claim 247 or any other claim wherein said step of inoperability DC-DC converter transistor switching comprises the step of DC-DC converter total transistor switching.

250. A method of power secure handling of a solar energy system comprising the steps of:
providing at least one solar energy source having an interchangeable DC photovoltaic safety output condition; and
transitioning said interchangeable DC photovoltaic safety output condition from a first DC photovoltaic safety output condition to a second DC photovoltaic safety output condition.

251. A method of power secure handling of a solar energy system as described in claim 250 or any other claim wherein said interchangeable DC photovoltaic safety output condition comprises an interchangeable safety output condition selected from a group consisting of a safety output operable condition and a safety output interrupt condition.

252. A method of power secure handling of a solar energy system as described in claim 250 or any other claim and further comprising the step of sensing an electrically contrary solar power condition at some point within said solar energy system.

253. A method of power secure handling of a solar energy system as described in claim 252 or any other claim and further comprising the step of electrically disconnecting at least one of said plurality of solar panel outputs in response to said step of sensing an electrically contrary solar power condition at some point within said solar energy system.

254. A method of power secure handling of a solar energy system as described in claim 251 or 252 or any other claim and further comprising the step of remotely controlling said step of electrically transitioning at least one of said interchangeable DC photovoltaic safety output condition solar energy sources from a first DC photovoltaic safety output condition to a second DC photovoltaic safety output condition.

255. A method of power secure handling of a solar energy system as described in claim 252, 253, or 254 or any other claim wherein the step of sensing an electrically contrary solar power condition at some point within said solar energy system comprises the step of sensing a ground fault solar power condition within said solar energy system.

256. A method of power secure handling of a solar energy system as described in claim 251, 252, or 254 or any other claim and further comprising the step of redundantly commanding a transition from a safety output interrupt condition to a safety output operable condition.

257. A method of power secure handling of a solar energy system as described in claim 251, 252, 254, or 256 or any other claim and further comprising the step of securely commanding a transition from a safety output interrupt condition to a safety output operable condition.

258. A method of power secure handling of a solar energy system as described in claim 250 or any other claim wherein said step of independently electrically disconnecting at least one of said plurality of solar panel outputs from said photovoltaic power combination circuit comprises the step of independently electrically DC disconnecting at least one of said plurality of DC solar panel outputs from said photovoltaic power combination circuit.

259. A method of power secure handling of a solar energy system as described in claim 250 or any other claim wherein said step of establishing at least one plurality of solar energy sources comprises the step of establishing at least one plurality of solar panels and further comprising the step of individually generating power at a panel dedicated maximum photovoltaic power point.

260. A method of power secure handling of a solar energy system as described in claim 250 or any other claim and further comprising the step of utilizing an electrical series responsive plurality of solar panels to generate electrical power.

261. A method of power secure handling of a solar energy system as described in claim 260 or any other claim wherein said step of utilizing an electrical series responsive plurality of solar panels to generate electrical power comprises the step of utilizing a plurality of serially connected photovoltaic DC-DC power converters to generate electrical power.

262. A method of power secure handling of a solar energy system as described in claim 261 or any other claim and further comprising the step of individually generating power at a panel dedicated maximum photovoltaic power point.

263. A method of power secure handling of a solar energy system comprising the steps of:
providing at least one solar energy source having an interchangeable DC photovoltaic safety output condition; and
transitioning said interchangeable DC photovoltaic safety output condition from a first DC photovoltaic safety output condition to a second DC photovoltaic safety output condition.

264. A method of power secure handling of a solar energy system as described in claim 250 or any other claim wherein said step of transitioning said interchangeable DC photovoltaic safety output condition from a first DC pho- tovoltaic safety output condition to a second DC photovoltaic safety output condition comprises the step of independently switching a DC output of at least one of a plurality of solar panel outputs.

265. A method of power secure handling of a solar energy system as described in claim 250 or any other claim wherein said step of sensing an electrically contrary solar power condition at some point within said solar energy system comprises the step of individually panel sensing an electrically contrary solar power condition for said solar energy system.

266. A method of power secure handling of a solar energy system as described in claim 250 or 265 or any other claim wherein said step of sensing an electrically contrary solar power condition at some point within said solar energy system comprises the step of sensing a high current condition within said solar energy system.

267. A method of power secure handling of a solar energy system as described in claim 250 or 265 or any other claim wherein said step of sensing an electrically contrary solar power condition at some point within said solar energy system comprises the step of sensing a high voltage condition within said solar energy system.

268. A method of power secure handling of a solar energy system as described in claim 250 or 267 or any other claim wherein said step of electrically transitioning at least one of said interchangeable DC photovoltaic safety output condition solar energy sources from a first DC photovoltaic safety output condition to a second DC photovoltaic safety output condition comprises the step of interrupting an arc condition within said solar energy system.

269. A method of power secure handling of a solar energy system as described in claim 250 or any other claim wherein said step of electrically transitioning at least one of said interchangeable DC photovoltaic safety output condition solar energy sources from a first DC photovoltaic safety output condition to a second DC photovoltaic safety output condition comprises the step of controlling field effect transistor switching within said solar energy system.

270. A method of power secure handling of a solar energy system as described in claim 269 or any other claim wherein said step of controlling field effect transistor switching within said solar energy system comprises the step of controlling individual panel DC-DC converter transistor switching within said solar energy system.

271. A power secure solar energy system comprising:
at least one interchangeable DC photovoltaic safety output condition solar energy sources; and
a photovoltaic output condition transition controller to which said DC photovoltaic safety output condition is responsive.

272. A power secure solar energy system comprising:
a plurality of interchangeable DC photovoltaic safety output condition solar energy sources having a DC photovoltaic output with an interchangeable DC photovoltaic safety output condition; and
a photovoltaic safety output condition transition controller to which each said DC photovoltaic safety output condition is responsive and capable of transitioning said interchangeable DC photovoltaic safety output condition from a first DC photovoltaic safety output condition to a second DC photovoltaic safety output condition; and
a photovoltaic power combination circuit responsive to at least some of said plurality of interchangeable DC photovoltaic safety output condition solar energy sources.

273. A power secure solar energy system as described in claim 272 or any other claim wherein said interchangeable DC photovoltaic safety output condition comprises an interchangeable safety output condition selected from a group consisting of a safety output operable condition and a safety output interrupt condition.

274. A power secure solar energy system as described in claim 273 or any other claim and further comprising a plurality of individual solar panel output DC disconnects.

275. A power secure solar energy system as described in claim 276 or any other claim and further comprising at least one electrically contrary solar power condition sensor within said solar energy system.

276. A power secure solar energy system as described in claim 275 or any other claim wherein said photovoltaic safety output condition transition controller is responsive to said at least one electrically contrary solar power condition sensor.

277. A power secure solar energy system as described in claim 273 or 275 or any other claim and further comprising a remote power functionality change controller to which said photovoltaic safety output condition transition controller is responsive.

278. A power secure solar energy system as described in claim 275, 276, or 277 or any other claim wherein said electrically contrary solar power condition sensor comprises a ground fault solar power condition solar power condition sensor.

279. A power secure solar energy system as described in claim 273, 275, or 277 or any other claim and further comprising a redundant photovoltaic safety output condition transition control.

280. A power secure solar energy system as described in claim 273, 277, 275, or 279 or any other claim wherein said photovoltaic safety output condition transition controller comprises a secure photovoltaic safety output condition transition controller.

281. A power secure solar energy system as described in claim 273 or any other claim and further comprising a plurality of individual solar panel output DC disconnects.

282. A power secure solar energy system as described in claim 272 or any other claim wherein said plurality of individual solar panel output DC disconnects comprises a plurality of independent individual solar panel output DC disconnects 283. A power secure solar energy system as described in claim 282 or any other claim and further comprising a remote safety output condition reporter element.

284. A power secure solar energy system as described in claim 272 or any other claim wherein said plurality of interchangeable DC photovoltaic safety output condition solar energy sources comprises a plurality of interchangeable DC photovoltaic safety output condition solar energy panels and further comprising a plurality of individually panel dedicated maximum photovoltaic power point converter functionality control circuitries.

285. A power secure solar energy system as described in claim 272 or any other claim and further comprising at least one string of electrical series responsive DC-DC converted solar panel outputs.

286. A power secure solar energy system as described in claim 285 or any other claim wherein said at least one string of electrical series responsive DC-DC converted solar panel outputs comprises a plurality of serially connected photovoltaic DC-DC power converters.

287. A power secure solar energy system as described in claim 286 or any other claim wherein said at least one string of electrical series responsive DC-DC converted solar panel outputs further comprises a plurality of individually panel dedicated maximum photovoltaic power point converter functionality controls.

288. A power secure solar energy system as described in claim 272 or any other claim wherein said photovoltaic safety output condition transition controller comprises a panel independent photovoltaic safety output condition transition controller.

289. A power secure solar energy system as described in claim 272 or any other claim wherein said photovoltaic safety output condition transition controller comprises a photovoltaic converter output condition transition controller.

290. A power secure solar energy system as described in claim 272 or any other claim wherein said photovoltaic safety output condition transition controller comprises a photovoltaic inverter output condition transition controller.

291. A power secure solar energy system as described in claim 275 or any other claim wherein said electrically contrary solar power condition sensor comprises a plurality of individual panel solar power condition sensors.

292. A power secure solar energy system as described in claim 275 or 291 or any other claim wherein said electrically contrary solar power condition sensor comprises a high current solar power condition sensor.

293. A power secure solar energy system as described in claim 275 or 291 or any other claim wherein said electrically contrary solar power condition sensor comprises a high voltage solar power condition sensor.

294. A power secure solar energy system as described in claim 272 or 293 or any other claim wherein said photovoltaic safety output condition transition controller comprises an arc interrupt control.

295. A power secure solar energy system as described in claim 272 or any other claim wherein said photovoltaic safety output condition transition controller comprises a photovoltaic safety output field effect transistor switch controller.

296. A power secure solar energy system as described in claim 295 or any other claim wherein said photovoltaic safety output field effect transistor switch controller comprises an individual panel photovoltaic DC-DC converter field effect transistor switch controller.

297. A power secure solar energy system as described in claim 296 or any other claim wherein said individual panel photovoltaic DC-DC converter field effect transistor switch controller comprises an inoperability photovoltaic DC-DC converter field effect transistor switch controller.

298. A power secure solar energy system comprising:
at least one interchangeable DC photovoltaic safety output condition solar energy sources; and
a photovoltaic safety output condition transition controller to which said DC photovoltaic safety output condition is responsive.

299. A power secure solar energy system as described in claim 298 or any other claim wherein said interchangeable DC photovoltaic safety output condition comprises an interchangeable safety output condition selected from a group consisting of a safety output operable condition and a safety output interrupt condition.

300. A power secure solar energy system as described in claim 299 or any other claim and further comprising a plurality of individual solar panel output DC disconnects.

301. A power secure solar energy system as described in claim 298 or any other claim and further comprising at least one electrically contrary solar power condition sensor within said solar energy system.

302. A power secure solar energy system as described in claim 301 or any other claim wherein said photovoltaic safety output condition transition controller is responsive to said at least one electrically contrary solar power condition sensor.

303. A power secure solar energy system as described in claim 299 or 301 or any other claim and further comprising a remote power functionality change controller to which said photovoltaic safety output condition transition controller is responsive.

304. A power secure solar energy system as described in claim 301, 302, or 303 or any other claim wherein said electrically contrary solar power condition sensor comprises a ground fault solar power condition solar power condition sensor.

305. A power secure solar energy system as described in claim 299, 301, or 303 or any other claim and further comprising a redundant photovoltaic safety output condition transition control.

306. A power secure solar energy system as described in claim 299, 301, 303, or 305 or any other claim wherein said photovoltaic safety output condition transition controller comprises a secure photovoltaic safety output condition transition controller.

307. A power secure solar energy system as described in claim 299 or any other claim and further comprising a plurality of individual solar panel output DC disconnects.

308. A power secure solar energy system as described in claim 298 or any other claim wherein said plurality of individual solar panel output DC disconnects comprises a plurality of independent individual solar panel output DC disconnects 309. A power secure solar energy system as described in claim 308 or any other claim and further comprising a remote safety output condition reporter element.

310. A power secure solar energy system as described in claim 298 or any other claim wherein said plurality of interchangeable DC photovoltaic safety output condition solar energy sources comprises a plurality of interchangeable DC photovoltaic safety output condition solar energy panels and further comprising a plurality of individually panel dedicated maximum photovoltaic power point converter functionality control circuitries.

311. A power secure solar energy system as described in claim 298 or any other claim and further comprising at least one string of electrical series responsive DC-DC converted solar panel outputs.

312. A power secure solar energy system as described in claim 311 or any other claim wherein said at least one string of electrical series responsive DC-DC converted solar panel outputs comprises a plurality of serially connected photovoltaic DC-DC power converters.

313. A power secure solar energy system as described in claim 312 or any other claim wherein said at least one string of electrical series responsive DC-DC converted solar panel outputs further comprises a plurality of individually panel dedicated maximum photovoltaic power point converter functionality controls.

314. A power secure solar energy system as described in claim 298 or any other claim wherein said photovoltaic safety output condition transition controller comprises a panel independent photovoltaic safety output condition transition controller.

315. A power secure solar energy system as described in claim 298 or any other claim wherein said photovoltaic safety output condition transition controller comprises a photovoltaic converter output condition transition controller.

316. A power secure solar energy system as described in claim 298 or any other claim wherein said photovoltaic safety output condition transition controller comprises a photovoltaic inverter output condition transition controller.

317. A power secure solar energy system as described in claim 301 or any other claim wherein said electrically contrary solar power condition sensor comprises a plurality of individual panel solar power condition sensors.

318. A power secure solar energy system as described in claim 301 or 317 or any other claim wherein said electrically contrary solar power condition sensor comprises a high current solar power condition sensor.

319. A power secure solar energy system as described in claim 301 or 317 or any other claim wherein said electrically contrary solar power condition sensor comprises a high voltage solar power condition sensor.

320. A power secure solar energy system as described in claim 298 or 319 or any other claim wherein said photovoltaic safety output condition transition controller comprises an arc interrupt control.

321. A power secure solar energy system as described in claim 298 or any other claim wherein said photovoltaic safety output condition transition controller comprises a photovoltaic safety output field effect transistor switch controller.

322. A power secure solar energy system as described in claim 321 or any other claim wherein said photovoltaic safety output field effect transistor switch controller comprises an individual panel photovoltaic DC-DC converter field effect transistor switch controller.

323. A power secure solar energy system as described in claim 322 or any other claim wherein said individual panel photovoltaic DC-DC converter field effect transistor switch controller comprises an inoperability photovoltaic DC-DC converter field effect transistor switch controller.

324. An alterable power conversion-functionality solar energy system comprising:
at least one solar energy source having a DC photovoltaic output;
a photovoltaic power conversion circuitry responsive to said DC photovoltaic output;
a photovoltaic power functionality change controller to which said photovoltaic power conversion circuitry is responsive; and
a remote power functionality change controller to which said power functionality controller is responsive.

325. An alterable power conversion-functionality solar energy system as described in claim 324 or any other claim wherein said remote power functionality change controller comprises a centralized, remote power functionality change controller.

326. An alterable power conversion-functionality solar energy system as described in claim 325 or any other claim wherein said at least one solar energy source comprises a plurality of solar panels, and wherein said centralized, remote power functionality change controller comprises a centralized, multi-panel remote power functionality change controller.

327. An alterable power conversion-functionality solar energy system as described in claim 326 or any other claim wherein said centralized, multi-panel remote power functionality change controller comprises an administrative panel sea facility control.

328. An alterable power conversion-functionality solar energy system as described in claim 324 or any other claim and further comprising at least one string of electrical series responsive DC-DC converted solar panel outputs.

329. An alterable power conversion-functionality solar energy system as described in claim 328 or any other claim wherein said at least one string of electrical series responsive DC-DC converted solar panel outputs comprises a plurality of serially connected photovoltaic DC-DC power converters.

330. An alterable power conversion-functionality solar energy system as described in claim 329 or any other claim wherein said at least one string of electrical series responsive DC-DC converted solar panel outputs further comprises a plurality of individually panel dedicated maximum photovoltaic power point converter functionality controls.

331. An alterable power conversion-functionality solar energy system as described in claim 324, 328, 329, or 330 or any other claim wherein said photovoltaic power functionality change controller comprises a photovoltaic DC-DC power converter operation controller.

332. An alterable power conversion-functionality solar energy system as described in claim 324 or any other claim wherein said centralized, remote power functionality change controller comprises a programmable power functionality controller.

333. An alterable power conversion-functionality solar energy system as described in claim 332 or any other claim wherein said programmable power functionality controller comprises a external-string reactive power functionality controller.

334. An alterable power conversion-functionality solar energy system as described in claim 332 or any other claim wherein said programmable power functionality controller comprises a panel fault reactive power functionality controller.

335. An alterable power conversion-functionality solar energy system as described in claim 332 or any other claim wherein said programmable power functionality controller input comprises a user programmable power functionality controller.

336. An alterable power conversion-functionality solar energy system as described in claim 332 or any other claim wherein said programmable power functionality controller input comprises a maintenance programmable power functionality controller.

337. An alterable power conversion-functionality solar energy system as described in claim 332 or any other claim wherein said programmable power functionality controller input comprises an electrical code programmable power functionality controller.

338. An alterable power conversion-functionality solar energy system as described in claim 332 or any other claim wherein said programmable power functionality controller input comprises an individual solar panel programmable power functionality controller.

339. An alterable power conversion-functionality solar energy system as described in claim 332 or any other claim wherein said programmable power functionality controller input comprises a solar panel model characteristic power functionality controller.

340. An alterable power conversion-functionality solar energy system as described in claim 324 or 332 or any other claim wherein said photovoltaic power functionality change controller comprises a photovoltaic power functionality change controller selected from a group consisting of:

a solar panel string voltage functionality controller,
a solar panel string current functionality controller,
a solar panel inverter input voltage functionality controller,
a solar panel inverter input current functionality controller,
a solar panel inverter input power functionality controller, and
a solar panel voltage functionality controller.

341. An alterable power conversion-functionality solar energy system as described in claim 324 or 332 or any other claim wherein said photovoltaic power functionality change controller comprises a solar panel power up disconnect control.

342. An alterable power conversion-functionality solar energy system as described in claim 324, 340, or 341 or any other claim wherein said photovoltaic power functionality change controller comprises a photovoltaic DC-DC power converter switch controller.

343. An alterable power conversion-functionality solar energy system as described in claim 342 or any other claim wherein said photovoltaic DC-DC power converter switch controller comprises a photovoltaic DC-DC converter field effect transistor controller.

344. An alterable power conversion-functionality solar energy system as described in claim 343 or any other claim wherein said field effect transistor controller comprises a converter inoperability switch disconnect controller.

345. An alterable power conversion-functionality solar energy system as described in claim 343 or any other claim wherein said field effect transistor controller comprises a field effect transistor timing controller.

346. A method of power conversion-alteration for a solar energy system comprising the steps of:
establishing at least one solar energy source having a DC photovoltaic output;
DC converting said DC photovoltaic output; and
remotely directing a functional change in said step of DC converting said DC photovoltaic output.

347. A method of power conversion-alteration for a solar energy system as described in claim 346 or any other claim wherein said step of remotely directing a functional change in said step of DC converting said DC photovoltaic output comprises the step of centrally directing a functional change in said step of DC converting said DC photovoltaic output.

348. A method of power conversion-alteration for a solar energy system as described in claim 347 or any other claim wherein said step of establishing at least one solar energy source comprises the step of establishing a plurality of solar panels and wherein said step of centrally directing a functional change in said step of DC converting said DC photovoltaic output comprises the step of directing a multi-panel functional change in individually panel DC converting.

349. A method of power conversion-alteration for a solar energy system as described in claim 348 or any other claim wherein said step of directing a multi-panel functional change in individually panel DC converting comprises the step of remotely directing a multi-panel functional change from an administrative panel sea facility control.

350. A method of power conversion-alteration for a solar energy system as described in claim 346 or any other claim and further comprising the step of utilizing an electrical series responsive plurality of solar panels to generate electrical power.

351. A method of power conversion-alteration for a solar energy system as described in claim 350 or any other claim wherein said step of utilizing an electrical series responsive plurality of solar panels to generate electrical power comprises the step of utilizing a plurality of serially connected photovoltaic DC-DC power converters to generate electrical power.

352. A method of power conversion-alteration for a solar energy system as described in claim 351 or any other claim and further comprising the step of individually generating power at a panel dedicated maximum photovoltaic power point.

353. A method of power conversion-alteration for a solar energy system as described in claim 346, 350, 351, 352 or any other claim wherein said step of remotely directing a functional change in said step of DC converting said DC photovoltaic output comprises the step of remotely controlling a photovoltaic DC-DC power converter operation.

354. A method of power conversion-alteration for a solar energy system as described in claim 346 or any other claim wherein said step of remotely controlling a photovoltaic DC-DC power converter operation comprises the step of programmably controlling electrical operation of a photovoltaic DC-DC power converter.

355. A method of power conversion-alteration for a solar energy system as described in claim 354 or any other claim wherein said step of programmably controlling electrical operation of a photovoltaic DC-DC power converter comprises the step of reacting to an external-string reactive power condition.

356. A method of power conversion-alteration for a solar energy system as described in claim 354 or any other claim wherein said step of programmably controlling electrical operation of a photovoltaic DC-DC power converter comprises the step of reacting to a solar panel ground fault condition.

357. A method of power conversion-alteration for a solar energy system as described in claim 354 or any other claim wherein said step of programmably controlling electrical operation of a photovoltaic DC-DC power converter comprises the step of providing a user programmable power functionality controller.

358. A method of power conversion-alteration for a solar energy system as described in claim 354 or any other claim wherein said step of programmably controlling electrical operation of a photovoltaic DC-DC power converter comprises the step of providing a maintenance programmable power functionality controller.

359. A method of power conversion-alteration for a solar energy system as described in claim 354 or any other claim wherein said step of programmably controlling electrical operation of a photovoltaic DC-DC power converter comprises the step of providing an electrical code programmable power functionality controller.

360. A method of power conversion-alteration for a solar energy system as described in claim 354 or any other claim wherein said step of programmably controlling electrical operation of a photovoltaic DC-DC power converter comprises the step of providing an individual solar panel programmable power functionality controller.

361. A method of power conversion-alteration for a solar energy system as described in claim 354 or any other claim wherein said step of programmably controlling electrical operation of a photovoltaic DC-DC power converter comprises the step of providing a solar panel model programmable power functionality controller.

362. A method of power conversion-alteration for a solar energy system as described in claim 346 or 354 or any other claim wherein said step of remotely controlling a photovoltaic DC-DC power converter operation comprises a step selected from a group consisting of:
- remotely controlling a solar panel string voltage functionality,
- remotely controlling a solar panel string current functionality,
- remotely controlling a solar panel inverter input voltage functionality,
- remotely controlling a solar panel inverter input current functionality,
- remotely controlling a solar panel inverter input power functionality, and
- remotely controlling a solar panel voltage functionality.

363. A method of power conversion-alteration for a solar energy system as described in claim 346 or 354 or any other claim wherein said step of remotely controlling a photovoltaic DC-DC power converter operation comprises the step of remotely disconnecting a DC output of at least one solar panel.

364. A method of power conversion-alteration for a solar energy system as described in claim 346, 362, or 363 or any other claim wherein said step of remotely controlling a photovoltaic DC-DC power converter operation comprises the step of remotely controlling switching of at least one DC-DC power converter.

365. A method of power conversion-alteration for a solar energy system as described in claim 364 or any other claim wherein said step of remotely controlling switching of at least one DC-DC power converter comprises the step of remotely controlling switching of at least one field effect transistor for said at least one DC-DC power converter.

366. A method of power conversion-alteration for a solar energy system as described in claim 365 or any other claim wherein said step of remotely controlling switching of at least one field effect transistor for said at least one DC-DC power converter comprises the step of remotely effecting converter switch inoperability for said at least one DC-DC power converter.

367. A method of power conversion-alteration for a solar energy system as described in claim 365 or any other claim wherein said step of remotely controlling switching of at least one field effect transistor for said at least one DC-DC power converter comprises the step of remotely controlling switching timing for at least one field effect transistor for said at least one DC-DC power converter.

368. A controlled output solar energy system comprising:
- at least one solar energy source having a DC photovoltaic output;
- a photovoltaic power conversion circuitry responsive to said DC photovoltaic output; and
- an output limit control to which said photovoltaic power conversion circuitry is responsive.

369. A controlled output solar energy system as described in claim 368 or any other claim and further comprising at least one string of electrical series responsive DC-DC converted solar panel outputs.

370. A controlled output solar energy system as described in claim 369 or any other claim wherein said at least one string of electrical series responsive DC-DC converted solar panel outputs comprises a plurality of serially connected photovoltaic DC-DC power converters.

371. A controlled output solar energy system as described in claim 370 or any other claim wherein said at least one string of electrical series responsive DC-DC converted solar panel outputs further comprises a plurality of individually panel dedicated maximum photovoltaic power point converter functionality controls.

372. A controlled output solar energy system as described in claim 368 or any other claim wherein said output limit control comprises a code compliance output controller.

373. A controlled output solar energy system as described in claim 372 or any other claim wherein said code compliance output controller comprises an individual solar panel code compliance output controller.

374. A controlled output solar energy system as described in claim 368, 372, or 373 or any other claim wherein said output limit control comprises a photovoltaic DC-DC power converter output controller.

375. A controlled output solar energy system as described in claim 368, 372, or 373 or any other claim and further comprising a programmable power functionality controller.

376. A controlled output solar energy system as described in claim 375 or any other claim wherein said programmable power functionality controller comprises a remote power functionality change controller.

377. A controlled output solar energy system as described in claim 368, 373, 374, or 376 or any other claim and further comprising an output limit control selected from a group consisting of:
- a code compliant voltage limit output control,
- a code compliant current limit output control,
- a code compliant power limit output control,
- a voltage limit output control,
- a current limit output control,
- a power limit output control,
- a code compliant timed electrical parameter limit output control, and
- a code compliant electrical parameter rate of change limit output control.

378. A controlled output solar energy system as described in claim 368, 373, or 377 or any other claim wherein said output limit control comprises a photovoltaic DC-DC power converter switch controller.

379. A controlled output solar energy system as described in claim 378 or any other claim wherein said photovoltaic DC-DC power converter switch controller comprises a photovoltaic DC-DC converter field effect transistor controller.

380. A method of controlling an output for a solar energy system comprising the steps of:
- establishing at least one solar energy source having a DC photovoltaic output;
- DC converting said DC photovoltaic output; and
- output limiting a converted DC output from said step of DC converting said DC photovoltaic output.

381. A method of controlling an output for a solar energy system as described in claim 380 or any other claim and further comprising the step of utilizing an electrical series responsive plurality of solar panels to generate electrical power.

382. A method of controlling an output for a solar energy system as described in claim 381 or any other claim wherein said step of utilizing an electrical series responsive plurality of solar panels to generate electrical power comprises the step of utilizing a plurality of serially connected photovoltaic DC-DC power converters to generate electrical power.

383. A method of controlling an output for a solar energy system as described in claim 382 or any other claim and further comprising the step of individually generating power at a panel dedicated maximum photovoltaic power point.

384. A method of controlling an output for a solar energy system as described in claim 380 or any other claim wherein said step of output limiting a converted DC output from said step of DC converting said DC photovoltaic output comprises the step of code compliantly limiting a converted DC output from said step of DC converting said DC photovoltaic output.

385 A method of controlling an output for a solar energy system as described in claim 384 or any other claim wherein said step of code compliantly limiting a converted DC output from said step of DC converting said DC photovoltaic output comprises the step of individual solar panel code compliantly limiting a converted DC output from said step of DC converting said DC photovoltaic output.

386. A method of controlling an output for a solar energy system as described in claim 380, 384, or 385 or any other claim wherein said step of output limiting a converted DC output from said step of DC converting said DC photovoltaic output comprises the step of limit controlling said step of DC converting said DC photovoltaic output.

387. A method of controlling an output for a solar energy system as described in claim 380, 384, or 385 or any other claim and further comprising the step of providing a programmable power functionality controller.

388. A method of controlling an output for a solar energy system as described in claim 387 or any other claim and further comprising the step of remotely directing a functional change in said step of DC converting said DC photovoltaic output.

389. A method of controlling an output for a solar energy system as described in claim 380, 385, 386, or 388 or any other claim and further comprising an output limit control selected from a group consisting of:
a code compliant voltage limit output control,
a code compliant current limit output control,
a code compliant power limit output control,
a voltage limit output control,
a current limit output control,
a power limit output control,
a code compliant timed electrical parameter limit output control, and
a code compliant electrical parameter rate of change limit output control.

390. A method of controlling an output for a solar energy system as described in claim 380, 385, or 389 or any other claim wherein said step of output limiting a converted DC output from said step of DC converting said DC photovoltaic output comprises the step of controlling switching as part of said step of DC converting said DC photovoltaic output.

391. A method of controlling an output for a solar energy system as described in claim 390 or any other claim wherein said step of controlling switching as part of said step of DC converting said DC photovoltaic output comprises the step of controlling field effect transistor switching as part of said step of DC converting said DC photovoltaic output.

392. A method of assessing performance of a solar energy system comprising the steps of:
establishing at least one plurality of solar energy sources, each of said plurality of solar energy sources having a DC photovoltaic output;
electrically combining said plurality of DC photovoltaic outputs from said plurality of solar energy sources in a photovoltaic power combination circuit;
subjecting said plurality of solar energy sources to solar insolation;
generating solar energy electrical power from said plurality of DC photovoltaic outputs in response to said solar insolation;
capturing at least one electrical parameter for each of said plurality of solar energy sources;
conducting pattern recognition analysis of data resulting from said step of capturing at least one electrical parameter for each of said plurality of solar energy sources;
determining at least one operational indication as a result of said step of conducting pattern recognition analysis of data resulting from said step of capturing at least one electrical parameter for each of said plurality of solar energy sources; and
reporting said at least one operational indication.

393. A method of assessing performance of a solar energy system as described in claim 392 or any other claim wherein said step of conducting pattern recognition analysis comprises the step of comparing performance values from a plurality of solar panels.

394. A method of assessing performance of a solar energy system as described in claim 393 or any other claim wherein said step of comparing performance values from a plurality of solar panels comprises the step of comparing inter-string performance values from a plurality of solar panels.

395. A method of assessing performance of a solar energy system as described in claim 393 or any other claim wherein said step of comparing performance values from a plurality of solar panels comprises the step of comparing intra-string performance values.

396. A method of assessing performance of a solar energy system as described in claim 393 or any other claim and further comprising the step of remotely comparing performance values from a plurality of solar panels.

397. A method of assessing performance of a solar energy system as described in claim 392, 393, or 396 or any other claim wherein said step of determining at least one operational indication as a result of said step of conducting pattern recognition analysis comprises the step of determining an insolation condition for a plurality of solar panels.

398. A method of assessing performance of a solar energy system as described in claim 397 or any other claim wherein said step of determining an insolation condition for a plurality of solar panels comprises the step of determining a shade condition for at least one solar panel.

399. A method of assessing performance of a solar energy system as described in claim 392, 393, or 396 or any other claim wherein said step of determining at least one operational indication as a result of said step of conducting pattern recognition analysis comprises the step of determining a temporal condition for at least one solar panel.

400. A method of assessing performance of a solar energy system as described in claim 399 or any other claim wherein said step of determining a temporal condition for a plurality of solar panels comprises the step of determining a temporal shade condition for at least one solar panel.

401. A method of assessing performance of a solar energy system as described in claim 399 or any other claim wherein said step of determining a temporal condition for a plurality of solar panels comprises the step of determining a daily condition for at least one solar panel.

402. A method of assessing performance of a solar energy system as described in claim 399 or any other claim wherein said step of determining a temporal condition for a plurality of solar panels comprises the step of determining a seasonal condition for at least one solar panel.

403. A method of assessing performance of a solar energy system as described in claim 399 or any other claim wherein said step of determining a temporal condition for a plurality of solar panels comprises the step of determining an annual condition for at least one solar panel.

404. A method of assessing performance of a solar energy system as described in claim 392, 393, or 396 or any other claim wherein said step of determining at least one operational indication as a result of said step of conducting pattern recognition analysis comprises the step of determining at least one locational indication for at least one solar panel.

405. A method of assessing performance of a solar energy system as described in claim 404 or any other claim wherein said step of determining at least one locational indication for at least one solar panel comprises the step of determining an average deviation for at least one solar panel.

406. A method of assessing performance of a solar energy system as described in claim 392, 393, or 396 or any other claim wherein said step of determining at least one operational indication as a result of said step of conducting pattern recognition analysis comprises the step of determining an insolation utilization indication for at least one solar panel.

407. A method of assessing performance of a solar energy system as described in claim 406 or any other claim wherein said step of determining an insolation utilization indication for at least one solar panel comprises the step of determining an efficiency indication for at least one solar panel.

408. A method of assessing performance of a solar energy system as described in claim 406 or any other claim wherein said step of determining an insolation utilization indication for at least one solar panel comprises the step of determining an orientation indication for at least one solar panel.

409. A method of assessing performance of a solar energy system as described in claim 392, 393, or 396 or any other claim wherein said step of determining at least one operational indication as a result of said step of conducting pattern recognition analysis comprises the step of determining an optimal producer among a plurality of solar panels.

410. A method of assessing performance of a solar energy system as described in claim 409 or any other claim wherein said step of determining an optimal producer among a plurality of solar panels comprises the step of conducting a multi-panel comparison among a plurality of solar panels.

411. A method of assessing performance of a solar energy system as described in claim 392, 393, or 396 or any other claim wherein said step of determining at least one operational indication as a result of said step of conducting pattern recognition analysis comprises the step of conducting a maintenance assessment for a plurality of solar panels.

412. A method of assessing performance of a solar energy system as described in claim 411 or any other claim wherein said step of conducting a maintenance assessment for a plurality of solar panels comprises the step of conducting a suboptimal assessment for at least one solar panel.

413 A method of assessing performance of a solar energy system as described in claim 411 or any other claim wherein said step of conducting a maintenance assessment for a plurality of solar panels comprises the step of conducting a historical variation assessment for at least one solar panel.

414 A method of assessing performance of a solar energy system as described in claim 411 or any other claim wherein said step of conducting a maintenance assessment for a plurality of solar panels comprises the step of conducting an installation assessment for at least one solar panel.

415. A method of assessing performance of a solar energy system comprising the steps of:
generating solar energy electrical power from a plurality of DC photovoltaic outputs in response to solar insolation;
capturing at least one electrical parameter for each of said plurality of solar energy sources; and
determining at least one operational indication as a result of said step of capturing at least one electrical parameter for each of said plurality of solar energy sources.

416. A method of assessing performance of a solar energy system as described in claim 415 or any other claim wherein said step of determining at least one operational indication as a result of said step of capturing at least one electrical parameter for each of said plurality of solar energy sources comprises the step of comparing performance values from a plurality of solar panels.

417. A method of assessing performance of a solar energy system as described in claim 416 or any other claim wherein said step of comparing performance values from a plurality of solar panels comprises the step of comparing inter-string performance values from a plurality of solar panels.

418. A method of assessing performance of a solar energy system as described in claim 416 or any other claim wherein said step of comparing performance values from a plurality of solar panels comprises the step of comparing intra-string performance values.

419. A method of assessing performance of a solar energy system as described in claim 416 or any other claim and further comprising the step of remotely comparing performance values from a plurality of solar panels.

420. A method of assessing performance of a solar energy system as described in claim 415, 416, or 419 or any other claim wherein said step of determining at least one operational indication as a result of said step of capturing at least one electrical parameter for each of said plurality of solar energy sources comprises the step of determining an insolation condition for a plurality of solar panels.

421. A method of assessing performance of a solar energy system as described in claim 415, 416, or 419 or any other claim wherein said step of determining at least one operational indication as a result of said step of capturing at least one electrical parameter for each of said plurality of solar energy sources comprises the step of determining an insolation utilization indication for at least one solar panel.

422. A method of assessing performance of a solar energy system as described in claim 421 or any other claim wherein said step of determining an insolation utilization indication for at least one solar panel comprises the step of determining an efficiency indication for at least one solar panel.

423. A method of assessing performance of a solar energy system as described in claim 415 or any other claim wherein said step of determining at least one operational indication as a result of said step of capturing at least one electrical parameter for each of said plurality of solar energy sources comprises the step of conducting a multi-panel comparison among a plurality of solar panels.

424. A method of assessing performance of a solar energy system as described in claim 415, 416, or 419 or any other claim wherein said step of determining at least one operational indication as a result of said step of capturing at least one electrical parameter for each of said plurality of solar energy sources comprises the step of conducting a maintenance assessment for a plurality of solar panels.

425. A method of assessing performance of a solar energy system as described in claim 424 or any other claim wherein said step of conducting a maintenance assessment for a plurality of solar panels comprises the step of conducting a historical variation assessment for at least one solar panel.

426. A disparate component integratable solar energy system comprising:
   at least one plurality of solar energy sources, each having a DC photovoltaic output;
   a plurality of individually panel dedicated photovoltaic DC-DC power converters, at least some of which are responsive to at least one of said solar energy sources;
   maximum photovoltaic power point control circuitry to which at least one of said individually panel dedicated photovoltaic DC-DC power converters is responsive;
   a photovoltaic power combination circuit responsive to at least some of said plurality of DC photovoltaic outputs; and
   at least one photovoltaic power simulator.

427. A disparate component integratable solar energy system as described in claim 426 or any other claim and further comprising at least one string of electrical series responsive DC-DC converted solar panel outputs.

428. A disparate component integratable solar energy system as described in claim 427 or any other claim wherein said at least one string of electrical series responsive DC-DC converted solar panel outputs comprises a plurality of serially connected photovoltaic DC-DC power converters.

429. A disparate component integratable solar energy system as described in claim 428 or any other claim wherein said at least one string of electrical series responsive DC-DC converted solar panel outputs further comprises a plurality of individually panel dedicated maximum photovoltaic power point converter functionality controls.

430. A disparate component integratable solar energy system as described in claim 429 or any other claim wherein said at least one photovoltaic power simulator comprises at least one photovoltaic power string output simulator.

431. A disparate component integratable solar energy system as described in claim 426 or any other claim wherein said at least one photovoltaic power simulator comprises a maximum photovoltaic power point simulator.

432. A disparate component integratable solar energy system as described in claim 426 or any other claim wherein said plurality of individually panel dedicated photovoltaic DC-DC power converters are responsive to a plurality of individually panel dedicated photovoltaic power simulators.

433. A disparate component integratable solar energy system as described in claim 426 or any other claim and further comprising at least one photovoltaic DC-AC inverter responsive to said at least one photovoltaic power simulator.

434. A disparate component integratable solar energy system as described in claim 426 or 429 or any other claim wherein said at least one photovoltaic power simulator comprises at least one synthetic power condition simulator comprising a synthetic power condition simulator selected from a group consisting of:
   a synthetic maximum current condition simulator;
   a synthetic maximum voltage condition simulator; and
   a synthetic maximum power condition simulator.

435. A disparate component integratable solar energy system as described in claim 429 or 434 or any other claim and further comprising a plurality of individually panel dedicated converter functionality control circuitries.

436. A disparate component integratable solar energy system as described in claim 426, 429, or 434 or any other claim and further comprising a programmable power functionality controller.

437. A disparate component integratable solar energy system as described in claim 436 or any other claim wherein said programmable power functionality controller comprises a remote power functionality change controller.

438. A disparate component integratable solar energy system as described in claim 436 or any other claim wherein said programmable power functionality controller comprises a solar panel model input.

439. A disparate component integratable solar energy system as described in claim 426 or 435 or any other claim wherein said maximum photovoltaic power point control circuitry comprises a photovoltaic DC-DC power converter switch controller.

440. A disparate component integratable solar energy system as described in claim 439 or any other claim wherein said photovoltaic DC-DC power converter switch controller comprises a photovoltaic DC-DC converter field effect transistor controller.

441. A disparate component integratable solar energy system as described in claim 426, 429, or 434 or any other claim wherein said at least one photovoltaic power simulator comprises a photovoltaic inverter power simulator.

442. A disparate component integratable solar energy system as described in claim 426, 429, or 440 or any other claim wherein said at least one photovoltaic power simulator comprises a photovoltaic DC-DC power converter by-pass controller.

443. A disparate component integratable solar energy system as described in claim 426, 429, 440, or 442 or any other claim wherein said at least one photovoltaic power simulator comprises a partial string photovoltaic power simulator.

444. A disparate component integratable solar energy system as described in claim 426, 429, 440, or 442 or any other claim and further comprising at least one photovoltaic power simulation condition sensor.

445. A disparate component integratable solar energy system as described in claim 444 or any other claim wherein said at least one photovoltaic power simulation condition sensor comprises at least one photovoltaic power simulation condition sensor selected from a group consisting of:
   a photovoltaic DC-DC power converter voltage input sensor;
   a photovoltaic DC-DC power converter voltage output sensor; and
   a photovoltaic DC-DC power converter voltage input and photovoltaic DC-DC power converter voltage output comparator.

446. A disparate component integratable solar energy system as described in claim 444 or any other claim wherein said at least one photovoltaic power simulation condition sensor comprises at least one transient photovoltaic power simulation condition sensor.

447. A disparate component integratable solar energy system as described in claim 446 or any other claim wherein said at least one transient photovoltaic power simulation condition sensor comprises a transient photovoltaic power simulation condition sensor selected from a group consisting of:
- a periodic photovoltaic DC-DC power converter voltage input sensor;
- a periodic photovoltaic DC-DC power converter voltage output sensor; and
- a periodic photovoltaic DC-DC power converter voltage input and photovoltaic DC-DC power converter voltage output comparator.

448. A disparate component integratable solar energy system as described in claim 426, 429, or 440 or any other claim wherein said at least one photovoltaic power simulator comprises an automatic photovoltaic DC-DC power converter by-pass controller.

449. A disparate component integratable solar energy system as described in claim 448 or any other claim wherein said automatic photovoltaic DC-DC power converter by-pass controller comprises an automatic photovoltaic DC-DC power converter voltage input and photovoltaic DC-DC power converter voltage output comparator.

450. A disparate component integratable solar energy system as described in claim 426, 429, or 440 or any other claim wherein said at least one photovoltaic power simulator comprises a remote photovoltaic DC-DC power converter by-pass control.

451. A disparate component integratable solar energy system as described in claim 426, 429, 440, or 449 or any other claim wherein said at least one photovoltaic power simulator comprises a programmable photovoltaic DC-DC power converter by-pass control.

452. A disparate component integratable solar energy system as described in claim 426, 429, 440, or 449 or any other claim wherein said at least one photovoltaic power simulator comprises a photovoltaic power simulator selected from a group consisting of:
- at least one individual solar panel photovoltaic power simulator, or
- at least one individual solar panel string photovoltaic power simulator.

453. A disparate component integratable solar energy system as described in claim 426, 429, 440, or 449 or any other claim wherein said at least one photovoltaic power simulator comprises at least one individual solar panel DC-DC power converter by-pass control.

454. A disparate component integratable solar energy system comprising:
- at least one plurality of solar energy sources, each having a DC photovoltaic output;
- a photovoltaic power combination circuit responsive to at least some of said plurality of DC photovoltaic outputs; and
- at least one photovoltaic power simulator.

455. A disparate component integratable solar energy system as described in claim 454 or any other claim and further comprising at least one string of electrical series responsive DC-DC converted solar panel outputs.

456. A disparate component integratable solar energy system as described in claim 455 or any other claim wherein said at least one string of electrical series responsive DC-DC converted solar panel outputs comprises a plurality of serially connected photovoltaic DC-DC power converters.

457. A disparate component integratable solar energy system as described in claim 456 or any other claim wherein said at least one string of electrical series responsive DC-DC converted solar panel outputs further comprises a plurality of individually panel dedicated maximum photovoltaic power point converter functionality controls.

458. A disparate component integratable solar energy system as described in claim 457 or any other claim wherein said at least one photovoltaic power simulator comprises at least one photovoltaic power string output simulator.

459. A disparate component integratable solar energy system as described in claim 454 or any other claim wherein said at least one photovoltaic power simulator comprises a maximum photovoltaic power point simulator.

460. A disparate component integratable solar energy system as described in claim 454 or 457 or any other claim wherein said at least one photovoltaic power simulator comprises at least one synthetic power condition simulator comprising a synthetic power condition simulator selected from a group consisting of:
- a synthetic maximum current condition simulator;
- a synthetic maximum voltage condition simulator; and
- a synthetic maximum power condition simulator.

461. A disparate component integratable solar energy system as described in claim 457 or 460 or any other claim and further comprising a plurality of individually panel dedicated converter functionality control circuitries.

462. A disparate component integratable solar energy system as described in claim 454, 457, or 460 or any other claim and further comprising a programmable power functionality controller.

463. A disparate component integratable solar energy system as described in claim 462 or any other claim wherein said programmable power functionality controller comprises a remote power functionality change controller.

464. A disparate component integratable solar energy system as described in claim 462 or any other claim wherein said programmable power functionality controller comprises a solar panel model input.

465. A disparate component integratable solar energy system as described in claim 454 or 461 or any other claim wherein said maximum photovoltaic power point control circuitry comprises a photovoltaic DC-DC power converter switch controller.

466. A disparate component integratable solar energy system as described in claim 465 or any other claim wherein said photovoltaic DC-DC power converter switch controller comprises a photovoltaic DC-DC converter field effect transistor controller.

467. A disparate component integratable solar energy system as described in claim 454, 457, or 466 or any other claim wherein said at least one photovoltaic power simulator comprises a photovoltaic DC-DC power converter by-pass controller.

468. A disparate component integratable solar energy system as described in claim 454, 457, 466, or 467 or any other claim wherein said at least one photovoltaic power simulator comprises a partial string photovoltaic power simulator.

469. A disparate component integratable solar energy system as described in claim 454, 457, 467, or 468 or any other claim and further comprising at least one photovoltaic power simulation condition sensor.

470. A disparate component integratable solar energy system as described in claim 469 or any other claim wherein said at least one photovoltaic power simulation condition sensor comprises at least one photovoltaic power simulation condition sensor selected from a group consisting of:

a photovoltaic DC-DC power converter voltage input sensor;

a photovoltaic DC-DC power converter voltage output sensor; and a photovoltaic DC-DC power converter voltage input and photovoltaic DC-DC power converter voltage output comparator.

471. A disparate component integratable solar energy system as described in claim 469 or any other claim wherein said at least one photovoltaic power simulation condition sensor comprises at least one transient photovoltaic power simulation condition sensor.

472. A disparate component integratable solar energy system as described in claim 471 or any other claim wherein said at least one transient photovoltaic power simulation condition sensor comprises a transient photovoltaic power simulation condition sensor selected from a group consisting of:

a periodic photovoltaic DC-DC power converter voltage input sensor;

a periodic photovoltaic DC-DC power converter voltage output sensor; and a periodic photovoltaic DC-DC power converter voltage input and photovoltaic DC-DC power converter voltage output comparator.

473. A disparate component integratable solar energy system as described in claim 454, 457, or 466 or any other claim wherein said at least one photovoltaic power simulator comprises an automatic photovoltaic DC-DC power converter by-pass controller.

474. A disparate component integratable solar energy system as described in claim 473 or any other claim wherein said automatic photovoltaic DC-DC power converter by-pass controller comprises an automatic photovoltaic DC-DC power converter voltage input and photovoltaic DC-DC power converter voltage output comparator.

475. A disparate component integratable solar energy system as described in claim 454, 457, 466, or 475 or any other claim wherein said at least one photovoltaic power simulator comprises a remote photovoltaic DC-DC power converter by-pass control.

476. A disparate component integratable solar energy system as described in claim 454, 457, 466, or 475 or any other claim wherein said at least one photovoltaic power simulator comprises a programmable photovoltaic DC-DC power converter by-pass control.

477. A disparate component integratable solar energy system as described in claim 454, 457, 466, or 474 or any other claim wherein said at least one photovoltaic power simulator comprises a photovoltaic power simulator selected from a group consisting of:

at least one individual solar panel photovoltaic power simulator, or at least one individual solar panel string photovoltaic power simulator.

478. A disparate component integratable solar energy system as described in claim 454, 457, 466, or 474 or any other claim wherein said at least one photovoltaic power simulator comprises at least one individual solar panel DC-DC power converter by-pass control.

479. A method of generating disparate component integratable solar energy comprising the steps of:

establishing at least one plurality of solar energy sources, each having a DC photovoltaic output;

individual panel DC converting said DC photovoltaic output to a converted DC output;

individually generating power at a panel dedicated maximum photovoltaic power point for said at least one of said plurality of solar energy sources;

electrically combining a plurality of converted DC outputs resulting from said individual step of individual panel DC converting said DC photovoltaic output to a converted DC output; and simulating a power output for at least one of said plurality of converted DC outputs.

480. A method of generating disparate component integratable solar energy as described in claim 479 or any other claim and further comprising the step of utilizing an electrical series responsive plurality of solar panels to generate electrical power.

481. A method of generating disparate component integratable solar energy as described in claim 480 or any other claim wherein said step of wherein said step of utilizing an electrical series responsive plurality of solar panels to generate electrical power comprises the step of utilizing a plurality of serially connected photovoltaic DC-DC power converters to generate electrical power.

482. A method of generating disparate component integratable solar energy as described in claim 481 or any other claim and further comprising the step of individually generating power at a panel dedicated maximum photovoltaic power point.

483. A method of generating disparate component integratable solar energy as described in claim 482 or any other claim wherein said step of simulating a power output for at least one of said plurality of converted DC outputs comprises the step of simulating at least one photovoltaic power string power output.

484. A method of generating disparate component integratable solar energy as described in claim 479 or any other claim wherein said step of simulating a power output for at least one of said plurality of converted DC outputs comprises the step of simulating a maximum power point for at least one of said plurality of converted DC outputs.

485. A method of generating disparate component integratable solar energy as described in claim 479 or any other claim wherein said step of individual panel DC converting said DC photovoltaic output to a converted DC output comprises the step of responding to a plurality of individually panel dedicated photovoltaic power simulators.

486. A method of generating disparate component integratable solar energy as described in claim 479 or any other claim and further comprising the step of photovoltaic DC-AC inverting a converted DC output responsive to said step of individual panel DC converting said DC photovoltaic output to a converted DC output.

487. A method of generating disparate component integratable solar energy as described in claim 479 or 482 or any other claim wherein said step of simulating a power output for at least one of said plurality of converted DC outputs comprises the step of simulating a power output for at least one of said plurality of converted DC outputs selected from a group consisting of:

simulating a synthetic maximum current condition;
simulating a synthetic maximum voltage condition; and
simulating a synthetic maximum power condition.

488. A method of generating disparate component integratable solar energy as described in claim 482 or 487 or any other claim and further comprising the step of individually controlling a plurality of individual panel dedicated converter functionality control circuitries.

489. A method of generating disparate component integratable solar energy as described in claim 479, 482, or 487 or any other claim and further comprising the step of programmably controlling electrical operation of a photovoltaic DC-DC power converter.

490. A method of generating disparate component integratable solar energy as described in claim 489 or any other claim wherein said step of programmably controlling electrical operation of a photovoltaic DC-DC power converter comprises the step of remotely controlling a photovoltaic DC-DC power converter operation.

491. A method of generating disparate component integratable solar energy as described in claim 489 or any other claim wherein said step of programmably controlling electrical operation of a photovoltaic DC-DC power converter comprises the step of providing a solar panel model programmable power functionality controller.

492. A method of generating disparate component integratable solar energy as described in claim 479 or 488 or any other claim and further comprising the step of controlling switching of at least one DC-DC power converter.

493. A method of generating disparate component integratable solar energy as described in claim 492 or any other claim wherein said step of controlling switching of at least one DC-DC power converter comprises the step of controlling field effect transistor switching of at least one DC-DC power converter.

494. A method of generating disparate component integratable solar energy as described in claim 479, 482, or 487 or any other claim wherein said step of simulating a power output for at least one of said plurality of converted DC outputs comprises the step of simulating a DC-AC photovoltaic inverter parameter for at least one of said plurality of converted DC outputs.

495. A method of generating disparate component integratable solar energy as described in claim 479, 482, or 493 or any other claim wherein said step of simulating a power output for at least one of said plurality of converted DC outputs comprises the step of by-passing the normal operation of a photovoltaic DC-DC power converter.

496. A method of generating disparate component integratable solar energy as described in claim 479, 482, 493, or 495 or any other claim wherein said step of simulating a power output for at least one of said plurality of converted DC outputs comprises the step of a partial string simulating a plurality of converted DC outputs.

497. A method of generating disparate component integratable solar energy as described in claim 479, 482, 495, or 496 or any other claim and further comprising the step of sensing at least one photovoltaic power condition to control said step of simulating a power output for at least one of said plurality of converted DC outputs.

498. A method of generating disparate component integratable solar energy as described in claim 497 or any other claim wherein said step of sensing at least one photovoltaic power condition comprises the step of sensing at least one photovoltaic power condition selected from a group consisting of:
sensing a photovoltaic DC-DC power converter voltage input;
sensing a photovoltaic DC-DC power converter voltage output; and
comparing a photovoltaic DC-DC power converter voltage input and photovoltaic DC-DC power converter voltage output.

499. A method of generating disparate component integratable solar energy as described in claim 497 or any other claim wherein said step of sensing at least one photovoltaic power condition comprises the step of transiently sensing at least one photovoltaic power condition.

500. A method of generating disparate component integratable solar energy as described in claim 499 or any other claim wherein said step of transiently sensing at least one photovoltaic power condition comprises the step of transiently sensing at least one photovoltaic power condition selected from a group consisting of:
periodically sensing a photovoltaic DC-DC power converter voltage input;
periodically sensing a photovoltaic DC-DC power converter voltage output; and
periodically comprising a photovoltaic DC-DC power converter voltage input and a photovoltaic DC-DC power converter voltage output.

501. A method of generating disparate component integratable solar energy as described in claim 479, 482, or 493 or any other claim wherein said step of simulating a power output for at least one of said plurality of converted DC outputs comprises the step of automatically by-passing normal operation of a photovoltaic DC-DC power converter.

502. A method of generating disparate component integratable solar energy as described in claim 501 or any other claim wherein said step of automatically by-passing normal operation of a photovoltaic DC-DC power converter is in response to a step of comparing a photovoltaic DC-DC power converter voltage input and a photovoltaic DC-DC power converter voltage output.

503. A method of generating disparate component integratable solar energy as described in claim 479, 482, or 493.7 or any other claim wherein said step of simulating a power output for at least one of said plurality of converted DC outputs comprises the step of remotely controlling a by-pass of a normal operation of a photovoltaic DC-DC power converter.

504. A method of generating disparate component integratable solar energy as described in claim 479, 482, 493, or 503 or any other claim wherein said step of simulating a power output for at least one of said plurality of converted DC outputs comprises the step of programmably controlling a by-pass of a normal operation of a photovoltaic DC-DC power converter.

505. A method of generating disparate component integratable solar energy as described in claim 479, 482, 493, or 502 or any other claim wherein said step of simulating a power output for at least one of said plurality of converted DC outputs comprises the step of a photovoltaic power simulator selected from a group consisting of:
simulating at least one individual solar panel power output, and
simulating at least one individual solar panel string power output.

506. A method of generating disparate component integratable solar energy as described in claim 479, 482, 493, or 502 or any other claim wherein said step of simulating a power output for at least one of said plurality of converted DC outputs comprises the step of by-passing normal operation of at least one individual solar panel DC-DC power converter.

507. A method of generating disparate component integratable solar energy comprising the steps of:
establishing at least one plurality of solar energy sources, each having a DC photovoltaic output;
electrically combining a plurality of DC photovoltaic outputs; and simulating a power output from said step of electrically combining a plurality of DC photovoltaic outputs.

508. A method of generating disparate component integratable solar energy as described in claim 507 or any other claim and further comprising the step of utilizing an electrical series responsive plurality of solar panels to generate electrical power.

509. A method of generating disparate component integratable solar energy as described in claim 508 or any other claim wherein said step of wherein said step of utilizing an electrical series responsive plurality of solar panels to generate electrical power comprises the step of utilizing a plurality of serially connected photovoltaic DC-DC power converters to generate electrical power.

510. A method of generating disparate component integratable solar energy as described in claim 509 or any other claim and further comprising the step of individually generating power at a panel dedicated maximum photovoltaic power point.

511. A method of generating disparate component integratable solar energy as described in claim 510 or any other claim wherein said step of simulating a power output comprises the step of simulating at least one photovoltaic power string power output.

512. A method of generating disparate component integratable solar energy as described in claim 511 or any other claim wherein said step of simulating a power output comprises the step of simulating a maximum power point for at least one of a plurality of converted DC outputs.

513. A method of generating disparate component integratable solar energy as described in claim 507 or 510 or any other claim wherein said step of simulating a power output comprises the step of simulating a power output for at least one of a plurality of converted DC outputs selected from a group consisting of:
simulating a synthetic maximum current condition;
simulating a synthetic maximum voltage condition; and
simulating a synthetic maximum power condition.

514. A method of generating disparate component integratable solar energy as described in claim 507, 510, or 513 or any other claim and further comprising the step of programmably controlling electrical operation of a photovoltaic DC-DC power converter.

515. A method of generating disparate component integratable solar energy as described in claim 514 or any other claim wherein said step of programmably controlling electrical operation of a photovoltaic DC-DC power converter comprises the step of remotely controlling a photovoltaic DC-DC power converter operation.

516. A method of generating disparate component integratable solar energy as described in claim 507 or any other claim and further comprising the step of controlling switching of at least one DC-DC power converter.

517. A method of generating disparate component integratable solar energy as described in claim 516 or any other claim wherein said step of controlling switching of at least one DC-DC power converter comprises the step of controlling field effect transistor switching of at least one DC-DC power converter.

518. A method of generating disparate component integratable solar energy as described in claim 507, 510, or 517 or any other claim wherein said step of simulating a power output comprises the step of by-passing the normal operation of a photovoltaic DC-DC power converter.

519. A method of generating disparate component integratable solar energy as described in claim 507, 510, 517, or 518 or any other claim wherein said step of simulating a power output comprises the step of a partial string simulating a plurality of converted DC outputs.

520. A method of generating disparate component integratable solar energy as described in claim 507, 510, 518, or 519 or any other claim and further comprising the step of sensing at least one photovoltaic power condition to control said step of simulating a power output.

521. A method of generating disparate component integratable solar energy as described in claim 520 or any other claim wherein said step of sensing at least one photovoltaic power condition comprises the step of sensing at least one photovoltaic power condition selected from a group consisting of:
sensing a photovoltaic DC-DC power converter voltage input;
sensing a photovoltaic DC-DC power converter voltage output; and
comparing a photovoltaic DC-DC power converter voltage input and photovoltaic DC-DC power converter voltage output.

522. A method of generating disparate component integratable solar energy as described in claim 520 or any other claim wherein said step of sensing at least one photovoltaic power condition comprises the step of transiently sensing at least one photovoltaic power condition.

523. A method of generating disparate component integratable solar energy as described in claim 522 or any other claim wherein said step of transiently sensing at least one photovoltaic power condition comprises the step of transiently sensing at least one photovoltaic power condition selected from a group consisting of:
periodically sensing a photovoltaic DC-DC power converter voltage input;
periodically sensing a photovoltaic DC-DC power converter voltage output; and
periodically comparing a photovoltaic DC-DC power converter voltage input and a photovoltaic DC-DC power converter voltage output.

524. A method of generating disparate component integratable solar energy as described in claim 507, 510, or 517 or any other claim wherein said step of simulating a power output comprises the step of automatically by-passing normal operation of a photovoltaic DC-DC power converter.

525. A method of generating disparate component integratable solar energy as described in claim 524 or any other claim wherein said step of automatically by-passing normal operation of a photovoltaic DC-DC power converter is in response to a step of comparing a photovoltaic DC-DC power converter voltage input and a photovoltaic DC-DC power converter voltage output.

526. A method of generating disparate component integratable solar energy as described in claim 507, 510, or 517 or any other claim wherein said step of simulating a power output comprises the step of remotely controlling a by-pass of a normal operation of a photovoltaic DC-DC power converter.

527. A method of generating disparate component integratable solar energy as described in claim 507, 510, 517, or 526 or any other claim wherein said step of simulating a power output comprises the step of programmably controlling a by-pass of a normal operation of a photovoltaic DC-DC power converter.

528. A method of generating disparate component integratable solar energy as described in claim 507, 510, 517, or 527 or any other claim wherein said step of simulating a power output comprises the step of a photovoltaic power simulator selected from a group consisting of:

simulating at least one individual solar panel power output, and simulating at least one individual solar panel string power output.

529. A method of generating disparate component integratable solar energy as described in claim 507, 510, 517, or 525 or any other claim wherein said step of simulating a power output comprises the step of by-passing normal operation of at least one individual solar panel DC-DC power converter.

530. A remotely programmable functionality solar energy system comprising:
at least one plurality of solar energy sources, each having a DC photovoltaic output;
a photovoltaic power combination circuit responsive to at least some of said plurality of DC photovoltaic outputs;
a photovoltaic power functionality change controller to which said photovoltaic power combination circuit is responsive; and
a remote power functionality change controller to which said photovoltaic power functionality controller is responsive.

531. An alterable power conversion-functionality solar energy system as described in claim 530 or any other claim wherein said wherein said remote power functionality change controller comprises a centralized, remote power functionality change controller.

532. An alterable power conversion-functionality solar energy system as described in claim 531 or any other claim wherein said at least one plurality of solar energy sources comprises a plurality of solar panels, and wherein said centralized, remote power functionality change controller comprises a centralized, multi-panel remote power functionality change controller.

533. An alterable power conversion-functionality solar energy system as described in claim 532 or any other claim wherein said centralized, multi-panel remote power functionality change controller comprises an administrative panel sea facility control.

534. A remotely programmable functionality solar energy system as described in claim 530 or any other claim and further comprising at least one string of electrical series responsive DC-DC converted solar panel outputs.

535. A remotely programmable functionality solar energy system as described in claim 534 or any other claim wherein said at least one string of electrical series responsive DC-DC converted solar panel outputs comprises a plurality of serially connected photovoltaic DC-DC power converters.

536. A remotely programmable functionality solar energy system as described in claim 535 or any other claim wherein said at least one string of electrical series responsive DC-DC converted solar panel outputs further comprises a plurality of individually panel dedicated maximum photovoltaic power point converter functionality controls.

537. A remotely programmable functionality solar energy system as described in claim 530, 534, 535, or 536 or any other claim wherein said photovoltaic power functionality change controller comprises a photovoltaic DC-DC power converter operation controller.

538. A remotely programmable functionality solar energy system as described in claim 530 or any other claim wherein said centralized, remote power functionality change controller comprises a programmable power functionality controller.

539. A remotely programmable functionality solar energy system as described in claim 538 or any other claim wherein said programmable power functionality controller comprises a external-string reactive power functionality controller.

540. A remotely programmable functionality solar energy system as described in claim 538 or any other claim wherein said programmable power functionality controller comprises a panel fault reactive power functionality controller.

541. A remotely programmable functionality solar energy system as described in claim 538 or any other claim wherein said programmable power functionality controller input comprises a user programmable power functionality controller.

542. A remotely programmable functionality solar energy system as described in claim 538 or any other claim wherein said programmable power functionality controller input comprises a maintenance programmable power functionality controller.

543. A remotely programmable functionality solar energy system as described in claim 538 or any other claim wherein said programmable power functionality controller input comprises an electrical code programmable power functionality controller.

544. A remotely programmable functionality solar energy system as described in claim 538 or any other claim wherein said programmable power functionality controller input comprises a individual solar panel programmable power functionality controller.

545. A remotely programmable functionality solar energy system as described in claim 538 or any other claim wherein said programmable power functionality controller input comprises a solar panel model characteristic power functionality controller.

546. A remotely programmable functionality solar energy system as described in claim 530 or 538 or any other claim wherein said photovoltaic power functionality change controller comprises a photovoltaic power functionality change controller selected from a group consisting of:
a solar panel string voltage functionality controller,
a solar panel string current functionality controller,
a solar panel inverter input voltage functionality controller,
a solar panel inverter input current functionality controller,
a solar panel inverter input power functionality controller, and
a solar panel voltage functionality controller.

547. A remotely programmable functionality solar energy system as described in claim 530 or 538 or any other claim wherein said photovoltaic power functionality change controller comprises a solar panel power up disconnect control.

548. A remotely programmable functionality solar energy system as described in claim 530, 546, or 547 or any other claim wherein said photovoltaic power functionality change controller comprises a photovoltaic DC-DC power converter switch controller.

549. A remotely programmable functionality solar energy system as described in claim 548 or any other claim wherein said photovoltaic DC-DC power converter switch controller comprises a photovoltaic DC-DC converter field effect transistor controller.

550. A remotely programmable functionality solar energy system as described in claim 549 or any other claim wherein said field effect transistor controller comprises a converter inoperability switch disconnect controller.

551. A remotely programmable functionality solar energy system as described in claim 549 or any other claim wherein said field effect transistor controller comprises a field effect transistor timing controller.

552. A method of remotely programmable functional control for a solar energy system comprising the steps of:
establishing a plurality of solar energy sources, each having a DC photovoltaic output;
electrically combining said plurality of DC photovoltaic outputs from said plurality of solar energy sources in a photovoltaic power combination circuit to support a substantial solar energy electrical power output; and
remotely directing a functional change in at least some of said plurality of DC photovoltaic outputs.

553. A method of remotely programmable functional control for a solar energy system as described in claim 552 or any other claim wherein said step of remotely directing a functional change comprises the step of centrally directing a functional change in a step of DC converting said DC photovoltaic output.

554. A method of remotely programmable functional control for a solar energy system as described in claim 553 or any other claim wherein said step of establishing a plurality of solar energy sources, each having a DC photovoltaic output comprises the step of establishing a plurality of solar panels and wherein said step of centrally directing a functional change in said step of DC converting said DC photovoltaic output comprises the step of directing a multi-panel functional change in individually panel DC converting.

555. A method of remotely programmable functional control for a solar energy system as described in claim 554 or any other claim wherein said step of directing a multi-panel functional change in individually panel DC converting comprises the step of remotely directing a multi-panel functional change from an administrative panel sea facility control.

556. A method of remotely programmable functional control for a solar energy system as described in claim 552 or any other claim and further comprising the step of utilizing an electrical series responsive plurality of solar panels to generate electrical power.

557. A method of remotely programmable functional control for a solar energy system as described in claim 556 or any other claim wherein said step of utilizing an electrical series responsive plurality of solar panels to generate electrical power comprises the step of utilizing a plurality of serially connected photovoltaic DC-DC power converters to generate electrical power.

558. A method of remotely programmable functional control for a solar energy system as described in claim 557 or any other claim and further comprising the step of individually generating power at a panel dedicated maximum photovoltaic power point.

559. A method of remotely programmable functional control for a solar energy system as described in claim 552, 556, 557, or 558 or any other claim wherein said step of remotely directing a functional change comprises the step of remotely controlling a photovoltaic DC-DC power converter operation.

560. A method of remotely programmable functional control for a solar energy system as described in claim 552 or any other claim and further comprising the step of programmably controlling electrical operation of a photovoltaic DC-DC power converter.

561. A method of remotely programmable functional control for a solar energy system as described in claim 560 or any other claim wherein said step of programmably controlling electrical operation of a photovoltaic DC-DC power converter comprises the step of reacting to an external-string reactive power condition.

562. A method of remotely programmable functional control for a solar energy system as described in claim 560 or any other claim wherein said step of programmably controlling electrical operation of a photovoltaic DC-DC power converter comprises the step of reacting to a solar panel ground fault condition.

563. A method of remotely programmable functional control for a solar energy system as described in claim 560 or any other claim wherein said step of programmably controlling electrical operation of a photovoltaic DC-DC power converter comprises the step of providing a user programmable power functionality controller.

564. A method of remotely programmable functional control for a solar energy system as described in claim 560 or any other claim wherein said step of programmably controlling electrical operation of a photovoltaic DC-DC power converter comprises the step of providing a maintenance programmable power functionality controller.

565. A method of remotely programmable functional control for a solar energy system as described in claim 560 or any other claim wherein said step of programmably controlling electrical operation of a photovoltaic DC-DC power converter comprises the step of providing an electrical code programmable power functionality controller.

566. A method of remotely programmable functional control for a solar energy system as described in claim 560 or any other claim wherein said step of programmably controlling electrical operation of a photovoltaic DC-DC power converter comprises the step of providing an individual solar panel programmable power functionality controller.

567. A method of remotely programmable functional control for a solar energy system as described in claim 560 or any other claim wherein said step of programmably controlling electrical operation of a photovoltaic DC-DC power converter comprises the step of providing a solar panel model programmable power functionality controller.

568. A method of remotely programmable functional control for a solar energy system as described in claim 552 or 560 or any other claim wherein said step of remotely directing a functional change comprises a step selected from a group consisting of:
remotely controlling a solar panel string voltage functionality,
remotely controlling a solar panel string current functionality,
remotely controlling a solar panel inverter input voltage functionality,
remotely controlling a solar panel inverter input current functionality,
remotely controlling a solar panel inverter input power functionality, and
remotely controlling a solar panel voltage functionality.

569. A method of remotely programmable functional control for a solar energy system as described in claim 552 or 560 or any other claim wherein said step of remotely directing a functional change comprises the step of remotely disconnecting a DC output of at least one solar panel.

570. A method of remotely programmable functional control for a solar energy system as described in claim 552, 568, or 569 or any other claim wherein said step of remotely directing a functional change comprises the step of remotely controlling switching of at least one DC-DC power converter.

571. A method of remotely programmable functional control for a solar energy system as described in claim 570 or any other claim wherein said step of remotely controlling switching of at least one DC-DC power converter comprises the step of remotely controlling switching of at least one field effect transistor for said at least one DC-DC power converter.

572. A method of remotely programmable functional control for a solar energy system as described in claim 571 or any other claim wherein said step of remotely controlling switching of at least one field effect transistor for said at least one DC-DC power converter comprises the step of remotely effecting converter switch inoperability for said at least one DC-DC power converter.

573. A method of remotely programmable functional control for a solar energy system as described in claim 571 or any other claim wherein said step of remotely controlling switching of at least one field effect transistor for said at least one DC-DC power converter comprises the step of remotely controlling switching timing for at least one field effect transistor for said at least one DC-DC power converter.

What is claimed is:

1. An individually alterable power conversion-functionality solar energy system comprising:
    a plurality of individual solar energy sources, each having an output;
    a plurality of source individualized photovoltaic power conversion circuitries, each responsive to said output to provide a DC photovoltaic output;
    a plurality of source individualized photovoltaic power generation operational mode functionality change controllers to which each of said source individualized photovoltaic power conversion circuitries is responsive, and that is configured to wirelessly control a transition between different power delivering operational modes for each of said source individualized photovoltaic power conversion circuitries;
    a wireless remotely programmable individualized conversion circuitry alterable power functionality change controller having remote individualized source alterable capabilities to which said plurality of source individualized photovoltaic power generation operational mode functionality change controllers are individually responsive; and
    a power grid responsive to said plurality of said source individualized photovoltaic power conversion circuitries.

2. An individually alterable power conversion-functionality solar energy system as described in claim 1 wherein said photovoltaic power generation operational mode functionality change controller comprises a photovoltaic DC-DC power converter switch controller.

3. An individually alterable power conversion-functionality solar energy system as described in claim 2 wherein said photovoltaic DC-DC power converter switch controller comprises a converter inoperability switch disconnect controller.

4. An individually alterable power conversion-functionality solar energy system as described in claim 2 wherein said photovoltaic DC-DC power converter switch controller comprises a field effect transistor timing controller.

5. An individually alterable power conversion-functionality solar energy system as described in claim 1 and further comprising:
    an interchangeable DC photovoltaic condition of said DC photovoltaic output;
    a secure command controller in response to said interchangeable DC photovoltaic condition; and
    a transition controller of said interchangeable DC photovoltaic condition from a first DC photovoltaic condition to a second DC photovoltaic condition.

6. An individually alterable power conversion-functionality solar energy system as described in claim 5 wherein said interchangeable DC photovoltaic condition comprises an interchangeable DC photovoltaic safety output condition.

7. An individually alterable power conversion-functionality solar energy system as described in claim 1 wherein said plurality of source individualized photovoltaic power generation operational mode functionality change controllers to which each of said source individualized photovoltaic power conversion circuitries is responsive, and that is configured to wirelessly control a transition between different power delivering operational modes for each of said source individualized photovoltaic power conversion circuitries comprises a photovoltaic power generation operational mode functionality change controller selected from a group consisting of:
    a photovoltaic power generation operational mode functionality change controller configured to wirelessly alter between different power delivering power limits;
    a photovoltaic power generation operational mode functionality change controller configured to wirelessly alter between different power delivering voltage limits;
    a photovoltaic power generation operational mode functionality change controller configured to wirelessly alter between different power delivering current limits;
    a photovoltaic power generation operational mode functionality change controller configured to wirelessly alter between different solar panel power delivering power limits;
    a photovoltaic power generation operational mode functionality change controller configured to wirelessly alter between different solar panel power delivering voltage limits;
    a photovoltaic power generation operational mode functionality change controller configured to wirelessly alter between different solar panel power delivering current limits;
    a photovoltaic power generation operational mode functionality change controller configured to wirelessly alter between different solar panel string power delivering power limits;
    a photovoltaic power generation operational mode functionality change controller configured to wirelessly alter between different solar panel string power delivering voltage limits;
    a photovoltaic power generation operational mode functionality change controller configured to wirelessly alter between different solar panel string power delivering current limits;
    a photovoltaic power generation operational mode functionality change controller configured to wirelessly alter between different individual solar panel power delivering power limits;
    a photovoltaic power generation operational mode functionality change controller configured to wirelessly alter between different individual solar panel power delivering voltage limits;
    a photovoltaic power generation operational mode functionality change controller configured to wirelessly alter between different individual solar panel power delivering current limits;

a photovoltaic power generation operational mode functionality change controller configured to wirelessly alter between different individual solar panel string power delivering power limits;

a photovoltaic power generation operational mode functionality change controller configured to wirelessly alter between different individual solar panel string power delivering voltage limits;

a photovoltaic power generation operational mode functionality change controller configured to wirelessly alter between different individual solar panel string power delivering current limits; and any combination thereof.

8. An individually alterable power conversion-functionality solar energy system as described in claim 1 wherein said plurality of source individualized photovoltaic power generation operational mode functionality change controllers to which each of said source individualized photovoltaic power conversion circuitries is responsive, and that is configured to wirelessly control a transition between different power delivering operational modes for each of said source individualized photovoltaic power conversion circuitries comprises a plurality of source individualized photovoltaic power generation operational mode functionality change controllers to which each of said source individualized photovoltaic power conversion circuitries is responsive, and that is configured to wirelessly control a transition of a power delivering operational mode to an operational mode selected from a group consisting of:

a low power operational mode;
a pre-power state operational mode;
a power down operational mode;
a night-time control operational mode;
a power off operational mode; and
a substantial solar energy electrical power operational mode.

9. An individually alterable power conversion-functionality solar energy system as described in claim 1 and further comprising a remote condition reporter element.

10. An individually alterable power conversion-functionality solar energy system as described in claim 9 wherein said remote condition reporter element comprises an unusually low power situation condition reporter element.

11. An individually alterable power conversion-functionality solar energy system as described in claim 1 wherein said wireless remotely programmable individualized conversion circuitry alterable power functionality change controller comprises a remotely controlled power off disconnect control.

12. An individually alterable power conversion-functionality solar energy system as described in claim 11 wherein said remotely controlled power off disconnect control comprises a remotely controlled power off disconnect control of a source, said source selected from a group consisting of an individual solar energy source, an individual solar panel, a string of connected items, a string of connected solar panels, a group of solar energy sources, and a group of solar panels.

13. An individually alterable power conversion-functionality solar energy system as described in claim 1 wherein said wireless remotely programmable individualized conversion circuitry alterable power functionality change controller comprises a remote panel fault reactive power functionality controller.

14. An individually alterable power conversion-functionality solar energy system as described in claim 1 wherein said plurality of individual solar energy sources comprises a plurality of solar panels, and wherein said wireless remotely programmable individualized conversion circuitry alterable power functionality change controller comprises a centralized, multi-panel remote power functionality change controller.

15. An individually alterable power conversion-functionality solar energy system as described in claim 14 wherein said centralized, multi-panel remote power functionality change controller comprises an administrative panel sea facility control.

16. An individually alterable power conversion-functionality solar energy system as described in claim 1 and further comprising at least one string of electrically connected items connected in electrical series responsive DC-DC converted solar panel outputs.

17. An individually alterable power conversion-functionality solar energy system as described in claim 16 wherein said at least one string of electrically connected items connected in electrical series responsive DC-DC converted solar panel outputs comprises a plurality of serially connected photovoltaic DC-DC power converters.

18. An individually alterable power conversion-functionality solar energy system as described in claim 17 wherein said at least one string of electrically connected items connected in electrical series responsive DC-DC converted solar panel outputs further comprises a plurality of individually panel dedicated maximum photovoltaic power point converter functionality controls.

19. An individually alterable power conversion-functionality solar energy system as described in claim 1 wherein said wireless remotely programmable individualized conversion circuitry alterable power functionality change controller comprises a controller selected from a group consisting of:

a user programmable power functionality controller;
an electrical code programmable power functionality controller;
an individual solar panel programmable power functionality controller; and
a solar panel model characteristic power functionality controller.

20. An individually alterable power conversion-functionality solar energy system as described in claim 1 wherein said wireless remotely programmable individualized conversion circuitry alterable power functionality change controller comprises a power functionality change controller selected from a group consisting of:

a solar panel string voltage functionality controller;
a solar panel string current functionality controller;
a solar panel inverter input voltage functionality controller;
a solar panel inverter input current functionality controller;
a solar panel inverter input power functionality controller; and
a solar panel voltage functionality controller.

* * * * *